United States Patent
Chen et al.

(10) Patent No.: US 8,179,775 B2
(45) Date of Patent: May 15, 2012

(54) PRECODING MATRIX FEEDBACK PROCESSES, CIRCUITS AND SYSTEMS

(75) Inventors: Runhua Chen, Dallas, TX (US); Eko N. Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 203 days.

(21) Appl. No.: 12/188,767

(22) Filed: Aug. 8, 2008

(65) Prior Publication Data

US 2009/0046569 A1 Feb. 19, 2009

Related U.S. Application Data

(60) Provisional application No. 61/024,806, filed on Jan. 30, 2008, provisional application No. 60/981,049, filed on Oct. 18, 2007, provisional application No. 60/955,802, filed on Aug. 14, 2007.

(51) Int. Cl.
*H04J 11/00* (2006.01)

(52) U.S. Cl. ........ 370/203; 370/328; 375/267; 375/296; 455/561

(58) Field of Classification Search ............... None
See application file for complete search history.

(56) References Cited

U.S. PATENT DOCUMENTS

| | | | |
|---|---|---|---|
| 7,764,931 B2* | 7/2010 | Kim et al. | 455/69 |
| 2006/0029157 A1* | 2/2006 | Dabak et al. | 375/299 |
| 2006/0039489 A1 | 2/2006 | Ikram et al. | |
| 2007/0098099 A1* | 5/2007 | Gore et al. | 375/260 |
| 2007/0160162 A1 | 7/2007 | Kim et al. | 375/267 |
| 2007/0165738 A1 | 7/2007 | Barriac et al. | |

(Continued)

FOREIGN PATENT DOCUMENTS

WO WO2006031485 A1 3/2006

OTHER PUBLICATIONS

Y. Linde, A. Buzo, and R.M. Gray, "An Algorithm for Vector Quantizer Design," IEEE Trans. Commun., vol. COM-28, pp. 84-95, Jan. 1980, see pp. 84, 87-88, FIG. 4.

(Continued)

*Primary Examiner* — Chi H. Pham
*Assistant Examiner* — Shick Hom
(74) *Attorney, Agent, or Firm* — Wade J. Brady, III; Frederick J. Telecky, Jr.

(57) ABSTRACT

An electronic device includes a first circuit (111) operable to generate a precoding matrix index (PMI) vector associated with a plurality of configured subbands, and further operable to form a compressed PMI vector from the PMI vector wherein the compressed PMI vector includes one reference PMI and at least one differential subband PMI defined relative to the reference PMI; and a second circuit (113) operable to initiate transmission of a signal communicating the compressed PMI vector. Other electronic devices, processes and systems are also disclosed.

39 Claims, 33 Drawing Sheets

U.S. PATENT DOCUMENTS

| | | | |
|---|---|---|---|
| 2007/0217540 A1 | 9/2007 | Onggosanusi et al. | |
| 2007/0242770 A1* | 10/2007 | Kim et al. | 375/267 |
| 2008/0013610 A1 | 1/2008 | Varadarajan et al. | |
| 2008/0037675 A1 | 2/2008 | Lin et al. | |
| 2008/0043867 A1 | 2/2008 | Blanz et al. | |
| 2008/0170523 A1 | 7/2008 | Han et al. | |
| 2008/0227495 A1* | 9/2008 | Kotecha et al. | 455/562.1 |
| 2009/0059844 A1* | 3/2009 | Ko et al. | 370/328 |
| 2010/0183086 A1* | 7/2010 | Ko et al. | 375/260 |
| 2011/0122971 A1* | 5/2011 | Kim et al. | 375/316 |

OTHER PUBLICATIONS

Tarkesh Pande, et al, "Reduced Feedback MIMO-OFDM Precoding and Antenna Selection," IEEE Transactions On Signal Processing, vol. 55, No. 5, May 2007, pp. 2284-2293.

Patent Cooperation Treaty, Notification of Transmittal of The International Search Report and The Written Opinion of the ISA, Feb. 24, 2009, pp. 1-4.

Patent Cooperation Treaty, Written Opinion of the ISA, Feb. 24, 2009, pp. 1-10.

* cited by examiner

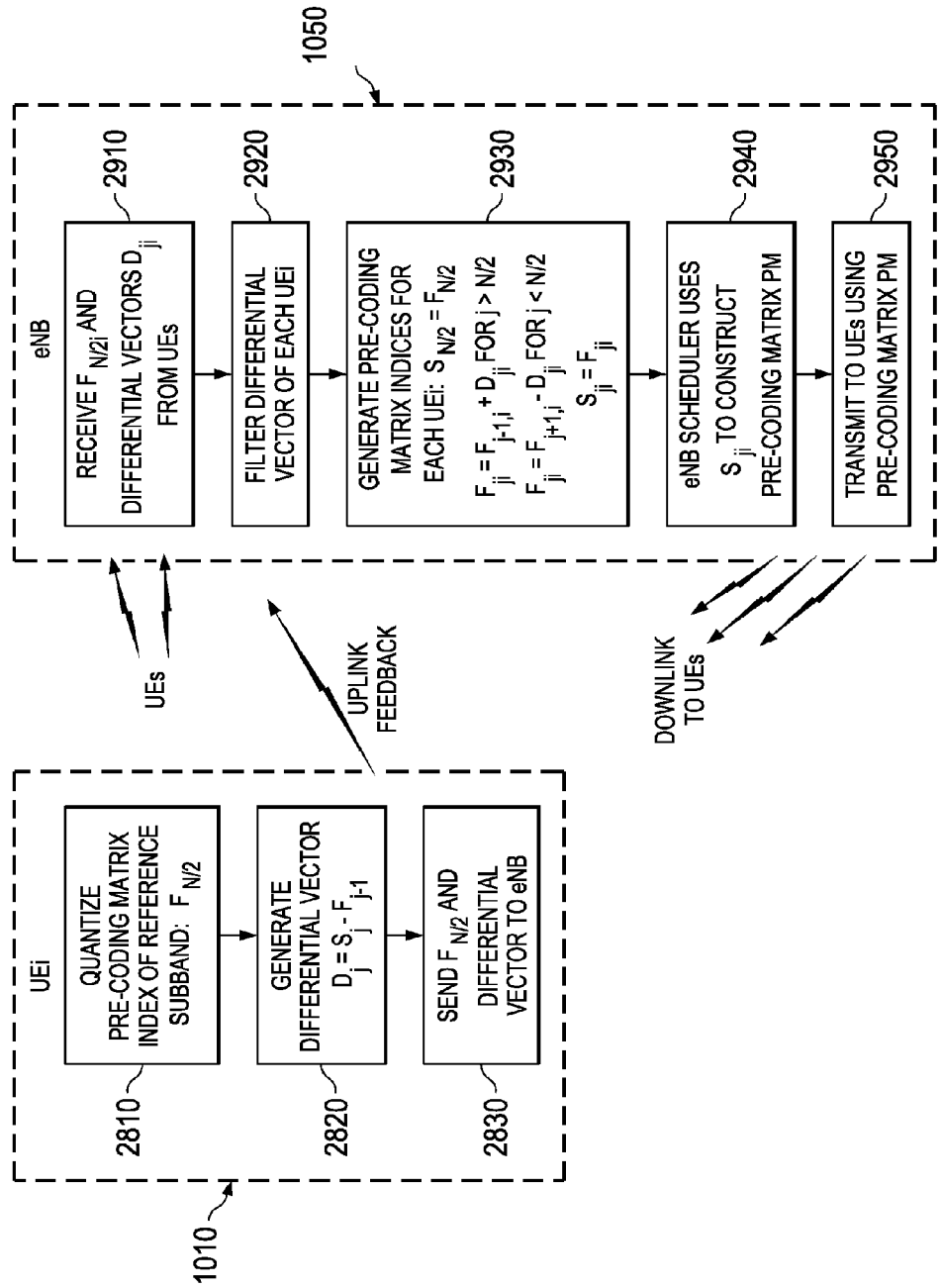

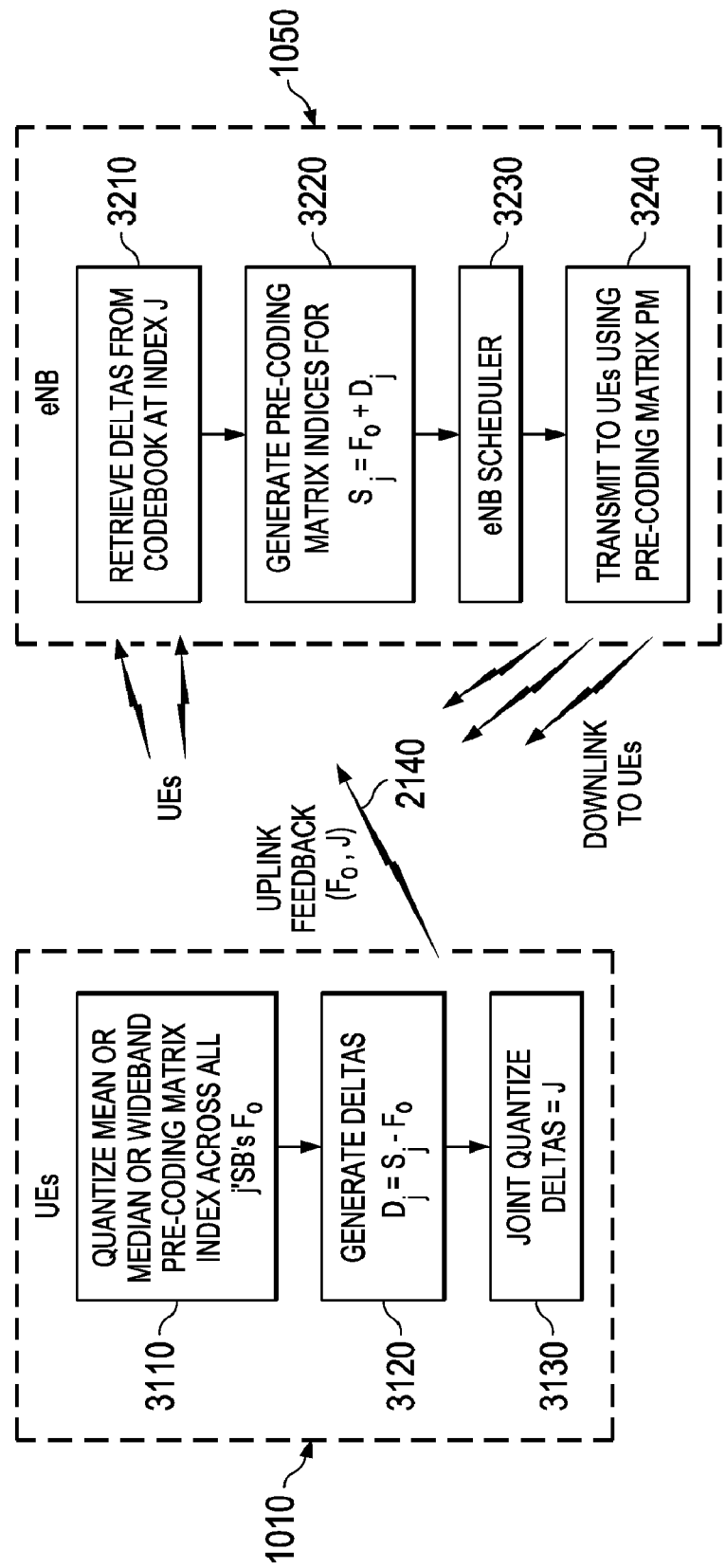

FIG. 22
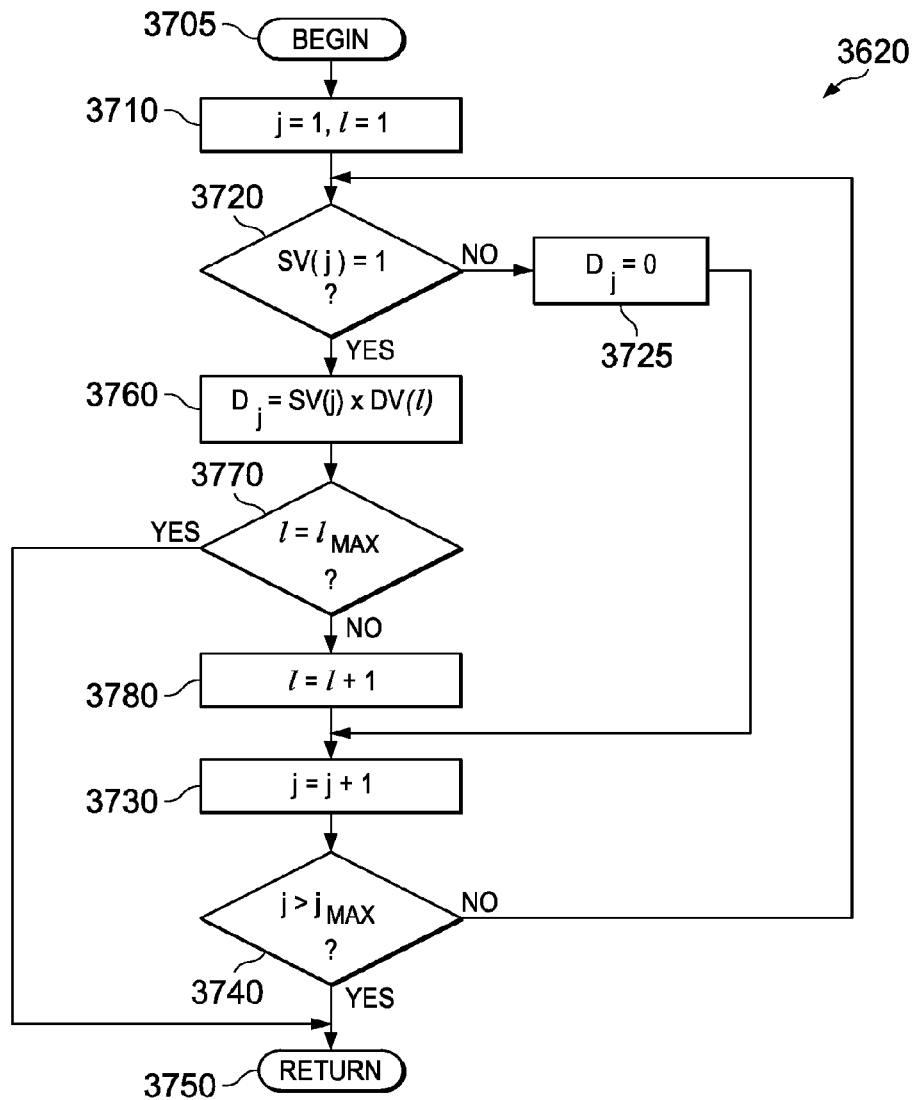
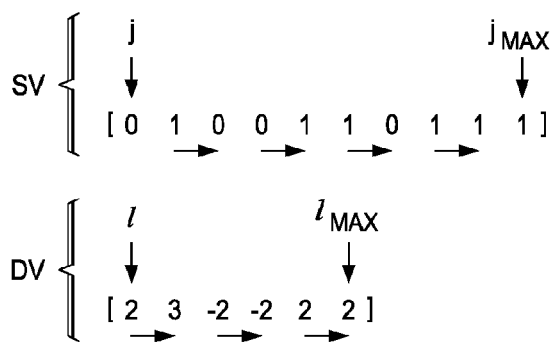

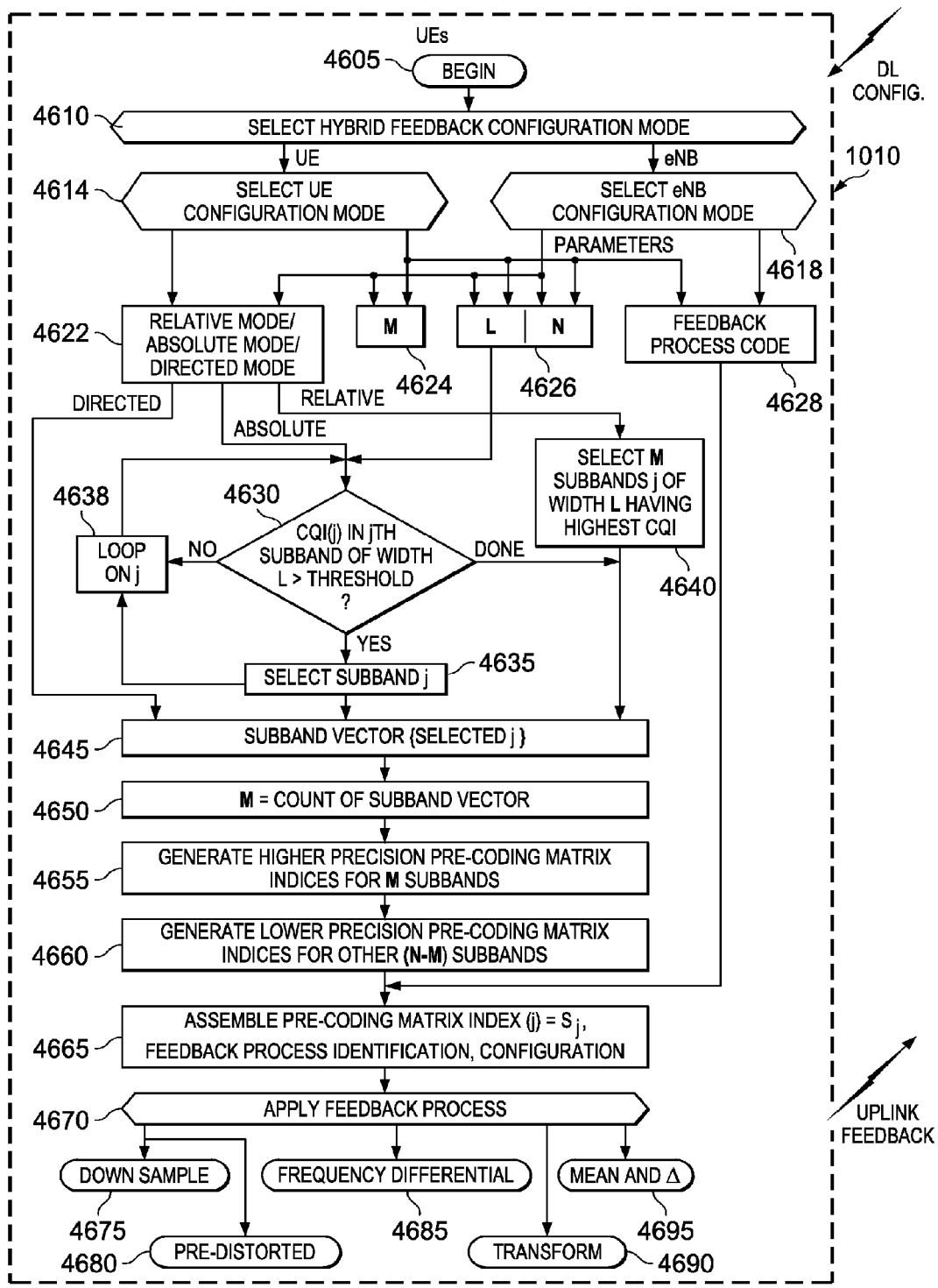

PRECODING MATRIX FEEDBACK PROCESSES, CIRCUITS AND SYSTEMS

CROSS-REFERENCES TO RELATED APPLICATIONS

This application claims the benefit under 35 U.S.C. 119(e) of U.S. Provisional Application No. 60/955,802 (TI-65218PS) entitled "Pre-Coding Matrix Feedback for MIMO-OFDMA Systems" filed on Aug. 14, 2007, and which is incorporated herein by reference in its entirety.

Additionally, this application claims the benefit under 35 U.S.C. 119(e) of U.S. Provisional Application No. 60/981,049 (TI-65218PS1) entitled "Pre-Coding Matrix Feedback for MIMO-OFDMA Systems" filed on Oct. 18, 2007, and which is incorporated herein by reference in its entirety.

Additionally, this application claims the benefit under 35 U.S.C. 119(e) of U.S. Provisional Application No. 61/024,806 (TI-65218PS2) entitled "Pre-Coding Matrix Feedback for MIMO-OFDMA Systems" filed on Jan. 30, 2008, and which is incorporated herein by reference in its entirety.

U.S. Patent Application Publication 2007-0217540 "A Pre-Coder Selection Based on Resource Block Grouping" of Sep. 20, 2007, and corresponding U.S. patent application Ser. No. 11/688,756 (TI-62290) filed Mar. 20, 2007, and now abandoned, are each incorporated herein by reference in their entirety.

U.S. Patent Application Publication 2006-0039489 "Method and Apparatus for Providing Closed-Loop Transmit Precoding" of Feb. 23, 2006, and corresponding U.S. patent application Ser. No. 11/182,083 (TI-38973) filed Jul. 15, 2005, and now abandoned, are each incorporated herein by reference in their entirety.

U.S. Patent Application Publication 2006-0029157 "Wireless Precoding Methods" of Feb. 9, 2006, and corresponding U.S. patent application Ser. No. 11/199,629 (TI-38909) filed Aug. 9, 2005, are each incorporated herein by reference in their entirety.

U.S. patent application Ser. No. 12/036,066 (TI-64201) "CQI Feedback for OFDMA Systems" filed Feb. 22, 2008, is incorporated herein by reference in its entirety.

U.S. Patent Application Publication 2008-0037675 "Codebook And Pre-Coder Selection For Closed Loop MIMO" of Feb. 14, 2008, and corresponding U.S. patent application Ser. No. 11/893,045 (TI-63186) filed Aug. 13, 2007, are each incorporated herein by reference in their entirety.

U.S. Patent Application Publication 2008-0013610 "CQI Feedback For MIMO Deployments" of Jan. 17, 2008, and corresponding U.S. patent application Ser. No. 11/759,221 (TI-62585) filed Jun. 6, 2007, are each incorporated herein by reference in their entirety.

U.S. patent application Ser. No. 12/124,529 (TI-64811) "Nested Precoding Codebook Structures For MIMO Systems" filed May 21, 2008, is incorporated herein by reference in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the

FIELD OF THE INVENTION

The present invention is directed, in general, to electronic circuits for supporting wireless communications, to various wireless systems, and to methods of operating the circuits and systems.

BACKGROUND OF THE INVENTION

A wireless network may employ orthogonal frequency division multiplexing (OFDM) or orthogonal frequency division multiple access (OFDMA). In a cellular wireless network, each cell employs a base station (designated by Node B or eNB) that communicates with user equipment (UE), such as a cell phone, a laptop, or a PDA, which is actively located within its cell.

Initially, the base station transmits reference signals or pilot signals to the user equipment wherein the reference signals are based on a protocol shared by the base station and the user equipment. User equipment UE knows the signal, its frequency and its timing, so UE can generate a channel estimate based on the reference signal. Interference and noise impact the measured quality of the channel estimate.

In an OFDM or OFDMA system, different user equipments are scheduled on different portions of the system bandwidth. The system bandwidth is divided into frequency-domain groups or subbands that encompass resource blocks according to group size or subband size. A resource block is the smallest allocation unit available in terms of frequency granularity that is allocated to user equipment UE by a base station scheduler module. Each resource block RB consists of $N_{RB}$ contiguous OFDM/OFDMA sub-carriers. While the size of different resource blocks can in general vary, the same size is used across resource blocks for convenience so that the resource blocks size are as uniform as possible across the system bandwidth. A different user can potentially use or be allocated to use each of these resource blocks. In addition, a user can be scheduled on a portion of the system bandwidth having adjacent resource blocks inside. Non-adjacent allocation for each user is also possible.

The user equipment determines a channel quality indicator (CQI) for each of the resource blocks or for each of the subbands based on the channel estimation performed. The CQI metric is suitably a signal to interference noise ratio (SINR) after detection, a channel throughput measure, or other quality measure. The user equipment feeds back the CQI for each subband or even for each resource block to the base station. A higher CQI for a resource block allows a higher data rate transfer of information from the base station to the user equipment. The CQI for different subbands or for resource blocks can also be jointly encoded and compressed.

For systems with multiple transmit and multiple receive antennas, also called multi-input multi-output (MIMO) systems, improved throughput and/or robustness is suitably obtained by employing transmit pre-coding. To apply pre-coding on a MIMO system means that a certain transformation (typically linear or complex linear) for each RB is applied to the data stream(s) allocated to the RB prior to transmission via physical antennas. Scheduling involves base station allocation of UEs to RBs for determining the transformation. The number of independent data streams is termed the transmission rank. With pre-coding, the number of physical antennas does not have to be equal to the transmission rank. In this case, the precoding matrix is a P×R matrix, where P is the number of physical transmit antennas and R is the transmission rank (not more than P). Denoting the precoding matrix for each downlink RB as PM and the R independent data streams as an R-dimensional vector s, the transmitted signal via the P physical antennas is written as: x=PM s.

Precoding matrix PM for each RB in a given subband can be selected at the transmitter or receiver. For a frequency division duplex FDD system where the uplink and downlink channels are not reciprocal, precoding matrices to contribute to the matrix PM are more efficiently chosen at the receiver (user equipment UE) from a pre-determined set of matrices, termed the pre-coding codebook. Based on the channel/noise/interference estimate, which UE is in the best position to make, UE determines the precoding matrix selection based on the channel knowledge/estimation in each RB to optimize data throughput, for example. Therefore, the precoding matrix is also a function of the channel and its quality. The same codebook-based pre-coding scheme can also be used for TDD or half-duplex TDD/FDD.

Once this is done, the user equipment feeds back to the base station for each of its subbands or resource blocks, the precoding matrix and the CQI that will be achieved if that precoding matrix is used for the resource block in the transmission of data. For example, in the context of the 3GPP E-UTRA (Evolved Universal Terrestrial Radio Access) system deploying a 5-MHz transmission, 10 user equipments having feedback information pertaining to 25 resource blocks hitherto has apparently involved a high level of operational overhead information to be fed back to the base station to schedule them and form a precoding matrix PM for them.

In addition to the CQI and precoding matrix selection feedback, the user equipment can also select and feed back the transmission rank. While transmission rank selection may or may not be performed for each resource block, additional feedback overhead is involved.

Accordingly, further ways of reducing the amount of communications feedback between user equipment and base station are desirable.

SUMMARY OF THE INVENTION

A form of the invention involves an electronic device that includes a first circuit operable to generate a precoding matrix index (PMI) vector associated with a plurality of configured subbands, and further operable to form a compressed PMI vector from said PMI vector wherein the compressed PMI vector includes one reference PMI and at least one differential subband PMI defined relative to the reference PMI, and a second circuit operable to initiate transmission of a signal communicating the compressed PMI vector.

Another form of the invention involves an electronic device including a first circuit operable to generate a precoding matrix index (PMI) vector associated with a plurality of configured subbands, and further operable to form a compressed PMI vector from said PMI vector wherein the compressed PMI vector includes one reference PMI and a second PMI representing a set of selected subbands, and a second circuit operable to initiate transmission of a signal communicating the compressed PMI vector.

A further form of the invention involves an electronic device including a first circuit operable to generate a precoding matrix index (PMI) vector associated with a plurality of configured subbands, and further operable to form a compressed PMI vector from said PMI vector wherein said first circuit is operable to choose from plural alternative types of compression according to a selection rule or a configuration message from a remote transmitter or both the selection rule and the configuration message from a remote transmitter, and a second circuit operable to initiate transmission of a signal communicating the compressed PMI vector.

A method form of the invention involves a method of operating a communication device, including generating a precoding matrix index (PMI) vector associated with a plurality of configured subbands, generating a compressed PMI vector from said PMI vector wherein the compressed PMI vector includes one reference PMI and at least one differential subband PMI defined relative to the reference PMI, and initiating transmission of a signal communicating the compressed PMI vector.

Another method form of the invention involves a method of operating a communication device, including generating a precoding matrix index (PMI) vector associated with a plurality of configured subbands, generating a compressed PMI vector from said PMI vector wherein the compressed PMI vector includes one reference PMI and in addition a second PMI representing a set of selected subbands, and initiating transmission of a signal communicating the compressed PMI vector.

A further method form of the invention involves a method of operating a communication device including generating a precoding matrix index (PMI) vector associated with a plurality of configured subbands, generating a compressed PMI vector from said PMI vector wherein said compression is chosen from plural alternative types of compression according to a selection rule or a configuration message from a remote transmitter or both the selection rule and the configuration message from a remote transmitter and initiating transmission of a signal communicating the compressed PMI vector.

Still another form of the invention involves a wireless node including a receiver to receive at least one signal, each communicating a compressed precoding matrix index (PMI) vector associated with a user equipment wherein the compressed PMI vector includes one reference PMI and at least one differential subband PMI defined relative to the reference PMI, a processing circuitry coupled to the receiver for reconstructing at least one PMI vector from said at least one signal wherein each reconstructed PMI vector is associated with a plurality of configured subbands, a scheduler coupled with the processing circuitry to schedule at least one user equipment based on said at least one such reconstructed PMI vector, and a transmitter circuitry responsive to said processing circuitry and scheduler to send data streams to at least one scheduled user equipment.

Another additional form of the invention involves a wireless node including a receiver to receive at least one signal, each communicating a compressed precoding matrix index (PMI) vector associated with a user equipment wherein the compressed PMI vector includes one reference PMI representing all the configured subbands, and a second PMI representing a set of selected subbands, a processing circuitry coupled to the receiver for reconstructing at least one PMI vector from said at least one signal wherein each reconstructed PMI vector is associated with a plurality of configured subbands, a scheduler coupled with the processing circuitry to schedule at least one user equipment based on said at least one such reconstructed PMI vector, and a transmitter circuitry responsive to said processing circuitry and scheduler to send data streams to at least one scheduled user equipment.

A further additional form of the invention involves a wireless node including a receiver to receive at least one signal, each communicating a compressed precoding matrix index (PMI) vector associated with a user equipment, a processing circuitry coupled to the receiver for reconstructing at least one PMI vector from said at least one signal wherein each reconstructed PMI vector is associated with a plurality of configured subbands wherein said processing circuit is operable to choose from plural alternative types of compression, a scheduler coupled with the processing circuitry to schedule at least one user equipment based on said at least one such reconstructed PMI vector, and a transmitter circuitry responsive to said processing circuitry and scheduler to send data streams to at least one scheduled user equipment and said transmitter circuit is operable to send a signal communicating the choice of compression.

A yet further additional method form of the invention involves a method of operating a wireless node including receiving at least one signal, each communicating a compressed precoding matrix index (PMI) vector associated with a user equipment wherein the compressed PMI vector includes one reference PMI and at least one differential subband PMI defined relative to the reference PMI, reconstructing at least one PMI vector from said at least one signal wherein each reconstructed PMI vector is associated with a plurality of configured subbands, and scheduling at least one user equipment based on said at least one such reconstructed PMI vector and sending data streams to at least one scheduled user equipment.

A still further method of operating a wireless node includes receiving at least one signal, each communicating a compressed precoding matrix index (PMI) vector associated with a user equipment wherein the compressed PMI vector includes one reference PMI representing all the configured subbands, and a second PMI representing a set of selected subbands, reconstructing at least one PMI vector from said at least one signal wherein each reconstructed PMI vector is associated with a plurality of configured subbands, and scheduling at least one user equipment based on said at least one such reconstructed PMI vector and sending data streams to at least one scheduled user equipment.

A yet further method of operating a wireless node includes receiving at least one signal, each communicating a compressed precoding matrix index (PMI) vector associated with a user equipment wherein said compression is chosen from plural alternative types of compression and communicated to the user equipment, reconstructing at least one PMI vector from said at least one signal wherein each reconstructed PMI vector is associated with a plurality of configured subbands, and scheduling at least one user equipment based on said at least one such reconstructed PMI vector and sending data streams to at least one scheduled user equipment.

Other forms of inventive electronic devices, processes and systems are also disclosed and claimed.

BRIEF DESCRIPTION OF THE DRAWINGS

For a more complete understanding of the present invention, reference is now made to the following descriptions taken in conjunction with the accompanying drawings, in which:

FIG. 18 is a pair of side-by-side flow diagrams of an inventive UE and inventive eNB involving a frequency differential PMI feedback process in UE and a filtered process to reconstruct the frequency differential PMI feedback for use by the eNB.

FIG. 19 is a pair of side-by-side flow diagrams of an inventive UE and inventive eNB involving a joint quantized Mean and Delta PMI feedback process in UE and a codebook-based process at eNB to reconstruct joint quantized Mean and Delta PMI feedback for use by the eNB.

FIG. 22 is a flow diagram of a further inventive process detailing a block in FIG. 21 for eNB reconstructing joint quantized Mean and Thresholded Delta PMI feedback from UE for use by eNB.

FIG. 26A is a flow diagram of inventive structure and process in UE having a configurable hybrid PMI feedback with variable sub-band numbers and PMI feedback granularity.

Corresponding numerals refer to corresponding parts in the various figures of the drawing, except where the context may indicate otherwise. Some overlap of algebraic symbols and indices with each other may occur, and the context makes their meaning clear.

DETAILED DESCRIPTION OF EMBODIMENTS

Figure 1:
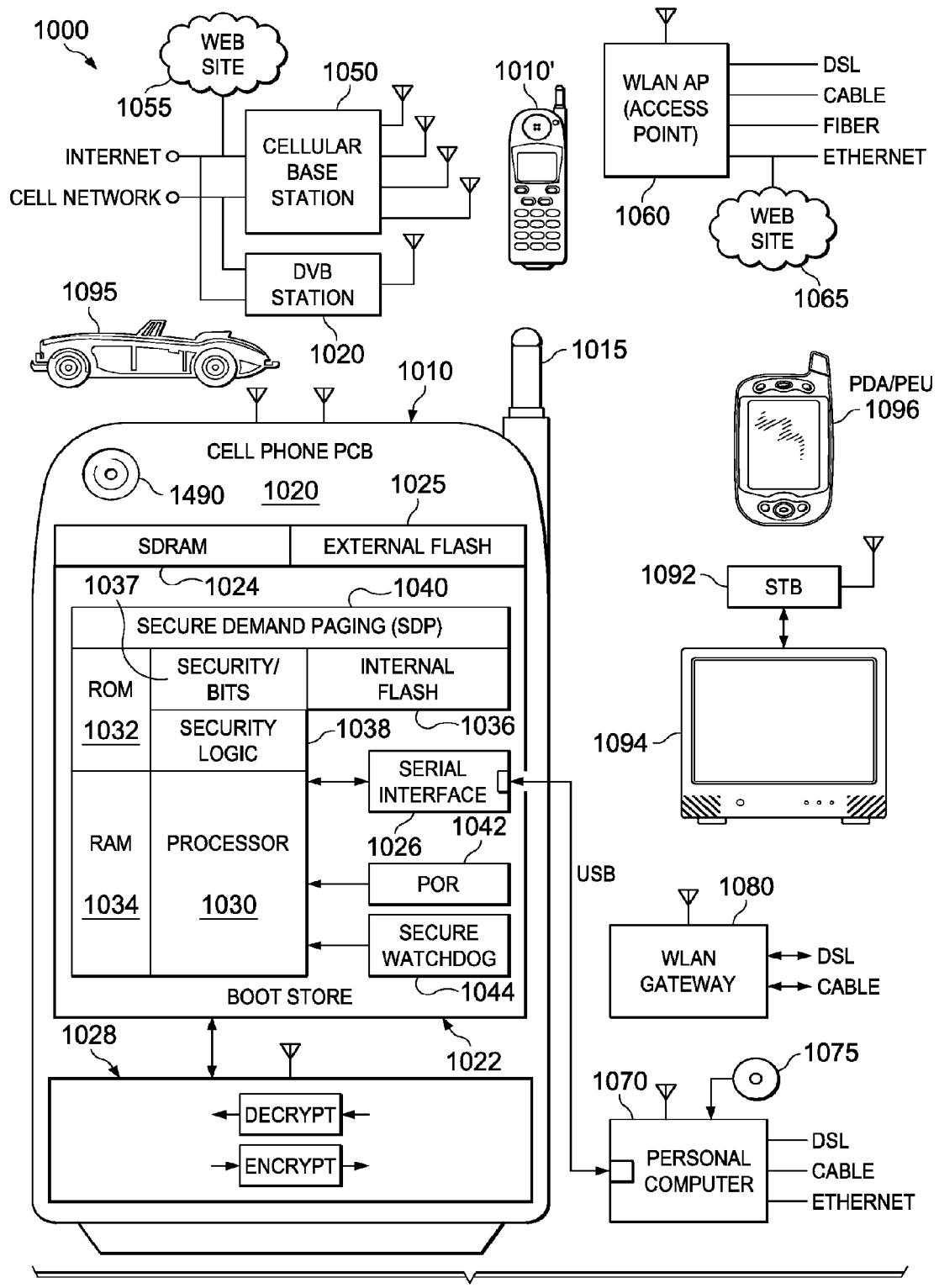
FIG. 1 is a partially pictorial, partially block diagram of an inventive communications network with various inventive system components with any one, some or all of them improved according to the invention.

In FIG. 1, an improved communications system 1000 has system blocks as described next and improved with any one, some or all of the circuits and subsystems shown in various Figures of the drawing. Any or all of the system blocks, such as cellular mobile telephone and data handsets 1010 and 1010', a cellular (telephony and data) base station 1050, a WLAN AP (wireless local area network access point, IEEE 802.11 or otherwise) 1060, a Voice over WLAN Gateway 1080 with user voice over packet telephone 1085 (not shown), and a voice enabled personal computer (PC) 1070 with another user voice over packet telephone (not shown), communicate with each other in communications system 1000.

Camera 1490 provides video pickup for cell phone 1020 to send over the internet to cell phone 1010', personal digital assistant/personal entertainment unit PDA/PEU 1096, TV 1094, automobile 1095 and to a monitor of PC 1070 via any one, some or all of cellular base station 1050, DVB station 1020, WLAN AP 1060, STB 1092, and WLAN gateway 1080. Handset 1010 has a video storage and other storage, such as hard drive, flash drive, high density memory, and/or compact disk (CD) in the handset for digital video recording (DVR) such as for delayed reproduction, transcoding, and retransmission of video to other handsets and other destinations.

On a cell phone printed circuit board (PCB) 1020 in handset 1010, is provided a higher-security processor integrated circuit 1022, an external flash memory 1025 and SDRAM 1024, and a serial interface 1026. Serial interface 1026 is suitably a wireline interface, such as a USB interface connected by a USB line to the personal computer 1070 and magnetic and/or optical media 1075. Cell phone 1010 intercommunication also occurs via a cellular modem, WLAN, Bluetooth from a website 1055 or 1065, television and physical layer (PHY) or other circuitry 1028. Processor integrated circuit 1022 has MPU (or CPU) block 1030 coupled to an internal (on-chip read-only memory) ROM 1032, an internal RAM 1034, and flash memory 1036. A security logic circuit 1038 is coupled to secure-or-general-purpose-identification value (Security/GPI) bits 1037 of a non-volatile one-time alterable Production ID register or array of electronic fuses (E-Fuses). Depending on the Security/GPI bits, boot code residing in ROM 1032 responds differently to a Power-On Reset (POR) circuit 1042 and to a secure watchdog circuit 1044 coupled to processor 1030.

Figure 2:
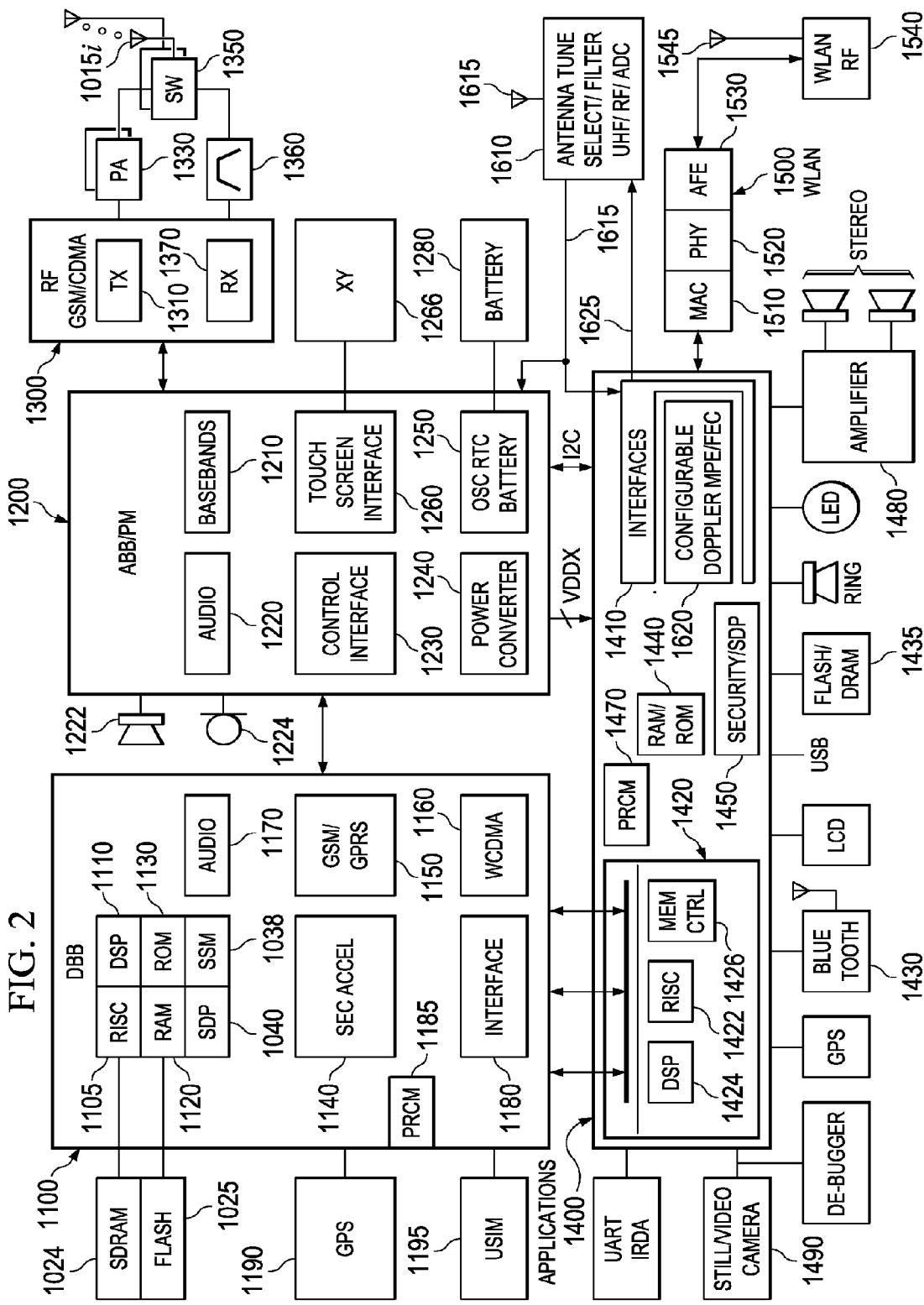
FIG. 2 is a block diagram of an inventive telecommunications device with inventive integrated circuit cores or chips improved as shown in the other figures for use in the blocks of the communications system of FIG. 1.

In FIG. 2, an integrated circuit 1100 includes a digital baseband (DBB) block that has a RISC processor 1105 and a digital signal processor 1110, communications and security software, and security accelerators 1140. A memory controller interfaces the RISC core 1105 and the DSP core 1110 to Flash memory 1025 and SDRAM 1024. On chip RAM 1120 and on-chip ROM 1130 also are accessible to the processors 1110 for providing sequences of software instructions and data thereto. A security logic circuit 1038 of FIGS. 1 and 2 has a secure state machine (SSM) 2460 to provide hardware monitoring of any tampering with security features. A Secure Demand Paging (SDP) circuit 1040 is provided for effectively-extended secure memory.

Digital circuitry 1150 on integrated circuit (IC) 1100 supports and provides wireless interfaces for any one or more of GSM, GPRS, EDGE, UMTS, and OFDMA/MIMO embodiments. Digital circuitry 1160 provides codec for CDMA (Code Division Multiple Access), CDMA2000, and/or WCDMA (wideband CDMA or UMTS) wireless suitably with HSDPA/HSUPA (High Speed Downlink Packet Access, High Speed Uplink Packet Access) (or 1xEV-DV, 1xEV-DO or 3xEV-DV) data feature via the analog baseband chip 1200 and RF GSM/CDMA chip 1300. Audio/voice block 1170 supports audio and speech/voice functions and interfacing. Speech/voice codec(s) and user voice-recognition/voice control are suitably provided in memory space in audio/voice block 1170 for processing by processor(s) 1110. Applications interface 1180 couples the digital baseband 1100 to applications processor 1400. Power resets and control module 1185 provides power management circuitry for chip 1100. IC 1100 is coupled to location-determining circuitry 1190 for GPS (Global Positioning System). IC 1100 is also coupled to a USIM (UMTS Subscriber Identity Module) 1195.

In FIG. 2, a mixed-signal integrated circuit 1200 includes an analog baseband (ABB) block 1210 for GSM/GPRS/EDGE/UMTS/HSDPA/HSUPA and an analogous ABB for CDMA wireless and any associated 1xEV-DV, 1xEV-DO or 3xEV-DV data and/or voice with its respective SPI (Serial Port Interface), digital-to-analog conversion DAC/ADC block, and RF Control pertaining to CDMA and coupled to RF (CDMA) chip 1300. An audio block 1220 has audio I/O (input/output) circuits to a speaker 1222, a microphone 1224, and headphones (not shown). A control interface 1230 has a primary host interface (I/F) and a secondary host interface to DBB-related integrated circuit 1100 of FIG. 2 for the respective GSM and CDMA paths.

A power conversion block 1240 includes buck voltage conversion circuitry for DC-to-DC conversion, and low-dropout (LDO) voltage regulators, as in FIG. 14 described later herein, for power management/sleep mode of respective parts of the chip supplied with voltages VDDx regulated by the LDOs. Power conversion block 1240 provides information to and is responsive to a power control state machine between the power conversion block 1240 and circuits 1250 for clocking chip 1200. A touch screen interface 1260 is coupled to a touch screen XY 1266 off-chip for display and control. Battery 1280 provides power to the system and battery data to circuit 1250 on suitably provided lines from the battery pack.

In FIG. 2 an RF integrated circuit 1300 includes a GSM/GPRS/EDGE/UMTS/CDMA/MIMO-OFDMA RF transmitter block 1310 fed by baseband block 1210 of chip 1200, and Transmitter 1310 drives a dual band RF power amplifier (PA) 1330. Switchplexer 1350 couples antenna and switch to both the transmit portion 1310, 1330 via band-pass filters 1360 to receiving LNAs (low noise amplifiers) coupled to GSM/GPRS/EDGE/UMTS/CDMA demodulator 1370 to produce I/Q (in-phase, quadrature outputs) to baseband block 1210. Replication of blocks and antennas is provided in a cost-efficient manner to support MIMO OFDMA.

Chip 1400 has an applications processing section 1420 RISC processor 1422 (such as MIPS core(s), ARM core(s), or other suitable processor), a digital signal processor 1424, and a shared memory controller MEM CTRL 1426 with DMA (direct memory access), and a 2D/3D graphic accelerator. Speech/voice codec functionality is processed. Off-chip memory resources 1435 include DRAM and flash memory. Shared memory controller 1426 interfaces the RISC processor 1422 and the DSP 1424 via an on-chip bus to on-chip memory 1440 with RAM and ROM. Security logic 1038 of FIG. 1 and FIG. 2 (1038, 1450) includes hardware-based protection circuitry, also called security monitoring logic or a secure state machine SSM 2460 to monitor busses and other parts for security violations. A JTAG emulation interface couples to an off-chip emulator Debugger, I2C interfaces to analog baseband ABB chip 1200, and an interface couples to applications interface 1180.

DLP™ display technology from Texas Instruments Incorporated is coupled to interface 1410. A transparent organic semiconductor display is provided on one or more windows of the vehicle 1095 of FIG. 1 and wirelessly or wireline-coupled to the video feed.

In FIG. 2, a WLAN and/or WiMax integrated circuit 1500 includes MAC (media access controller) 1510, PHY (physical layer) 1520 and AFE (analog front end) 1530. A MIMO UWB (ultra wideband) MAC/PHY supports OFDM in 3-10 GHz. UWB bands. communications in some embodiments. A digital video integrated circuit 1610 provides television antenna 1615 tuning, antenna selection, filtering, RF input stage for recovering video/audio/controls from DVB station 1020 of FIG. 1.

Figure 3:
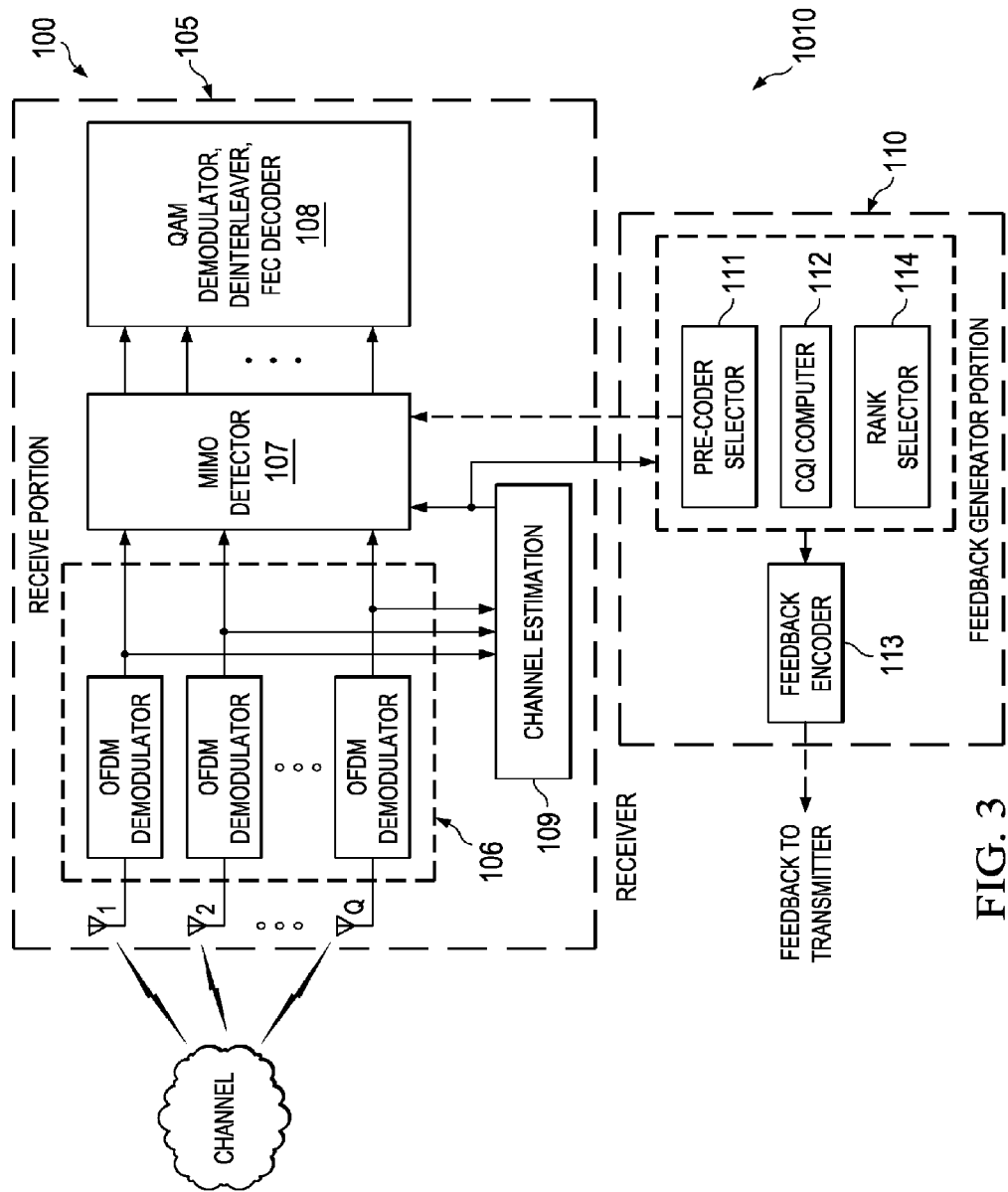
FIG. 3 is a system block diagram of a MIMO OFDMA receiver improved as shown in the other figures.

FIG. 3 illustrates a system diagram of a receiver 100 in an OFDM communications system. The receiver 100 includes a receive portion 105 and a feedback generation portion 110. The receive portion 105 includes an OFDM module 106 having Q OFDM demodulators (Q is at least one (1) and equals or exceeds the number P of antennas) coupled to corresponding receive antenna(s), a MIMO detector 107, a QAM demodulator plus de-interleaver plus FEC decoding module 108 and a channel estimation module 109. The feedback portion 110 includes a precoding matrix selector 111, a channel quality indicator (CQI) computer 112, rank selector 114, and a feedback encoder 113.

Figure 4:
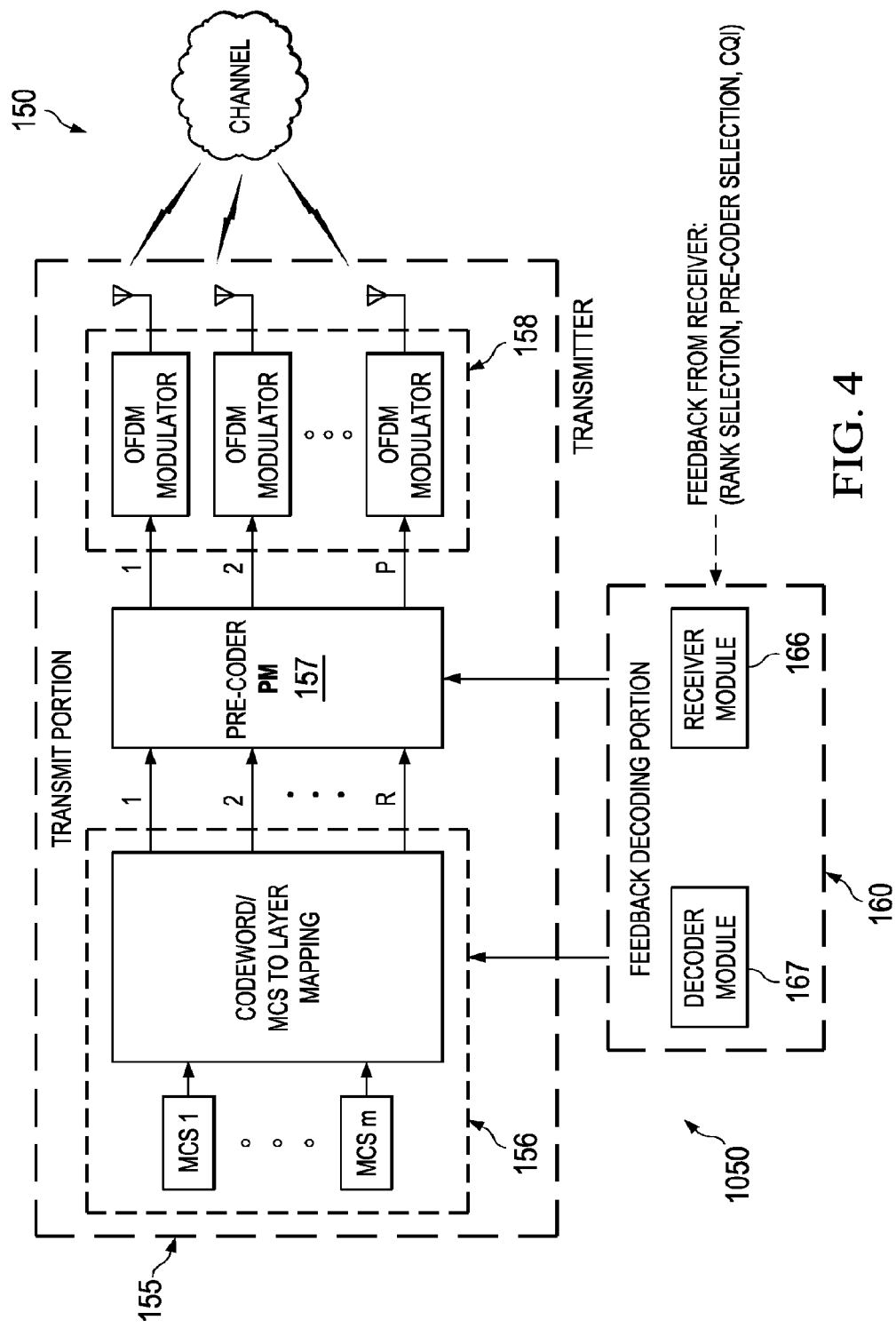
FIG. 4 is a system block diagram of a MIMO OFDMA transmitter improved as shown in the other figures.

The receive portion 105 in FIG. 3 receives data from a transmitter 150 of FIG. 4 based on a precoding matrix selection that was determined by the receiver 100 in FIG. 3 and fed back to the transmitter of FIG. 4. In FIG. 3, the OFDM module 106 demodulates the received data signals and provides them to the MIMO detector 107, which employs channel estimation 109 and precoding matrix information to further provide the received data to the module 108 for further processing (namely QAM demodulation, de-interleaving, and FEC decoding). The channel estimation module 109 employs previously transmitted channel estimation pilot signals to generate the channel estimates for receiver 100. The precoding matrix information can be obtained via an additional downlink signaling embedded in the downlink control channel or in a reference signal. Alternatively, the receiver 100 can obtain the precoding matrix information from the previously selected precoding matrix. In addition, the two sources can also be used in conjunction with each other to further improve the accuracy.

In FIG. 3, the precoding matrix selector 111 determines the precoding matrix selection for the data transmission based on the channel/noise/interference estimates from block 109. CQI is calculated based on the selected PMI. The precoding matrix selection and CQI are computed for the next time the user equipment UE of FIG. 3 is scheduled by the transmitter (e.g., a base station FIG. 4) to receive data. In FIG. 3, the feedback encoder 113 then encodes the precoding matrix selection and the CQI information and feeds them back separately encoded to the transmitter before the data is transmitted. In one embodiment, the precoding matrix selection is jointly encoded to achieve feedback transmission compression. For improved efficiency, the precoding matrix selection and CQI are jointly encoded into one codeword.

As discussed in connection with FIGS. 5-6C later hereinbelow, the precoding matrix selection corresponds to a grouping of frequency-domain resource blocks RBs employed by the receiver 100 of FIG. 3. A subband of the operating bandwidth corresponds to a collection of one or more RBs. One sub-band is defined as the smallest unit for precoding matrix selection and reporting. That is, the RBs may also be concatenated to form larger ones thereby fundamentally reducing the precoding matrix reporting overhead and the control channel overhead in the downlink that signals their allocated RBs to UEs that have been scheduled. The precoding matrix selection provides a single precoding matrix for each subband.

Actual selection of the precoding matrices depends on an optimality criterion, such as one related to the sum throughput that a subband provides. Alternatively, a worst case throughput or a specified maximum error rate for the subband or some other now-known, or future optimality criterion is employed.

The grouping of the resource blocks into subbands is variable or fixed depending of a level of signaling support available. For example, the grouping varies depending on the channel quality afforded by the resource blocks involved. Or, the grouping is fixed if the channel quality is high for the resource blocks involved. Those are only some examples for the faster variation. Slower variation can also be employed. For example, the subband size (the number of resource blocks within each subband) is fixed only throughout the entire communication session, or within each data frame. For faster variation, the downlink control channel is used to communicate the change in the grouping scheme. The slower variation can benefit from the downlink broadcast (common control) channel, which is transmitted less frequently, or higher layer signaling.

In general, the grouping scheme or the subband size used in UE in FIG. 3 is configurable by the network and/or the transmitter (base station of FIG. 4). It is also, possible, however, for the receiver (user equipment) to request the transmitter and/or the network for changing the grouping scheme/size. This request is suitably conveyed via a low-rate feedback (e.g., sparse physical layer feedback or higher layer feedback signaling). This is relevant when the downlink interference characteristic is highly frequency selective.

FIG. 4 illustrates a system diagram of a transmitter 150 in an OFDM communication system. The transmitter 150 includes a transmit portion 155 and a feedback decoding portion 160. The transmit portion 155 includes a modulation and coding scheme (MCS) module 156, a pre-coder module 157 and an OFDM module 158 having multiple OFDM modulators that feed corresponding transmit antennas. The feedback decoding portion 160 includes a receiver module 166 and a decoder module 167.

The transmit portion 155 is employed to transmit data provided by the MCS module 156 to a receiver based on pre-coding provided by the pre-coder module 157. The MCS module 156 takes m codewords (m is at least one) and maps the codeword(s) to the R layers or spatial streams, where R is the transmission rank and at least one. Each codeword consists of FEC-encoded, interleaved, and modulated information bits. The selected modulation and coding rate for each codeword are derived from the CQI. A higher CQI implies that a higher data rate may be used. The pre-coder module 157 employs a precoding matrix selection obtained from the feedback decoding portion 160, wherein the precoding matrix selection corresponds to a grouping of frequency-domain resource blocks employed by the receiver 100 of FIG. 3. The receiver module 166 accepts the feedback of this precoding matrix selection, and the decoder module 167 provides them to the pre-coder module 157.

Once the R spatial stream(s) are generated from the MCS module 156, a precoding matrix is applied to generate $P \geq R$ output streams. Note that P is equal to R only if R>1 since P>1 and R>1. The precoding matrix PM is selected by precoder module 157 from a finite pre-determined set of possible linear transformations or matrices, defined as the precoding matrix codebook, which corresponds to the set that is used by the receiver 100 of FIG. 3. Using pre-coding, the R spatial stream(s) are cross-combined linearly into P output data streams. For example, if there are 16 matrices in the precoding codebook, a precoding matrix index (PMI) corresponding to the index to one of the 16 matrices in the codebook for the subband (say 5, for example) is signaled from the receiver 100 by sending from UE of FIG. 3 to the eNB for use by transmitter 150 of FIG. 4 for the subband. The precoding matrix index PMI then tells the transmitter 150 which of the 16 precoding matrices to use.

Figure 5:
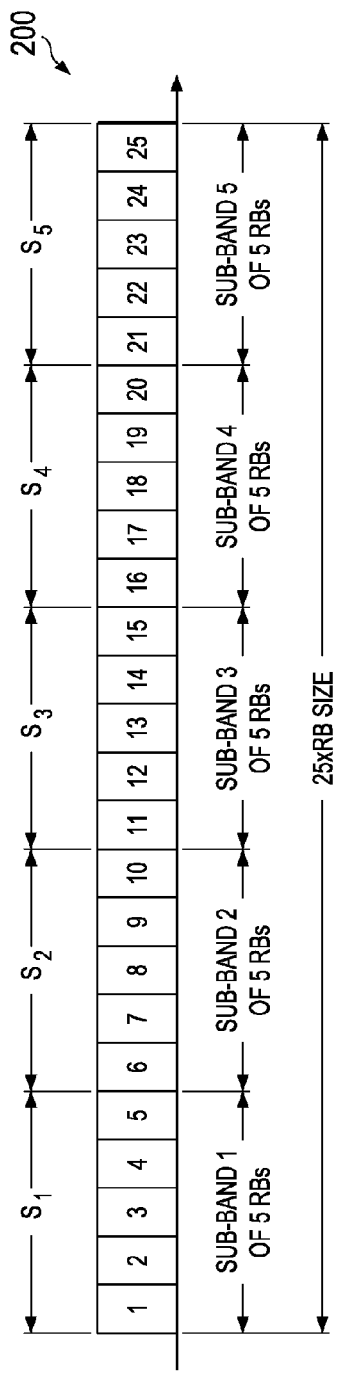
FIG. 5 is a diagram of resource blocks (RBs) in a spectrum of frequency associated with respective Precoding Matrix Index (PMI) values $S_1$-$S_5$.

FIG. 5 illustrates a diagram which includes five subbands of five frequency-domain resource blocks wherein a precoding matrix selection provides a single precoding matrix for each subband, as shown. In the context of the 3GPP E-UTRA, each of the resource blocks represents 180 kHz of bandwidth (each RB consisting of 12 OFDM/OFDMA sub-carriers) thereby giving a subband size of 900 kHz for each of first, second and third precoding matrices selected. This grouping may provide a practical grouping size for many applications.

Figure 6A:
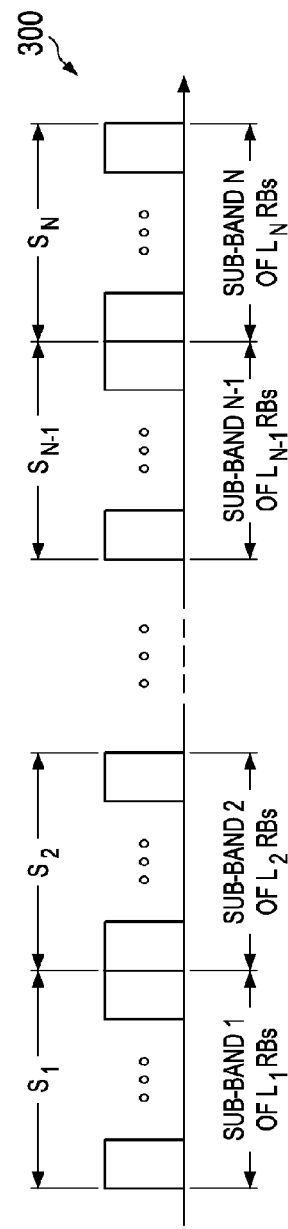
FIG. 6A is a frequency diagram of a more generalized grouping of resource blocks and PMI values.

FIG. 6A illustrates a diagram of a more generalized grouping of resource blocks 300 corresponding to the exemplary grouping of FIG. 5. Again, each subband of contiguous resource blocks has a single precoding matrix selected for the subband. The resource block grouping 300 corresponds to N subbands of L frequency-domain resource blocks, which represent a total of NL resource blocks for a channel. Some embodiments have the number L of resource blocks per subband equal for every subband. Other embodiments may vary the number L by subband, and FIG. 6A encompasses this possibility by subscripting number L by subband as $L_1$, $L_2, \ldots L_{N-1}, L_N$. The single precoding matrix is selected for each of the N subbands wherein the single precoding matrix is selected with respect to all of the L resource blocks in the subband. For example, the precoding matrix selected may provide a maximum sum throughput across all resource blocks within each subband. Feedback employs a preferred pre-coding matrix/vector for each group. That is, only one precoding matrix selection feedback is sent to the transmitter for each subband of L frequency-domain resource blocks. The total feedback in bits is represented by NB where each of the N precoding matrices employs B bits of feedback indicator ($B = \lceil \log_2 S_{PRE} \rceil$) where $S_{PRE}$ is the precoding matrix codebook size (the number of possible precoding matrices). Note that these feedback bits are typically protected with some coding scheme and the NB feedback bits can be jointly encoded.

Figure 6B:
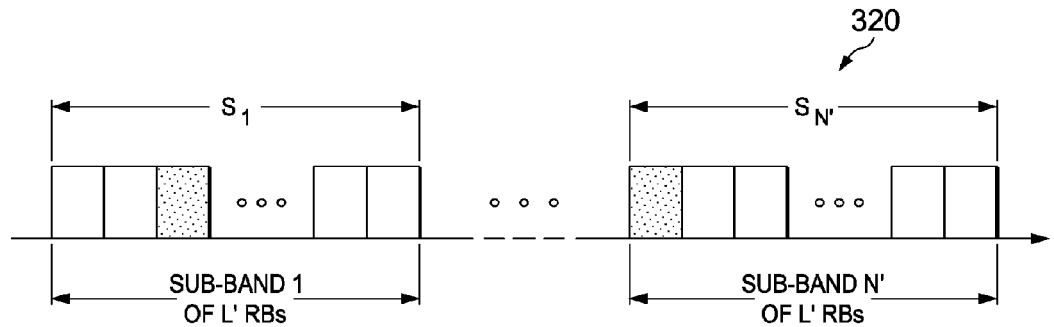
FIG. 6B is another frequency diagram of a grouping of resource blocks and PMI values.

FIG. 6B illustrates a diagram of another grouping of resource blocks 320 with a precoding matrix selection that provides a set of precoding matrices corresponding to a subgroup of resource blocks contained in each subband of contiguous resource blocks. The resource block grouping 320 corresponds to N' groups of L' resource blocks that represent a total of N'L' resource blocks for an entire band. Compared to FIG. 6A, the group size in FIG. 6B may be increased to gain pre-coding efficiency.

This embodiment is subband-based and provides the best M out of L' precoding matrices, where 1<=M<=L'. In this example, an M equal to one (M=1) is indicated in FIG. 6B. The M precoding matrices are selected for each of the N' subbands. Each of the M precoding matrices is selected with respect to one of the L' resource blocks that satisfies a certain optimality criterion. For example, if a maximum throughput per resource block is chosen, the M precoding matrices are picked that correspond the M resource blocks with maximum throughput.

Feedback employs M preferred precoding matrices or vectors for each subband. A pointer has values identifying each different possible combination of best M resource blocks for each subband of L' resource blocks. The number of such pointer values is equal to the number of combinations of L' things taken M at a time, expressed in symbols as: $(L'_M)$ The total feedback indicator in bits employing B bits per precoding matrix is represented by equation (1) below. These feedback bits can be jointly encoded.

$$(N'B+N' \log_2(L'_M)) \quad (1)$$

Figure 6C:
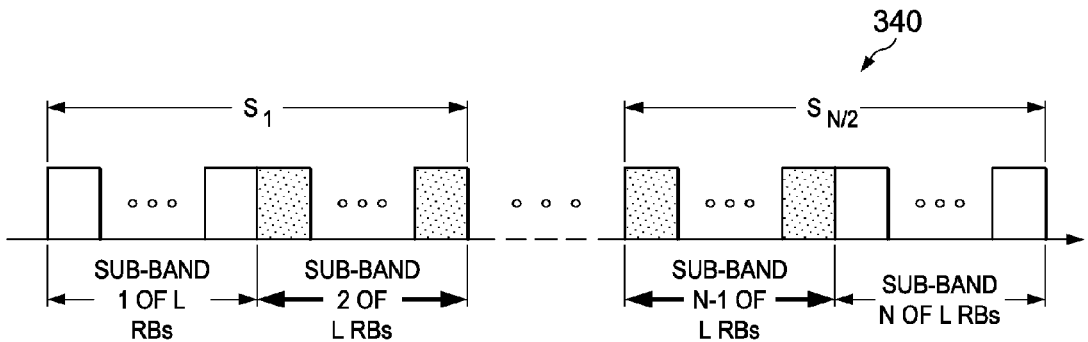
FIG. 6C is another frequency diagram of a grouping of resource blocks and PMI values.

FIG. 6C illustrates a diagram of a grouping of resource blocks 340 with a precoding matrix selection that provides a set of precoding matrices corresponding to a combination of groups of contiguous resource blocks. The resource block grouping 340 corresponds to N subbands of L resource blocks that represent a total of NL resource blocks for a channel. The N subbands are farther partitioned into N/M' sets of groups for further reduction in feedback. For example, M'=2 in FIG. 6C.

The best M out of M' precoding matrices are provided across an N/M' set of groups. In this example, a set of groups size M' equal to two and an M equal to one (M=1) are depicted in FIG. 6C. The M precoding matrices are selected for each of these sets of groups. Each of the precoding matrices is selected with respect to one group that satisfies a certain optimality criterion, e.g., a maximum sum (group) throughput across set of groups wherein M precoding matrices are selected that correspond to the M groups with maximum throughput.

Feedback employs a preferred precoding matrix/vector for each group, and pointers are employed to the best M groups for each super-group. The total feedback in bits employing B bits per precoding matrix is represented by equation (2) below. These feedback bits are jointly encodable.

$$((N/M')B+(N/M)\log_2(M'_M)) \quad (2)$$

In each of the embodiments of FIGS. 6A, 6B and 6C, other optimality criteria are suitably applied such as a worst case throughput or a specified maximum error rate.

Figure 7:
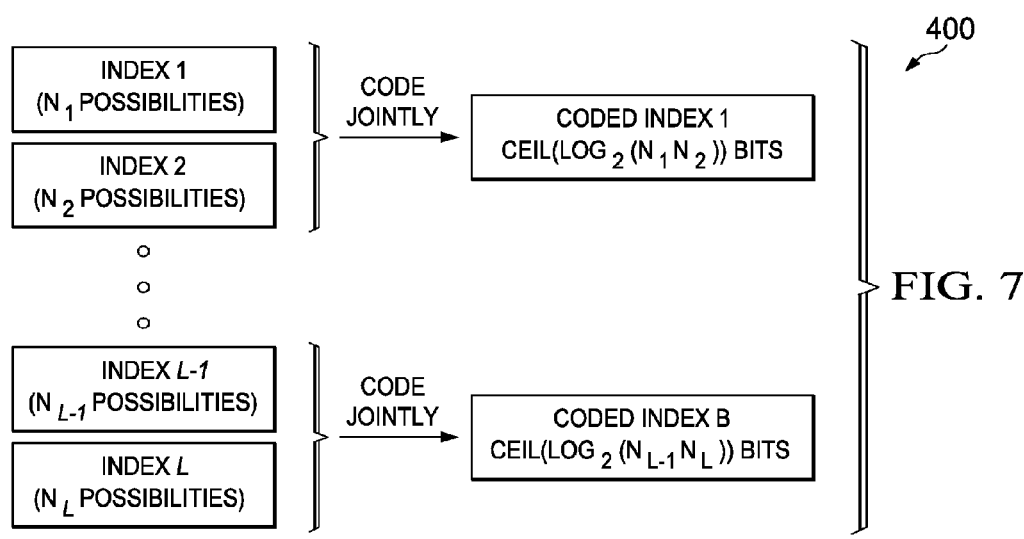
FIG. 7 is a flow diagram of joint coding of PMI values in pairs for PMI feedback transmission compression.

FIG. 7 illustrates a diagram of an embodiment of a precoding matrix selection 400 that is jointly encoded to achieve feedback transmission compression. The precoding matrix selection 400 includes L precoding matrix indices (PMI values) that comprise a precoding matrix selection for each of various subbands or RBs. A joint coding scheme is employed for a collection of PMIs that is uniquely specified employing a total number of bits to jointly code the indices.

For example, assume that four precoding matrix indices are fed back wherein each of them is drawn from a set of three possibilities (that is, the codebook size of 3). The upper limit needed is eight bits, i.e., 4 Ceil($\log_2 3$)=4×2=8 (Ceil means first integer greater than or equal to the argument). However, if this information is compressed together, there are only $3^4$ or 81 possibilities, and can be represented by seven bits, i.e., Ceil($\log_2 81$)=7. There are no two bits that represent each of the precoding matrices directly, and the entire seven bits need to be decoded to determine the precoding matrix information. However, compression of the feedback information is advantageously achieved. In general, this embodiment is advantageous not only when the codebook size is not a power of 2, but also in providing improved protection due to a more powerful coding. In addition, if a cyclic redundancy code (CRC) check is used, encoding over a larger number of bits reduces the overhead due to the CRC parity bits.

Figure 8A:
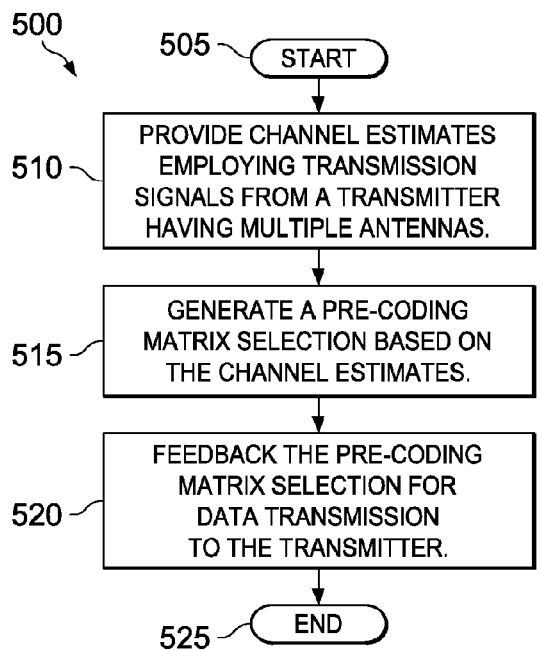
FIG. 8A is a flow diagram of PMI feedback, such as for use at a UE system, such as a cell phone handset.

FIG. 8A illustrates a flow diagram of an embodiment of a method 500 of operating a receiver in an OFDM or an OFDMA system and starts in a step 505. Then, in a step 510, channel estimates are provided employing transmission signals (e.g., reference or pilot signals) from a transmitter having a plurality of antennas. The channel estimates allow channel quality indicators to be determined for frequency-domain resource blocks that form a communications channel. As mentioned before, an example of channel quality indicators are signal to interference noise ratios (SINR) and mutual information.

A precoding matrix selection is generated that is based on the channel estimates and corresponds to a subband of frequency-domain resource blocks, in a step 515. In the illustrated embodiment, the precoding matrix selection provides a single precoding matrix for each subband of resource blocks. Alternatively, the precoding matrix selection may provide a set of precoding matrices corresponding to a subgroup of resource blocks contained in each subbands of resource blocks or a set of precoding matrices corresponding to a combination of subbands of resource blocks.

The precoding matrix selection is based on an optimality criterion such as the sum throughput for the grouping of resource blocks that it represents, a worst case throughput, or a specified maximum error rate. Additionally, the precoding matrix selection is based on a grouping of the resource blocks that is variable or fixed depending on a level of signaling support provided.

The precoding matrix selection for data transmission to the receiver is fed back to the transmitter in a step 520. The method 500 ends in a step 525.

Figure 8B:
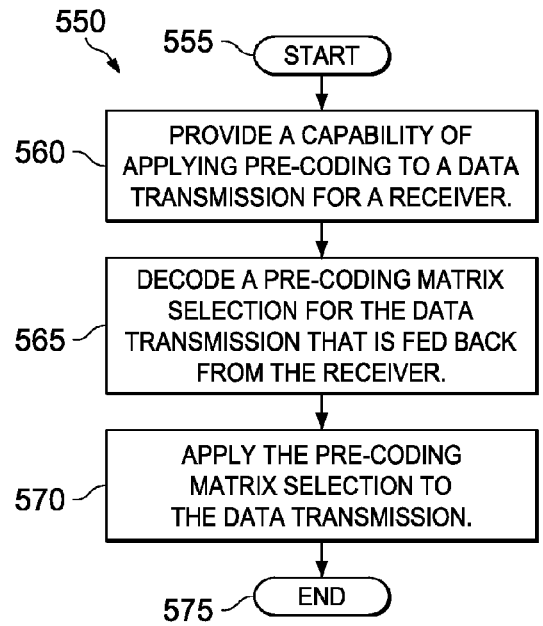
FIG. 8B is a flow diagram of precoding in response to the PMI feedback of FIG. 8A, for operating a transmitter such as at a base station (eNB).

FIG. 8B illustrates a flow diagram of an embodiment of a method 550 of operating a transmitter 150 having a plurality of antennas for an OFDM or an OFDMA system and that starts in a step 555. Then, in a step 560, the transmitter 150 provides a capability of applying pre-coding to a data transmission for a receiver 100. Pre-coding allows the data transmission to be efficiently applied to the receiver based on channel quality indicators (such as a signal to interference noise ratio) that are obtained from the receiver 100.

The precoding matrix selection for the data transmission is decoded in a step 565. The precoding matrix selection in the step 565 is fed back from the receiver and corresponds to a grouping of frequency-domain resource blocks employed by the receiver. In one embodiment, the precoding matrix selection is jointly coded in the feedback to achieve feedback compression from the receiver.

In one embodiment, the receiver may provide the precoding matrix selection as a single precoding matrix for each subband. Alternatively, the precoding matrix selection is provided as a set of precoding matrices corresponding to a subgroup of resource blocks contained in each group of contiguous resource blocks or as a set of precoding matrices corresponding to a combination of groups of resource blocks.

Additionally, the grouping of the resource blocks is either variable or fixed based on signaling support provided between the transmitter 150 and the receiver 100. In each of these cases, the precoding matrix is based on a sum throughput, a worst case throughput or a specified maximum error rate for each of resource blocks. The precoding matrix selection is applied to the data transmission to the receiver 100 in a step 570 and the method 550 ends in a step 575.

Precoding matrix selection feedback bits corresponding to the techniques given in this invention can also be jointly encoded with the channel quality indicator (CQI) bits to achieve further compression and coding efficiency. It is further possible to jointly encode the two combinations with at least one other receiver feedback such as rank selection and/or ACK-NACK feedback. It is further possible to separately encode the rank selection feedback bits with the jointly encoded CQI plus precoding matrix selection bits where the rank selection feedback information serves as the codeword size indicator of the jointly encoded CQI plus precoding matrix selection information.

Figure 9:
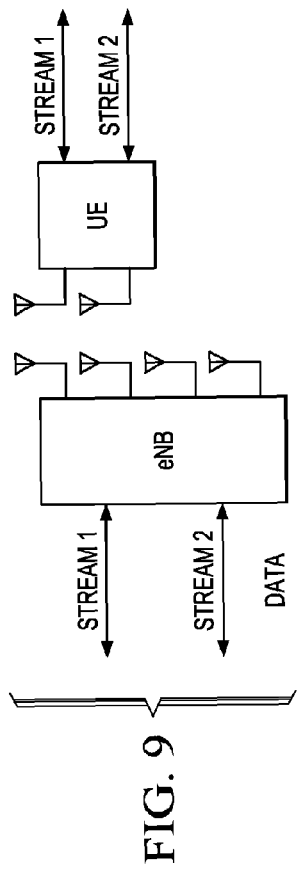
FIG. 9 is a block diagram of a MIMO wireless communications system having multiple antennas on each of a base station eNB and a UE.

In FIG. 9, suppose there are four (4) physical antennas at eNB and two (2) physical antennas at UE. UE may report preferred rank 1 or 2, for instance. Each receive antenna receives all information streams. Hence, any RX antenna ordinarily receives signals transmitted from all TX antennas (on the same RB). At the UE, such as a mobile handset, the signals on all receive antennas are jointly processed using matrix methods to separate and to decode the multiple input information streams x for each RB allocated by eNB to UE.

UE uses eNB pilot signals and estimates a subband-specific or RB-specific channel coefficient matrix H for each sub band or RB in the downlink. The channel coefficient matrix H expresses how a radio link wirelessly couples every TX antenna and every RX antenna. The base station has a precoding matrix PM, where x=PM s and x represents stream allocation or combination to each transmit antenna and s represents vector of information streams. If a vector y specifies the information stream emanating from each receive antenna, then y=H PM s+n, where n is a channel noise vector. UE then determines an optimum precoding matrix for the subband from the precoding matrix codebook, and reports back the index (PMI value) of that entry for that subband. The list of PMI values determined by a given UE for each of the N subbands respectively, is called a PMI vector S herein (do not confuse with lower-case s above.) PMI is suitably reported by each UE independent of number of UEs, demands of other UEs on the system, and propagation conditions to other UEs.

Figure 10:
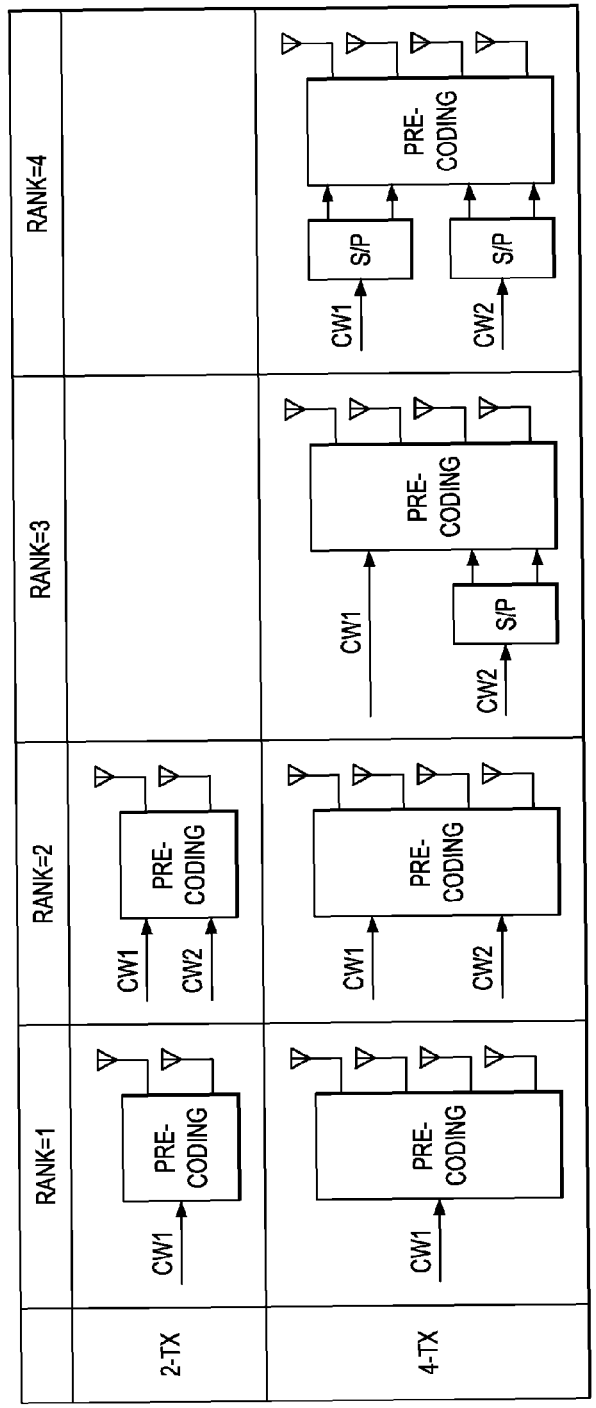
FIG. 10 is a set of block diagrams of transmitters arranged in tabular form, with rows for different numbers of antennas, and columns for different values of transmission rank.

FIG. 10 shows different ranks used with different numbers of antennas at a transmitter. For some background, see U.S. Patent Application Publication 2007-0217540 "A Pre-Coder Selection Based on Resource Block Grouping" of Sep. 20, 2007, and corresponding U.S. patent application Ser. No. 11/688,756 (TI-62290) filed Mar. 20, 2007.

Overall a procedure for operating a MIMO network is suitably established as follows.

1A) UE estimates the downlink channel H (by cell-specific reference signal or pilot symbols) on a subband specific basis.

1B) UE then chooses the preferred or optimal subband-specific precoding matrix based on H.

1C) UE efficiently reports PMI feedback to eNB using a rank/PMI vector instead of a precoding matrix itself. Each of the different UEs as in FIG. 11 feed back rank/PMI independently of the other UEs.

2) Each particular UE reports rank/PMI for the entire bandwidth. Alternatively, each particular UE can be configured to provide a compressed PMI report corresponding to a portion of the system bandwidth or a selected subset of the subbands. PMI values for subbands over the entire bandwidth or the selected subset constitute a PMI vector as in FIG. 14. A receive block 2110 in eNB 1050 delivers compressed received information to a PMI Reconstructor 2120 which recovers the PMI vector S. In some embodiments the UE has a Reconstructor 118 locally that is based on PMI Reconstructor 2120 in the remote eNB.

Figure 12:
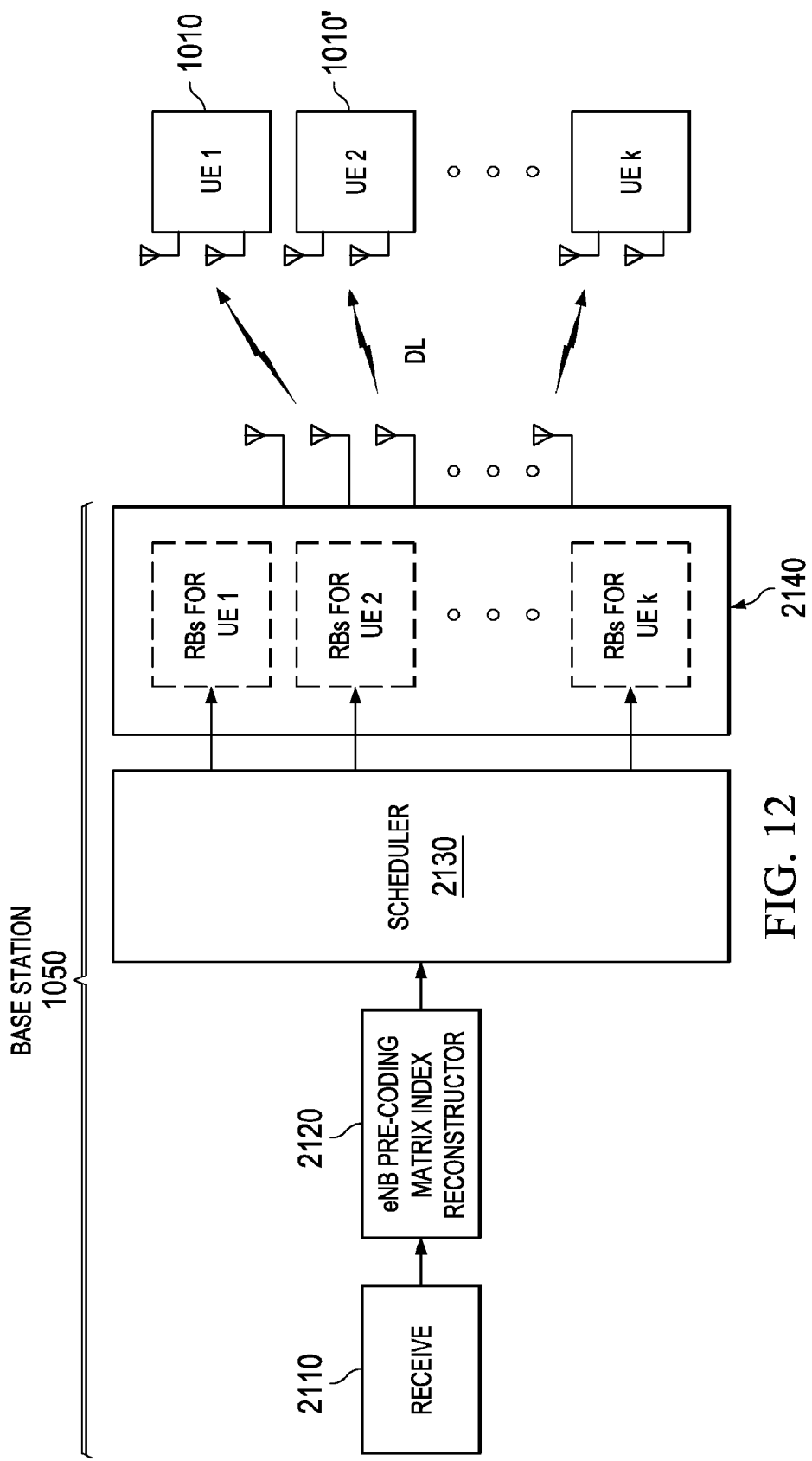
FIG. 12 is a block diagram of an inventive receiver transmitter such as for use in a base station eNB, shown wirelessly coupled to numerous UEs.

3) eNB in FIG. 12 performs downlink scheduling 2130 to decide which RB is given to which UE. Scheduling is based on the downlink DL data traffic independent of PMI feedback.

4) eNB then applies downlink precoder 2140 to generate precoding matrix PM based on the UE feedback rank/PMI S for each RB assigned by eNB scheduler 2130 to that UE. MIMO communications over the downlink DL are thereby optimized and customized for $UE_1$ 1010, $UE_2$ 1010', ... $UE_k$. eNB does not need to know channel coefficient matrix H estimated by any UE.

5) UE decodes the received signal y=H PM s into multiple information streams with improved SNR, less fading, or other improved channel performance metric.

In FIG. 12, the base station 1050 resolves potentially contending requests for bandwidth from the UEs by a hardware and or process module called a scheduler 2130. Downlink DL data stream assignment is an eNB scheduling issue, and in general not directly based on PMI feedback.

Each UE reports individually recommended PMI for every RB or sub-band determined as a function of the channel conditions being experienced by that UE. In some embodiments, UE does not need to know a priori which RB will be used by base station eNB 1050 in its downlink DL data transmission to the UE as such decision is made by the eNB scheduler 2130 and the UE sends back a comprehensive PMI vector for subbands independent of scheduler allocation. In some other embodiments (FIG. 27B), some of the allocation information pertinent to UE is provided by eNB and used by UE for PMI feedback purposes.

Figure 11:
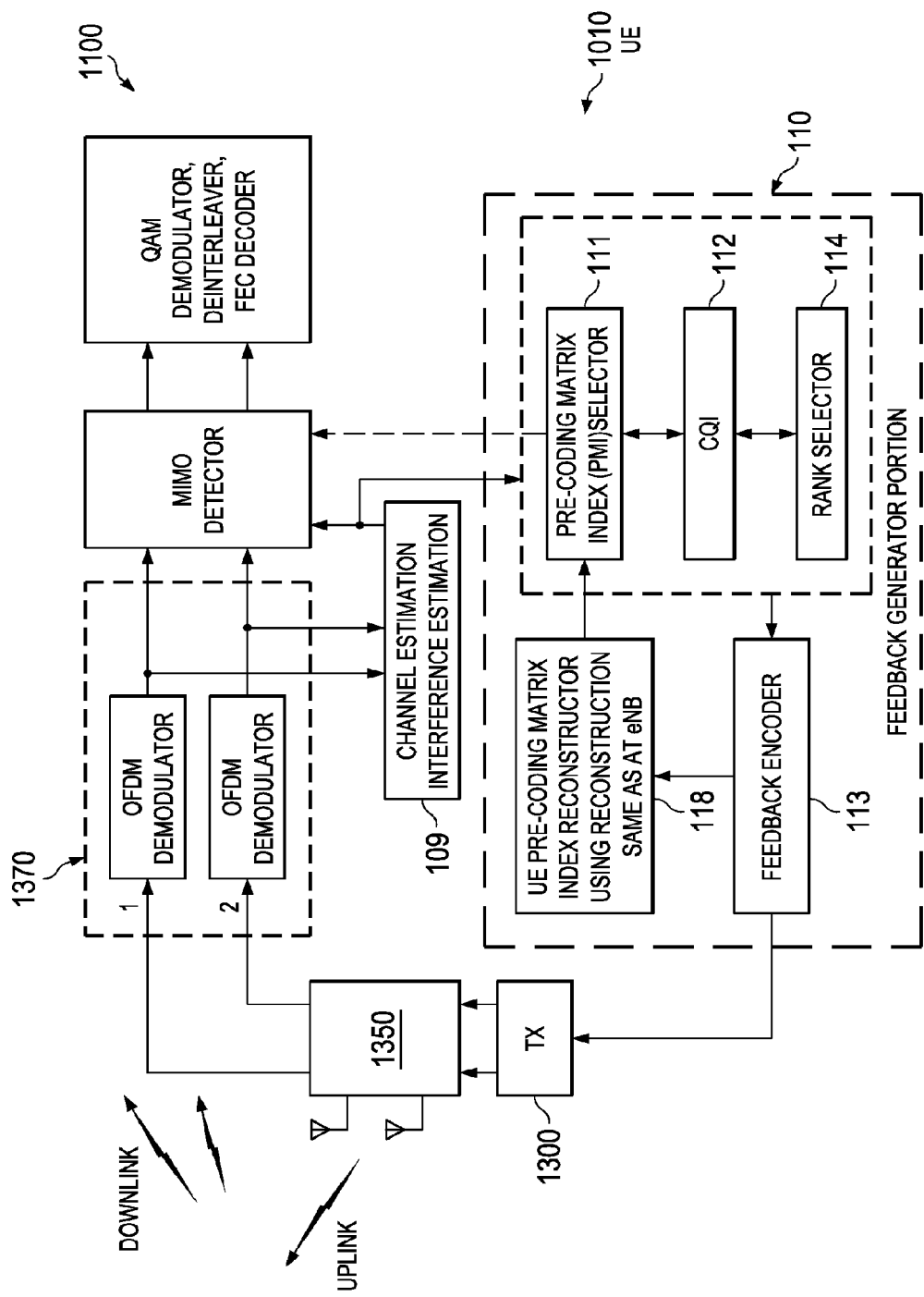
FIG. 11 is a block diagram of an inventive receiver transmitter such as for use in a UE.
Figure 13:
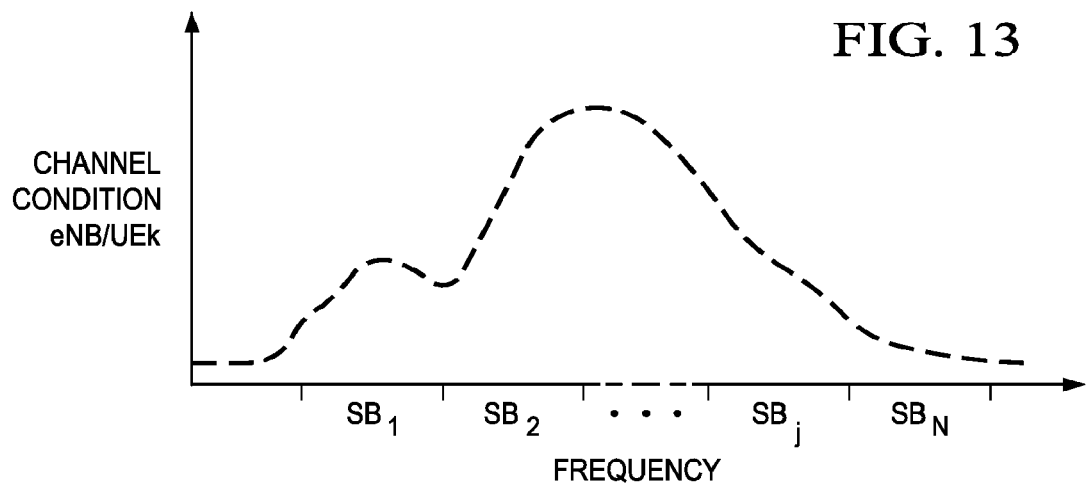
FIG. 13 is a hypothetical graph of channel condition metric CQI versus frequency sub-bands.
Figure 14:
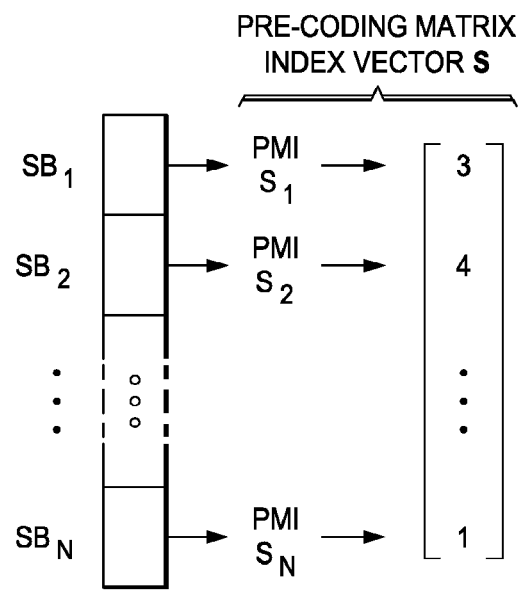
FIG. 14 shows a PMI vector S of PMI values generated by a UE and associated with the frequency sub-bands of FIG. 13.

In FIGS. 11 and 14, to support MIMO operation, rank and PMI reports are used to send the preferred rank and PMI information to the NodeB. In FIGS. 5 and 13, the total operating bandwidth is divided into a number of resource blocks (RBs). A subband size in FIG. 13 e.g. 2RB or 5RB, etc. is established by configuration to define groups or subbands including plural RBs. Different subband sizes are suitably used in different embodiments or in different modes of the same embodiment. One preferred PMI is selected by UE for each sub-band. For OFDMA and MIMO OFDMA, each UE in FIG. 11 feeds back its preferred PMI for each sub-band to its serving base station (Node B). Efficient PMI feedback techniques herein beneficially compress the amount of overhead incurred, especially when the system bandwidth collectively requested by many UEs becomes high. The description herein shows how to exploit this channel property and provides specific PMI compression modes or methods to reduce the PMI feedback overhead in the uplink (UL).

Feedback of rank and PMI from a UE lets base station eNB know what rank/PMI should be used in the downlink, if there will be data transmission to this UE. How much bandwidth is assigned to a UE is decided by the eNB scheduler 2130. The product of amount of bandwidth times the amount of time of transmission results in the amount of information conveyed by eNB 1050 to the $UE_i$.

In FIG. 12, the actual pre-coding matrix established by the base station downlink precoder 2140 is specified on an RB-by-RB basis in downlink pre-coder 2140 so that there are several pre-coding matrices used by the base station to actually form the transmission into the downlink to various UEs. Each UE reports rank/PMI for itself for subbands over the whole bandwidth. The PMI vector, earlier identified to eNB by that UE for subbands over the entire downlink band linking eNB to that UE, specifies codebook indexes of pre-coding matrices corresponding to each of the sub-bands respectively. Suppose the eNB scheduler 2130 assigns one or more RBs in a given sub-band to one UE. With the feedback PMI from that UE communicated by a feedback PMI vector element, eNB can use the feedback PMI for configuring its transmissions to that UE in the RB(s) allocated to that UE in downlink DL. Base station eNB uses multiple downlink DL precoding matrices, respectively identified by their codebook index fed back by UEs, each index of which applies to a subband including RB(s) allocated to the corresponding UE. The exact precoding granularity may vary (for example, every 2RBs), and the granularity is decided by eNB. Several pre-coding matrices for the various RBs as determined by eNB use selected part(s) of each PMI vector specified by the respective UEs.

For a given RB assigned by scheduler 2130 to a particular UEi, the eNB selects the particular precoding matrix index in the PMI vector feedback from that UE for the sub-band in which the assigned RB is situated. Then eNB applies that precoding matrix for purposes utilizing the assigned RB for transmitting to that UE. For transmitting to a plurality of UEs overall, the eNB precoder 2140 of FIG. 12 constructs a pre-coding matrix PM as an array or composite collection of respective such pre-coding matrices selected for the various RBs from the PMIs identified by the UEs, so that the resulting transmission from eNB accommodates and optimizes for the various downlink conditions pertaining to the respective UEs.

The computational burden or complexity of encoding/decoding PMI is acceptable and may for some processes even entail only logic operations, numerical additions and shifts. The computational complexity increase is marginal compared to the benefit achieved from reducing the feedback overhead in the communications channel. With many UEs in a wireless communications system sending feedback to a base station, it is desirable to avoid any unnecessary congestion and instead provide intelligent and smartly compressed feedback from each UE. Compressed PMI information is suitably sent in the uplink control channel in the form of control information, or sent together with uplink data in a physical uplink shared channel.

Multiple users each having MIMO handsets are handled by the base station scheduler 2130 so that different users occupy different RBs in DL transmission using frequency-domain multiplexing. Different users can also be scheduled at different time instances. For example, UE1 can be scheduled in RB1 in a $1^{st}$ subframe of RB1, UE1 can be also scheduled in RB2 in a $1^{st}$ subframe of RB2, and UE2 can be scheduled in RB2 in the $2^{nd}$ subframe of RB2. The subband-specific precoding matrix (matrices) identified by PMI and fed back by UE 1 are applied to resource blocks RB1 and RB2. The analogous PMI from UE2 is applied to establish the eNB precoding matrix for the second subframe of RB2.

One form of codebook has a set of precoding matrices that are generated using a rotation matrix approach, a Householder matrix or other appropriate matrix approach. Selections of such precoding matrices for various RBs are assembled into the overall precoding matrix PM by precoder 2140. For background on such codebooks, see incorporated U.S. Patent Application Publication 2008-0037675 "Codebook And Pre-Coder Selection For Closed Loop MIMO" of Feb. 14, 2008, and corresponding U.S. patent application Ser. No. 11/893,045 (TI-63186) filed Aug. 13, 2007. For example, let a Householder codebook for LTE have 16 codewords for each rank. Then use 4 bits to code any one of the 16 codewords ($2^4$) for each PMI vector feedback for N subbands, resulting a total of 4N bits for PMI feedback. But this feedback mechanism has undesirably high feedback overhead.

Figure 14A:
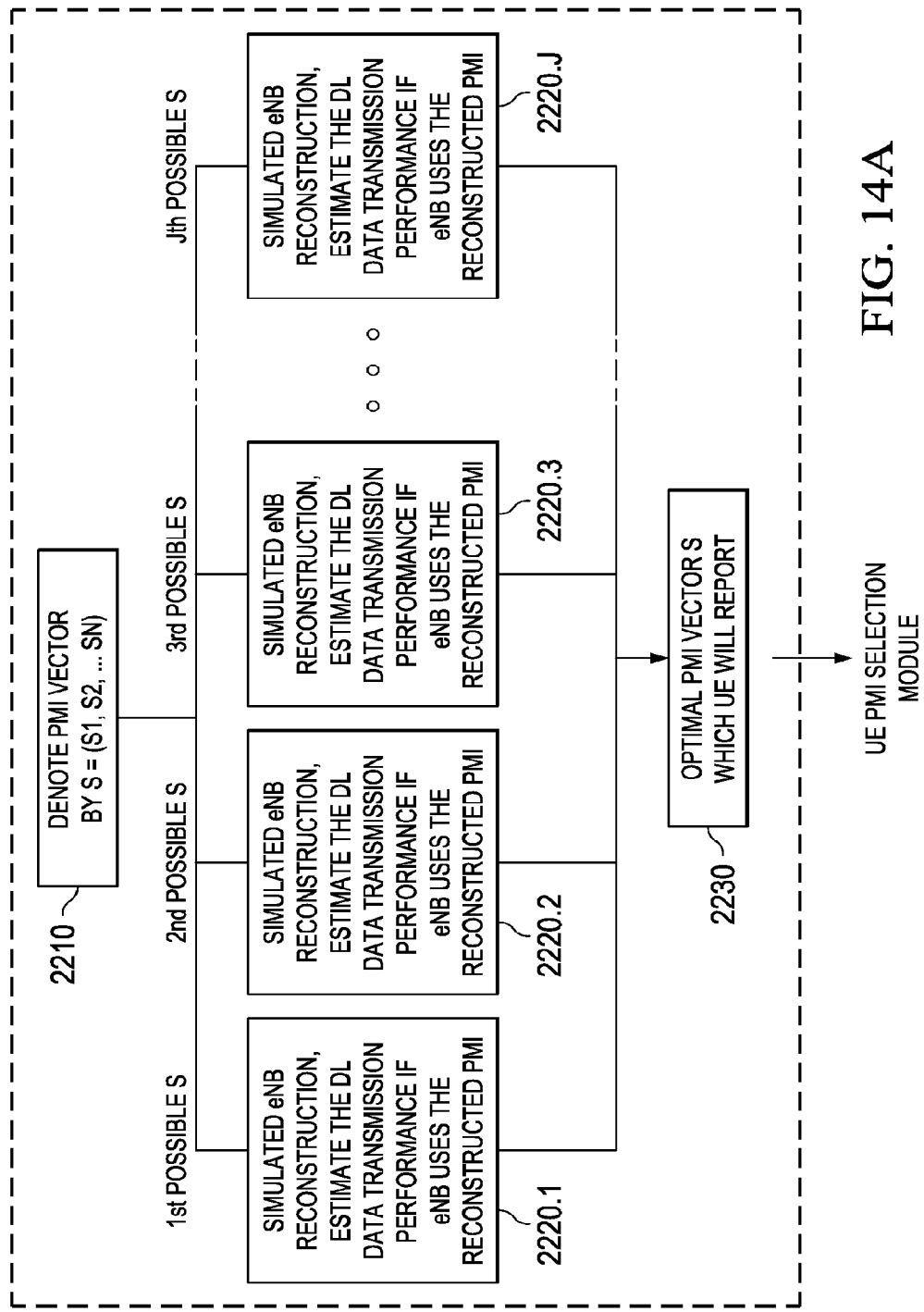
FIG. 14A is a flow diagram of an inventive PMI feedback process such as for use in the inventive apparatus of FIG. 11.

In FIG. 14A, a process embodiment operates the system of FIG. 11. In a step 2210, denote a PMI vector by $S=(S_1, S_2, S_3, \ldots S_N)$. Without loss of generality, assume there are J possible PMI vectors which UE could report. Then a set of processes 2220.1, 2220.2, 2220.3, ... 2220.J are provided, and shown parallelized for example (serial execution is also feasible in some embodiments). In a representative such process 2220.J, assuming that the $J^{th}$ PMI vector is reported by the UE, reconstructor 118 of FIG. 11 in UE simulates a process of PMI reconstruction of PMI vector in base station eNB, and estimates the downlink DL data transmission performance expected if eNB uses the reconstructed PMI. Using an iterative process or a process of exhaustive search over a region of PMI values, the steps 2210 and steps 2220.1-.J are executed in a loop until determination in a step 2230 of an optimal PMI vector S which UE will report and deliver as output of the UE PMI selection module 111.

Figure 15:
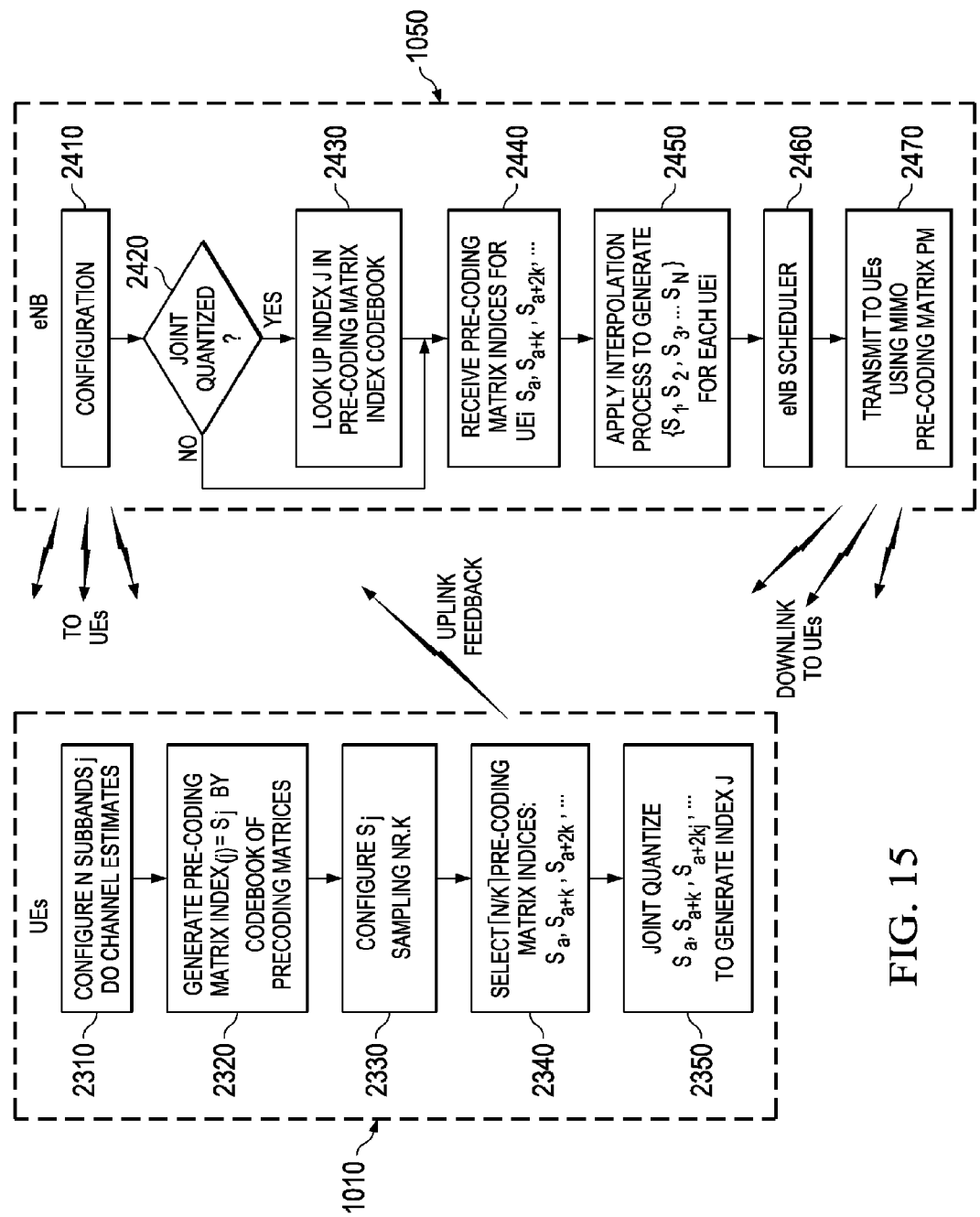
FIG. 15 is a pair of side-by-side flow diagrams of an inventive UE and inventive eNB involving a down sampling PMI feedback process in UE and an interpolation process at eNB to reconstruct the PMI feedback for use by the eNB.

In FIG. 15 using what is called down-sampled feedback herein, the UE instead feeds back quantized versions of every $K^{th}$ PMI. Note that only $\lceil N/K \rceil$ values i.e., Ceil(N/K) values, are fed back, instead of N values in complete feedback. The Node-B uses some type of interpolation function (e.g. linear, cubic spline, sinc, geodesic) to obtain the PMI in each non-reported sub-band. Some embodiments interpolate on the PMI (codebook indices) themselves, and some other embodiments interpolate using the precoding matrices that are entries in the codebook corresponding to reported PMIs. For example, with K=2, the UE suitably feeds back PMI $\{S_1, S_3, S_5 \ldots\}$ or PMI $\{S_2, S_4, S_6 \ldots\}$. Node B uses interpolation among $\{S_1, S_3, S_5 \ldots\}$ to obtain $\{S_2, S_4, S_6 \ldots\}$ or the opposite, respectively.

In FIG. 15, a step 2310 in each UEi configures N sub-bands j as called for by information prestored in flash memory in UEi or by configuration commands from a configuration process 2410 in base station eNB. Also, step 2310 performs channel estimates and determines recommended precoding matrices for each sub-band. Then a step 2320 in UEi generates PMI values PMI(j)=Sj by accessing a precoding matrix codebook that maps each of the precoding matrices to a corresponding PMI (index) value. A succeeding step 2330 configures the downsampling number K as called for by information prestored in flash memory in UEi or by configuration commands from the configuration process 2410 in base station eNB. Next a step 2340 actually downsamples or selects the $\lceil N/K \rceil$ PMI values $(S_a, S_{a+k}, S_{a+2k}, \ldots)$ from all the PMI values generated in step 2320. For instance, a=1, k=2 specify downsampled PMI vector $(S_1, S_3, S_5, \ldots)$; and a=2, k=2 specify $(S_2, S_4, \ldots)$. Some embodiments send the downsampled $\lceil N/K \rceil$ PMI values themselves as feedback on uplink UL. Some other embodiments include a further step 2350 in UEi that jointly quantizes the downsampled $\lceil N/K \rceil$ PMI values by looking up that set of values in a UE PMI vector codebook of FIG. 25A, finding a codebook index value J corresponding thereto, and transmitting the codebook index value as the feedback on uplink UL.

Further in FIG. 15, at base station eNB a step 2420 determines whether the downsampled feedback from UEi is the $\lceil N/K \rceil$ PMI values from step 2340 or is represented by the codebook index value from step 2350. If from 2350, the codebook index value J is looked up in step 2430 to recover downsampled PMI vector ($S_a$, $S_{a+k}$, $S_{a+2k}$, ... ) at step 2440 using an eNB PMI vector codebook (see eNB PMI codebook 1 of FIG. 25A) that is a copy of the UE PMI vector codebook used in step 2350. If feedback is from UEi step 2340 instead, as determined by eNB step 2420, then operations go directly to step 2440 to recognize the downsampled PMI vector ($S_a$, $S_{a+k}$, $S_{a+2k}$, ... ). After step 2440, a step 2450 applies an interpolation process to reconstruct and estimate a full-length PMI vector for that UEi and operate analogously to obtain full-length PMI vectors respectively. A further step 2460 performs eNB scheduling by scheduler 2130 of FIG. 12 to determine the allocation of RBs to the UEs. Precoder 2140 of FIG. 12 in a step 2470 accesses eNB pre-coding matrix PM codebook 2 of FIG. 25A and constructs the composite precoding matrix PM and transmits information streams to the UEs using MIMO precoding matrix PM.

Figure 16:
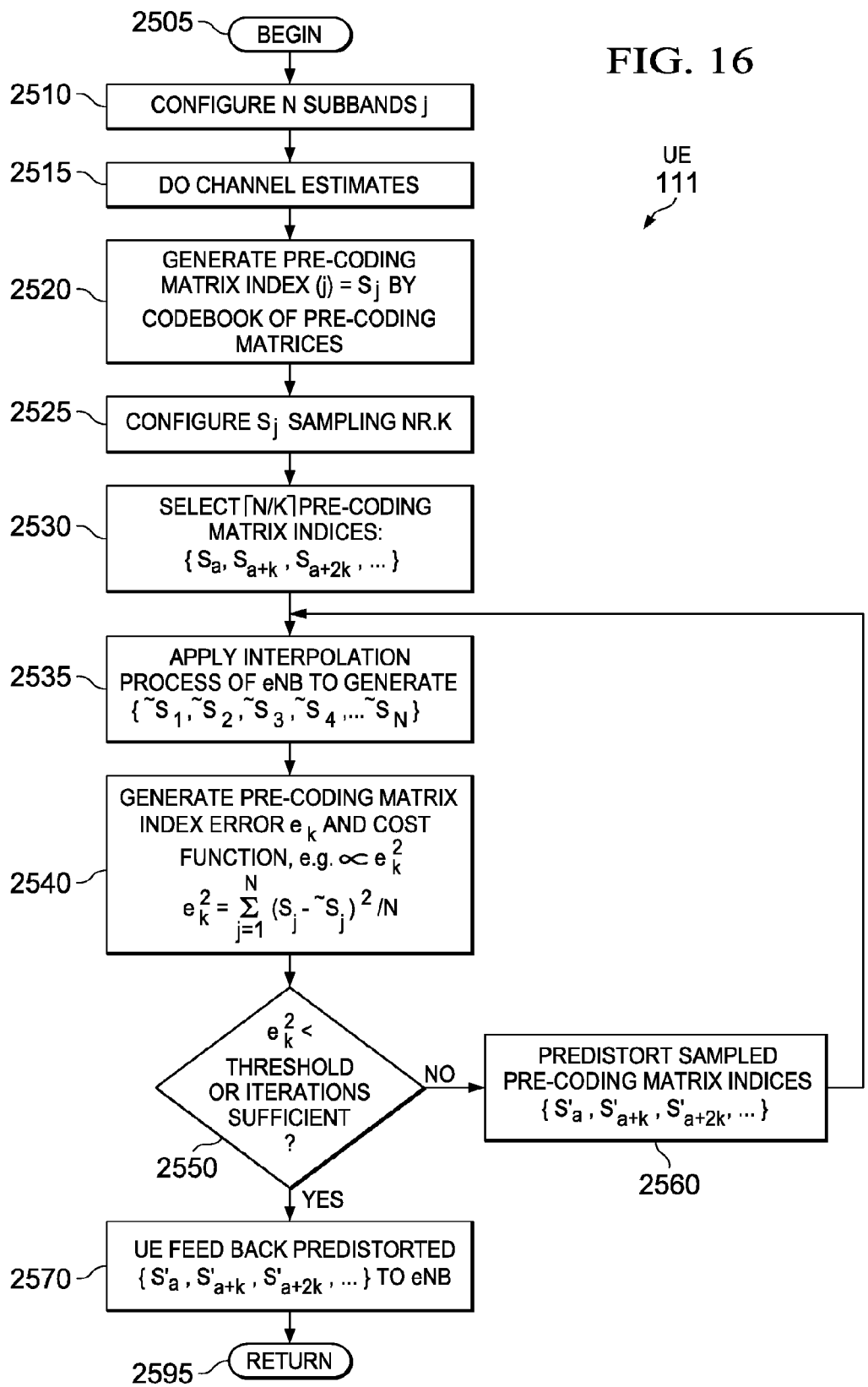
FIG. 16 is a flow diagram of an inventive process for down sampling PMI feedback with predistortion, such as for use in UE.

In FIG. 16 in what is called predistorted down-sampled PMI feedback herein, a UE feeds back the reduced number ⌈N/K⌉ of values as in down-sampled feedback. Moreover, the UE is provided with further knowledge of the interpolation used by the node-B to reconstruct the PMI using reconstructor 118 of FIG. 11. Note that such knowledge is typically established, delivered, provided or otherwise made available through one of the following methods: 1) The reconstruction mechanism may be specified in a standard, either explicitly or implicitly since the reconstruction and feedback generation mechanisms may be related. 2) The reconstruction mechanism is dependent on the UE's geometry or other feedback quantities that UE has stored or can derive or obtain. 3) The reconstruction mechanism is signaled to the UE either individually or through higher layer signaling or as a network cell parameter.

In this way, the UE has information to mimic the reconstruction mechanism used by the Node-B, so UE predistorts the fed back PMI quantities to reduce, minimize, or optimize the error in the reconstructed PMI. Note that different optimization criteria are alternatively used in various embodiments. Let $e_k$ represent the PMI error in the k$^{th}$ sub-band. Then UE estimates $e_k$ because UE has both the actual PMI S and the reconstructed PMI S' based on its own proposed feedback. Then, examples of optimization cost function that are suitably adapted, among other possibilities, are: 1) mean of $e_k^2$ across all sub-bands, 2) Max of $e_k^2$ across all sub-bands, or 3) maximum of some other function of $e_k$. For example, another function in the latter case (3) pre-computes the downlink data throughput degradation at the Node B due to PMI distortion and uses the pre-computed throughput degradation as the cost function. The UE can predistort its PMI feedback values so that the chosen cost function is optimized.

In FIGS. 16 and 11, a structure and process to pre-distort PMI indices is shown. In FIG. 11, precoding matrix index (PMI) selector 111 is coupled to receive an output from a PMI reconstructor 118. PMI reconstructor 118 of FIG. 11 uses a reconstruction process such as step 2535 of FIG. 16 that is the same as or substantially tracks that used by PMI Reconstructor 2120 in base station eNB of FIG. 12. PMI reconstructor 118 has an input coupled to the UE PMI selection either by way of feedback encoder 113 or directly from the output of PMI selector 111.

In FIGS. 11 and 18, the reconstruction process in both eNB and PMI reconstructor 118 of UE does not necessarily assign the UE-requested rank/PMI_UE to downlink DL RBs granted by eNB to UE. Instead base station eNB can derive and assign a different rank/PMI_eNB value other than rank/PMI_UE. There are several cases where PMI_eNB can be different from PMI_UE:

1. eNB decodes the UE-reported PMI incorrectly and thus incurs PMI distortion; or
2. eNB determines to override the UE-reported PMI, and use some pre-defined PMI(s), because eNB is not enforced to always follow the UE-reported PMI; or
3. eNB determines to override the UE-reported rank, but either follows the UE-reported PMI or overrides it as well. When the transmission rank adopted at eNB is different from the transmission rank reported by UE, the exact precoding matrices at eNB are also likely to be different from the precoding matrices recommended by the UE.

Note that a PM codebook (FIG. 25A PM codebook 2, see precoder 2140 of FIG. 12) is likely to have different ranks with many precoding matrices in each rank codebook. Hence, different precoding matrices in the respective codebooks for different ranks may have the same PMI value, and when the base station eNB chooses a particular precoding matrix in a codebook for a rank other than reported by UE, that particular precoding matrix may have the same PMI value or a different PMI value depending on how the codebook was constructed and indices (PMI values) were assigned.

In FIG. 16, PMI selector 111 together with PMI reconstructor 118 cooperate so that PMI selector 111 pre-distorts the PMI value(s) and thereby assigns the precoding matrix indices (PMIs) to the pre-coding matrices in the codebook so that the predistortion will be effective as verified by feedback from PMI reconstructor 118. UE PMI selector 111 performs precoding matrix selection to obtain the preferred PMIs, denoted by PMI_UE. UE PMI reconstructor 118 also knows the PMIs reconstructed at the eNB denoted by PMI_eNB, since PMI reconstructor 118 has a priori knowledge of the reconstruction algorithm. UE takes into account the PMI distortion (PMI_eNB−PMI_UE) when predistorting, choosing or altering PMI_UE, to maximize the downlink DL transmission performance. Different distortion metrics are suitably used, for example, in some embodiments UE chooses PMI_UE to maximize either 1) DL throughput when PMI_eNB is used in DL transmission, or 2) downlink DL SNR, or median DL SNR, or ratio of maximum/minimum DL SNR, when PMI_eNB is used in DL transmission or 3) other applicable metric as discussed elsewhere herein.

Since PMI is defined as the indices to the precoding matrices, $e_k$ is suitably defined as the difference between reconstructed and proposed feedback of values of such indices. $e_k$=PMI_eNB−PMI_UE. It should be noted that the exact way to write $e_k$ is varied in different embodiments. UE is desirably enabled to calculate a performance difference Delta_Performance in DL transmission so that with predistortion PMI1_UE there will result in a calculated desirable or improved performance level compared to no predistortion PMI_UE due to reduced error $e_k$=PMI'_eNB−PMI_UE. In such case, then the predistorted PMI value PMI1_UE is actually provided instead of PMI_UE to the feedback encoder 113 in FIG. 11 and delivered to the UE transmitter for transmission back to the actual base station eNB.

Delta_Performance=Performance (*PMI'_eNB* using Predistorted *PMI1_UE*)−Performance (*PMI_ eNB* using original *PMI_UE*).

In different embodiments, "PMI error" can refer to the index difference PMI_eNB−PMI_UE, and in some embodiments refers instead to some measure of precoding matrix disparity between the actual eNB precoding matrix for an RB based on the PMI feedback and the original precoding matrix identified by UE itself as best for the subband containing the RB. Both are feasible. UE is structured herein to optimize the downlink DL performance predicted when a given precoding matrix tabulated in the codebook with index PMI_eNB is used for downlink DL transmission responsive to transmission from UE to eNB of a given PMI vector. Pre-distortion replaces what would have been a first value of the PMI value PMI_UE output from PMI selector 111 without help of PMI Reconstructor 118, and puts in its place another PMI value PMI1_UE, called the pre-distorted value that benefits from PMI Reconstructor 118. Encoder 113 has or is a circuit that initiates a transmission communicating a compressed form of the PMI feedback. The pre-distorted value PMI1_UE when actually sent from UE to eNB can desirably result in eNB sending back an information stream with a better downlink DL performance that would have been observed if UE had sent the original PMI value PMI_UE.

In FIG. 16, a Predistorted downsampled PMI feedback process embodiment is illustrated. In FIG. 16, operations commence with a BEGIN 2505, configure N sub-bands j in a step 2510, and proceed to do channel estimates in a step 2515. A step 2520 in UEi generates precoding matrix index values PMI(j)=Sj, i.e., a PMI vector $\{S_1, S_2, S_3 \ldots S_N\}$ for N sub-bands. A succeeding step 2525 configures the downsampling number K as called for by information prestored in flash memory in UEi or by configuration commands from the configuration process 2410 in base station eNB. Next a step 2530 downsamples or selects the [N/K] PMI values ($S_a$, $S_{a+k}$, $S_{a+2k}$, ...) from all the PMI values generated in step 2520. A succeeding step 2535 in UEi applies the reconstruction 118 mechanism, such as an interpolation process (like that used in step 2450 by eNB in FIG. 15) to reconstruct and estimate a full-length PMI vector $\{\tilde{S}_1, \tilde{S}_2, \tilde{S}_3 \ldots \tilde{S}_N\}$ as if the PMI vector $\{S_1, S_2, S_3 \ldots S_N\}$ from step 2520 were unknown.

In FIG. 16, a further step 2540 generates PMI error vector $e_k = \{\tilde{S}_1 - S_1, \tilde{S}_2 - S_2, \tilde{S}_3 - S_3, \ldots \tilde{S}_N - S_N\}$ and a cost function $e_k^2 = ((\tilde{S}_1 - S_1)^2 + (\tilde{S}_2 - S_2)^2 + (\tilde{S}_3 - S_3)^2 + \ldots (\tilde{S}_N + S_N)^2)/N$. Operations proceed to a decision step 2550 to determine whether the cost function is below a predetermined threshold or otherwise that the iterations are sufficient. If not, a step 2560 predistorts the downsampled PMIs as indicated by the primed symbolism ($S_a'$, $S_{a+k}'$, $S_{a+2k}'$, ...) representing pre-distortion. Operations go from step 2560 back to step 2535 to simulate in UEi the reconstruction mechanism in eNB applied to the Predistorted down sampled PMIs. Then steps 2540 and 2550 check whether the degree of improvement is sufficient. The iterations continue until the iterations are sufficient whereupon operations code to a step 2570 and UE feeds back the iterated Predistorted downsampled PMIs as actual PMI feedback to eNB, whereupon a RETURN 2595 is reached.

Figure 17:
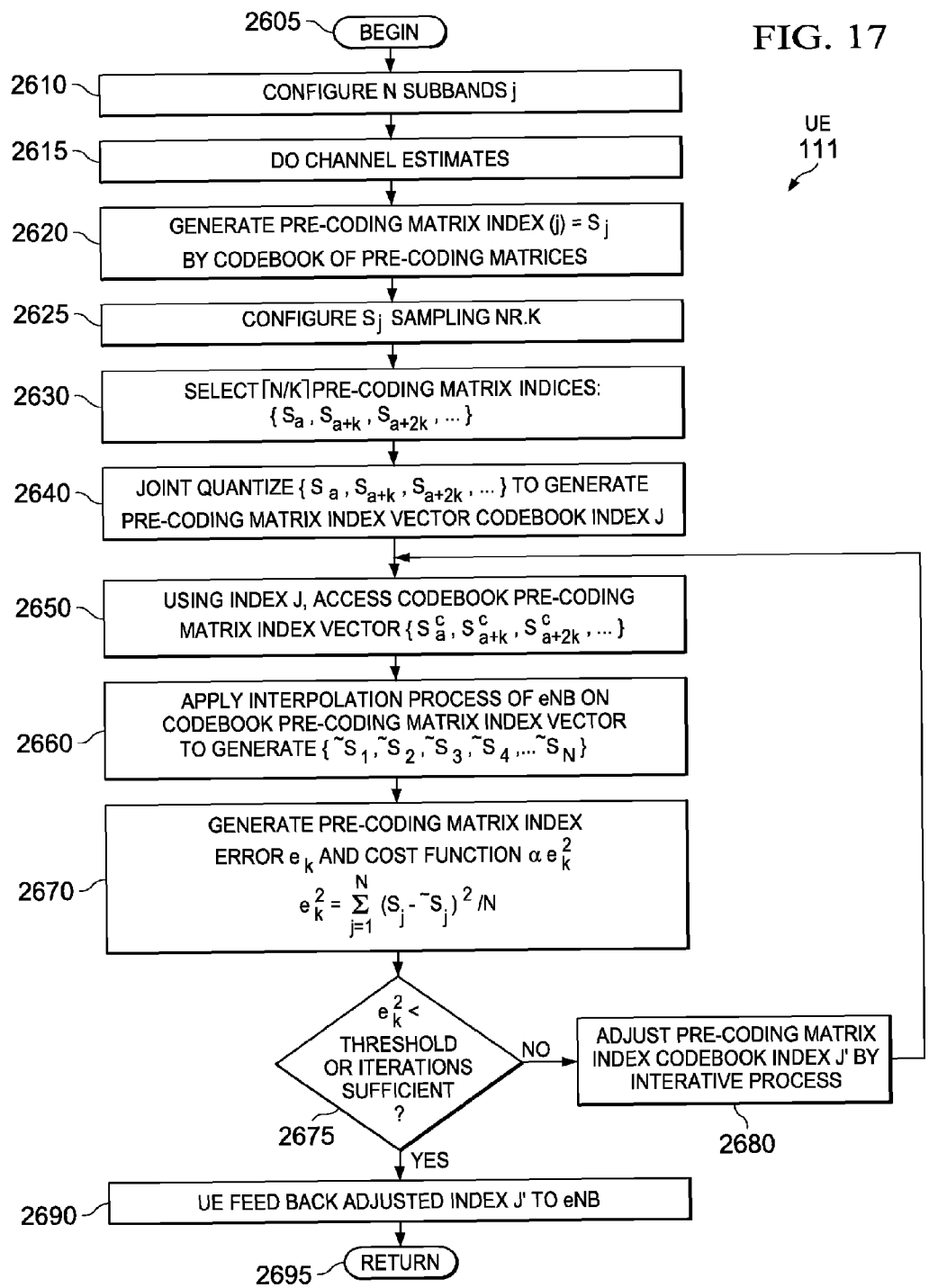
FIG. 17 is a flow diagram of an inventive process for joint quantized down sampled PMI feedback with iterative PMI vector codebook index adjustment, such as for use in UE.

A different Predistorted downsampled PMI feedback process embodiment is illustrated in FIG. 17. In FIG. 17, the description of steps 2605, 2610, 2615, 2620, 2625, and 2630 corresponds to the description of steps 2505-2530 of FIG. 16 and accordingly the description is not repeated. In FIG. 17, a succeeding step 2640 uses a codebook to joint quantize the downsampled PMI values ($S_a$, $S_{a+k}$, $S_{a+2k}$, ...) and derive a codebook index value J analogous to that of step 2350 of FIG. 15. Note that this PMI vector codebook contains typical PMI vectors ($S_a$, $S_{a+k}$, $S_{a+2k}$, ...) which may occur with high probability, and is different from the precoding matrix codebook. Then in FIG. 17, a loop begins with a step 2650 to simulate in UEi a codebook based reconstruction mechanism that eNB uses. In step 2650, UE applies codebook index J and accesses and obtains prestored codebook PMI values ($S_a^c$, $S_{a+k}^c$, $S_{a+2k}^c$ ...) being the same the number as downsampled values ($S_a$, $S_{a+k}$, $S_{a+2k}$, ...) and the superscript-c designation indicates PMI values in one PMI vector codebook entry. Next a step 2660 in UEi applies an interpolation process corresponding to the interpolation process of eNB to the obtained codebook PMI vector entry having values ($S_a^c$, $S_{a+k}^c$, $S_{a+2k}^c$, ...). The interpolation process in step 2660 generates a full-length PMI vector $\{\tilde{S}_1, \tilde{S}_2, \tilde{S}_3 \ldots \tilde{S}_N\}$ as if the PMI vector $\{S_1, S_2, S_3 \ldots S_N\}$ from step 2650 were unknown. Then a cost function step 2670 and a decision step 2675 in FIG. 17 operate analogously to steps 2540 and 2550 of FIG. 16 to generate the cost function and determine whether iterations are needed. If so a step 2680 adjusts the PMI vector codebook index to a value J' indicative of predistortion of the index value J, and operations loop back to step 2650 using value J'. PMI codebook has the entries and indices arranged, for instance, so that incrementing or decrementing the PMI codebook index advances the iterative process. When such index arrangement is not used, some embodiments search on a set of neighborhood values near the current index and select the index of the best-performing vector as index J'. When the iterations are sufficient at decision step 2675, operations proceed to a step 2690 at which UEi transmits as its actual PMI-related feedback, which feedback is adjusted codebook index J' that ultimately resulted from the iterations. Operations of the process are completed at RETURN 2695. The down-sampled PMI vector ($S_a$, $S_{a+k}$, $S_{a+2k}$, ...) is quantized with a PMI vector codebook and adjusted codebook index J' is found iteratively. Another process embodiment finds J' by an exhaustive search.

Further discussion of various types of predistortion and post-distortion is provided in connection with FIGS. 24, 24A, 24B, and 24C later hereinbelow.

Figure 18A:
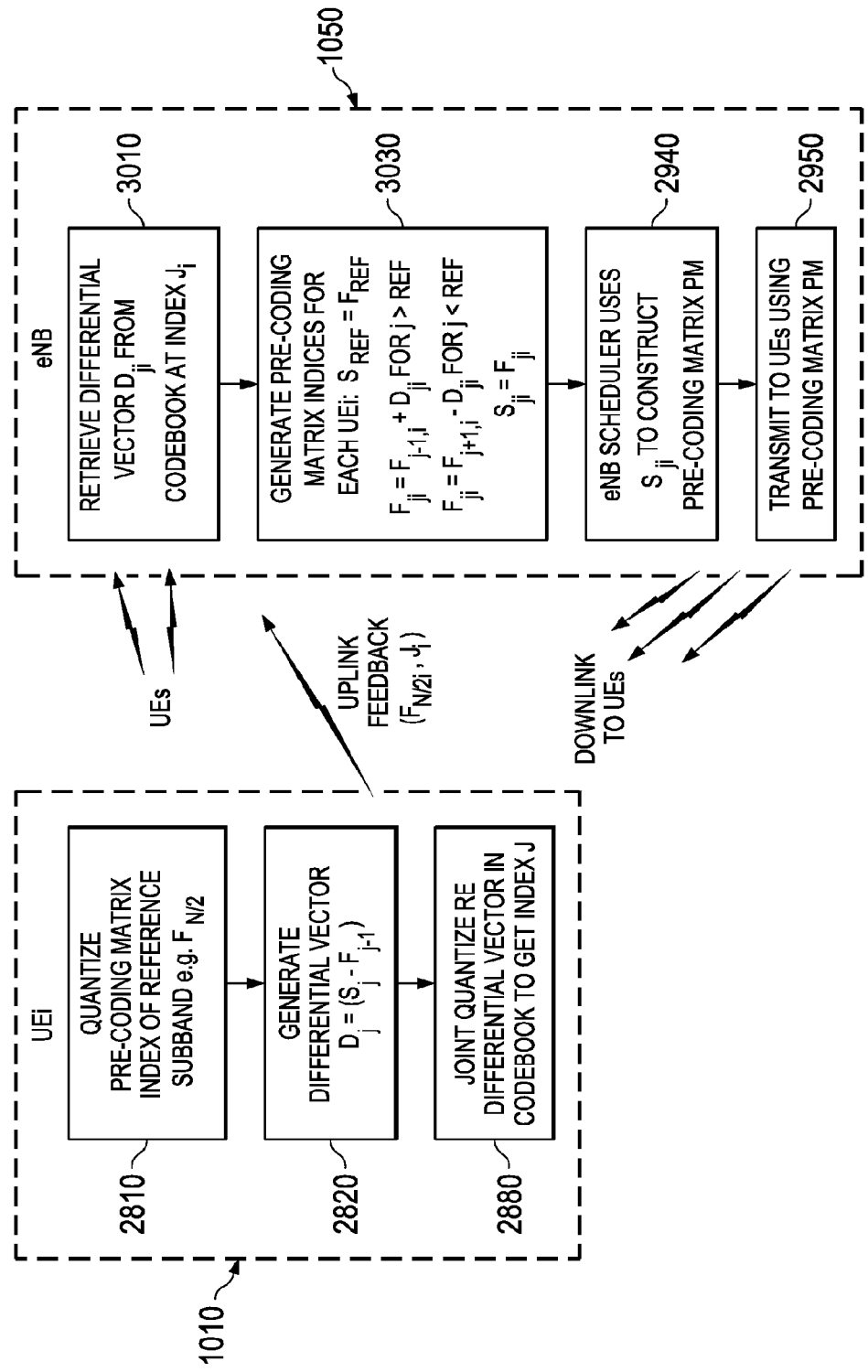
FIG. 18A is a pair of side-by-side flow diagrams of an inventive UE and inventive eNB involving a joint quantized frequency differential PMI feedback process in UE and a codebook-based process at eNB to reconstruct the joint quantized frequency differential PMI feedback for use by the eNB.

In FIGS. 18 and 18A, a Frequency Differential PMI Feedback process herein uses the fact the channels on neighboring (or adjacent) sub-bands are often correlated in value because a particular channel response is not likely to substantially vary in frequency between two sub-bands, particularly in a low frequency-selective channel and with a high (finer) precoding granularity. Thus, the difference between the PMI elements of two neighboring PMI vectors is quantized with fewer bits.

Accordingly, the following method and structure embodiment for PMI feedback is used by the UE.

1. Quantize the PMI of a central sub-band $S_{N/2}$ to get the reference PMI $F_{N/2}$ in a step 2810. (The nomenclature $F_{N/2}$ should be regarded in a suggestive rather than literal sense. For instance, if N=5, $F_{N/2}$ is the PMI of central sub-band 3. If N=6, $F_{N/2}$ is also the PMI of sub-band 3 and there is no literally "central" sub-band.) The precision used for storing $F_{N/2}$ is selected as a configured maximum number of bits for one PMI feedback value. The use of the central PMI is exemplary, and any other PMI is suitably used as the reference PMI in a similar fashion in other versions. For example, the reference PMI can be the wideband PMI which is a single PMI for all subbands or a set of subbands in the system bandwidth. Thus, $F_{N/2}$ pertains to PMI for a sub-band or a set of subbands used as a reference, even when that subband is not central nor nearly central. For example, PMI for the sub-band that has the highest or lowest throughput is suitably selected as the reference in some embodiments.
2. Then for j=1, N/2−1, N/2+1, N/2+2, . . . N
    a. Quantize ($S_j - F_{j-1}$) to generate a part of the differential vector $D_j$ relating to differences between PMI values for subbands j higher than subband N/2 in a step 2820. Notice that the differential feedback at this point in the process is differencing PMI values, that is, the codebook indices that point to pre-coding matrices. By properly indexing the PMIs within a codebook, the dynamic range of $D_j$ is made much less than that of $S_j$, hence fewer bits are used (for example, 2-bits as opposed to 4-bits full PMI report).

b. Compute $F_j = F_{j-1} + D_j$ to enable quantization of next $S_j$. This operation, also in the step 2820, generates the rest of or balance of differential vector $D_j$ relating to differences between PMI values for subbands lower than subband N/2. $D_j = F_j - S_{j-1}$, and $D_j$ refers to the difference between indices of the codebook.

3. UE in a step 2830 feeds back the base PMI $F_{N/2}$ and N−1 differences $$\{D_1, D_2, \ldots, D_{N/2-1}, D_{N/2+1}, D_{N/2+2}, \ldots, D_{N-1}\}.$$

4. Node-B in a step 2910 receives the feedback of step 2830 from each of the UEs.

5. In addition, additional smoothing (e.g. via filtering) can be suitably applied at the Node B before or after reconstructing the PMI in step 6. See step 2920.

6. Node-B in a step 2930 reconstructs PMIs j for subbands j sequentially for each UEi, starting with $S_{N/2,i} = F_{N/2,i}$ and then applying additions $F_{ji} = F_{j-1,i} + D_{ji}$ in increasing order of values of index j>N/2, and performing subtractions $F_{ji} = F_{j+1,i} - D_{ji}$ in decreasing order of values of index j<N/2. For all j and i, $S_{ji} = F_{ji}$. Then Node-B in a step 2940 operates scheduler 2130 and precoder 2140 of FIG. 12 and uses the PMI values to construct the overall preceding matrix PM for downlink DL. A step 2950 in Node-B transmits information streams over the downlink to the UEs using the preceding matrix PM.

In regard to step 2.a. hereinabove, the preceding matrix indices (PMIs) $S_i$ are properly assigned, i.e. properly indexed to the pre-coding matrices in the PM codebook so that differential feedback for the various subbands actually will use relatively few bits. Since the indices can be simply arbitrary integer numbers, nearness of preceding matrices PMs to each other is determined in order to assign the indices in a useful manner. For example, the preceding matrix codebook in LTE E-UTRA is designed with a nested structure where the preceding matrices are generated according to a set of uniform linear array vectors with increasing angles. Hence, PMs that are highly correlated (i.e., closer) are mapped to PMI values with smaller differences $D_i$. Unlike CQIs, preceding matrices are more complex data structures for which determining nearness is involved beforehand for codebook indexing.

Symbol "F" is different from symbol S. Symbol F denotes the PMI of a reference sub-band, used for computing the differential PMI value $D_j = S_j - F$. If a single reference sub-band is used for all sub-bands (for example the central sub-band $F_{N/2}$), $F_j = S_{N/2}$, j=1, 2, . . . N. If every sub-band uses the adjacent sub-band as its reference sub-band, the frequency differential PMI feedback process is performed according to step 2 hereinabove.

In FIG. 18, regarding frequency differential PMI feedback process filtering step 2920, what is filtered at the eNB is the differential PMIs $D_j$, j=1, 2, . . . N. Since there may be feedback error, differential PMI values $D_j$ may be received incorrectly by base station eNB. The filtering reduces the feedback error. For example, suppose UE reports the following vector of ten differential PMI values D=[$D_j$]=[0 0 0 0 1 1 1 1 1]. Also, suppose that base station eNB incorrectly receives a corrupted vector of the PMI values [0 0 3 0 0 1 1 1 1 1]. A filter process at base station eNB is provided in some embodiments to detect any value $D_j$ in the vector of the PMI values that departs by more than a certain amount (e.g., one (1)) from the difference value $D_j$ of either adjacent subband. It is highly likely that value $D_j$=3 is erroneous in the received vector since that value $D_j$=3 is very different from the differential PMI (zero) of either adjacent sub-band. Passing the received value $D_j$=3 to one example of a filter in such embodiment then replaces the received value $D_j$=3 with the correct value 0 pertaining to both the adjacent subbands. Another filter suitably compares the received value $D_j$ with the average of the two adjacent values $D_{j-1}$, and $D_{j-1}$ (or to the single adjacent value if the received value $D_j$ is the first or last value in the vector). If the received value $D_j$ departs up or down by an amount less than or equal to a predetermined amount (e.g., one (1)) from that average value, then received value $D_j$ is not disturbed by the filter process. If the received value $D_j$ departs up or down by more than a predetermined amount (e.g., one (1)) from that average value, then received value $D_j$ is adjusted or limited to depart in the same direction by only that predetermined amount. In the example of corrupted value $D_j$=3, that value is corrected to $D_{j=1}$, and the receive vector is ameliorated to [0 0 1 0 0 1 1 1 1 1].

In FIG. 18A, a joint quantization frequency differential PMI feedback process adds joint quantization PMI codebook access steps to the process of FIG. 18. Correspondingly numbered steps in FIGS. 18 and 18A are already described. In FIG. 18A, operations go from step 2820 to a step 2880 to use an additional codebook called a differential vector codebook that is distinct from the PM codebook already referred to. Step 2880 accesses the differential vector codebook and outputs an index value J corresponding to an entry in the differential vector codebook that is a best approximation to (lowest distance measure relative to) the actual vector of differential PMIs $D_j$, j=1, 2, . . . N−1 computed in step 2820. Each UEi sends as actual feedback the ordered pair ($F_{N/2,i}$, $J_i$) on the uplink UL.

Further in FIG. 18A, the base station Node-B in a step 3010 receives the ordered pair ($F_{N/2,i}$, $J_i$) from each UEi and accesses a corresponding differential vector codebook using the index J to find its corresponding entry comprising the differential vector $D_j^c$ which is then used to approximate difference vector $D_{ji}$ in Node-B step 3030. Notice that step 3030 in FIG. 18A is similar to step 2930 of FIG. 18 and except that a subscripted index notation REF is used to emphasize that N/2 is only one example of a reference sub-band index that is used for frequency differential PMI feedback in a given embodiment.

In one of the above embodiments, sub-band differential PMI is calculated with respect to the adjacent sub-bands. In another embodiment of the disclosure, the differential PMI of all sub-bands is calculated with respect to a common reference PMI. Two examples are:

1) Wideband PMI with differential PMI: The reference PMI is the wideband PMI which is defined as a single PMI for all sub-bands of interests in the system bandwidth or a portion of the subbands in the system bandwidth. That is, the term "all sub-bands" may refer to a set or subset of all the available subbands. The reference PMI is then the wideband PMI across all subbands of interests. The subband differential PMI for subband j (j=1, . . . N) is then calculated by $D_j = S_j - F_0$, where $F_0$ is the wideband PMI.

2) Mean-and-delta PMI feedback: As another embodiment, the reference PMI $F_0$ is the mean PMI across all subbands in the system bandwidth, for instance. Yet another embodiment for the reference PMI is the median PMI across sub-bands of interest. The vector of differences $D_j$ then has a mean of approximately zero which facilitates efficient joint quantization.

Figure 19A:
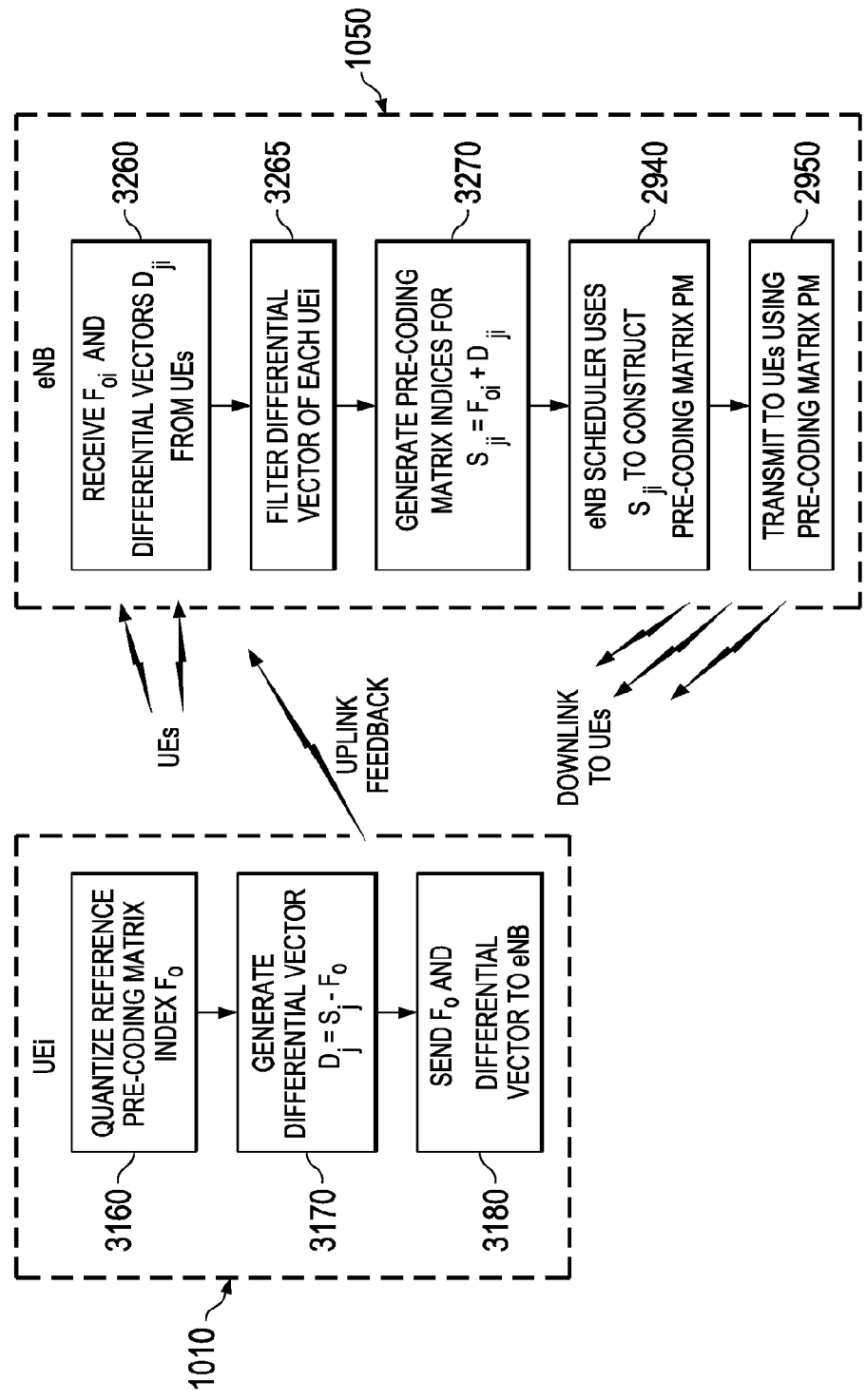
FIG. 19A is a pair of side-by-side flow diagrams of an inventive UE and inventive eNB involving an inventive differential PMI feedback process in UE and an inventive process at eNB to reconstruct differential PMI feedback for use by the eNB.

For the differential PMI feedback embodiment, structures and/or process steps as follows are depicted in FIG. 19A:

1. PMI Selector 111 in UE quantizes the reference PMI for all sub-bands in a step 3160. In one embodiment, the reference PMI is the mean PMI whose rounded result is denoted by $$F_0 = \sum_{j=1}^{N} PMI(j)/N.$$

In another embodiment, the reference PMI is the wideband PMI for the entire system bandwidth or a subset of subbands configured in the system bandwidth. The precision used for storing $F_0$ is made the highest, e.g., 4 bits for a size 16 codebook.

2. Then for j=1, 2, ... N, PMI Selector 111
    a. Generates the differential (delta) subband PMI of the individual PMIs $S_1, S_2, \ldots S_N$ with respect to $F_0$ in a step 3170, obtaining $D_1, D_2, \ldots D_N$, where $D_j = S_j - F_0$.
    b. Differential subband PMI Dj, (j=1, ... N) are reported by UE step 3180 to eNB separately. Note that each differential subband PMI can be reported with fewer bits due to smaller dynamic range of differential subband PMI.
3. The Node-B feedback reconstruction portion 2120 receives the feedback $(F_0, D_1, D_2, \ldots D_N)$ from each UE i and
    a. Generates $F_{0i} + D_{ji}$ to estimate the PMI $S_{ji}$ for UE i at subband j at a step 3260. Steps 3260, 3265 and 3270 are repeated for all the UE's i.

In the aforementioned embodiments, the differential PMI $(D_1, D_2, \ldots D_N)$ for N sub-bands are separately separated reported to eNB. In another embodiment, as in FIG. 19, the differential PMI vector $D=(D_1, D_2, \ldots D_N)$, is jointly reported to eNB. For instance, consider 10 subbands with 10 PMI values to be reported. The particular 10×1 (differential) PMI vector listing the (differential) subband PMI is mapped to a PMI vector codebook of 10×1 PMI vectors with various permutations of PMI values in them. The index of the particular 10×1 PMI vector is found in the PMI vector codebook by the joint quantizer and the index from the joint quantizer is fed back to base station eNB.

Hence, another embodiment of differential PMI report where the differential PMI vector is formed by accessing the PMI vector codebook is as follows.

1. PMI Selector 111 in UE quantizes the reference PMI $F_0$ for all sub-bands in a step 3110 of FIG. 19. The reference PMI $F_0$ is the wideband/mean/median PMI and is quantized with the highest precision, e.g., 4 bits for a size 16 codebook, for instance.
2. Then for j=1, 2, ... N, PMI Selector 111
    a. Generates the differential (delta) PMI of the individual PMIs $S_1, S_2, \ldots S_N$ with respect to $F_0$ in a step 3120, obtaining $D_1, D_2, \ldots D_N$, where $D_j = S_j - F_0$.
    b. Uses a joint quantizer at a step 3130 to quantize the above set of differential PMI vector $D = \{D_1, D_2, \ldots D_N\}$, by looking them up in a PMI vector codebook and determining a codebook index value J. (Some other embodiments separately quantize each of the differences.) The results of step 3130 and step 3110 are fed to feedback encoder 113 and transmitted as feedback $(F_{0i}, J_i)$ by each respective UE (indexed i) to the base station.
3. The Node-B feedback reconstruction portion 2120 receives the feedback $(F_0, J)$ from each UE i and performs feedback reconstruction. A step 3210 retrieves a difference vector D from a difference vector codebook at codebook index J. A step 3220 generates a reconstructed PMI vector having precoding matrix indices $S_j = F_0 + D_j$ based on reference PMI $F_0$ and elements $D_j$ of the difference vector D. Step 3230 performs eNB scheduling, and step 3240 constructs precoding matrix PM and transmits data streams to UEs using precoding matrix PM.

Figure 20:
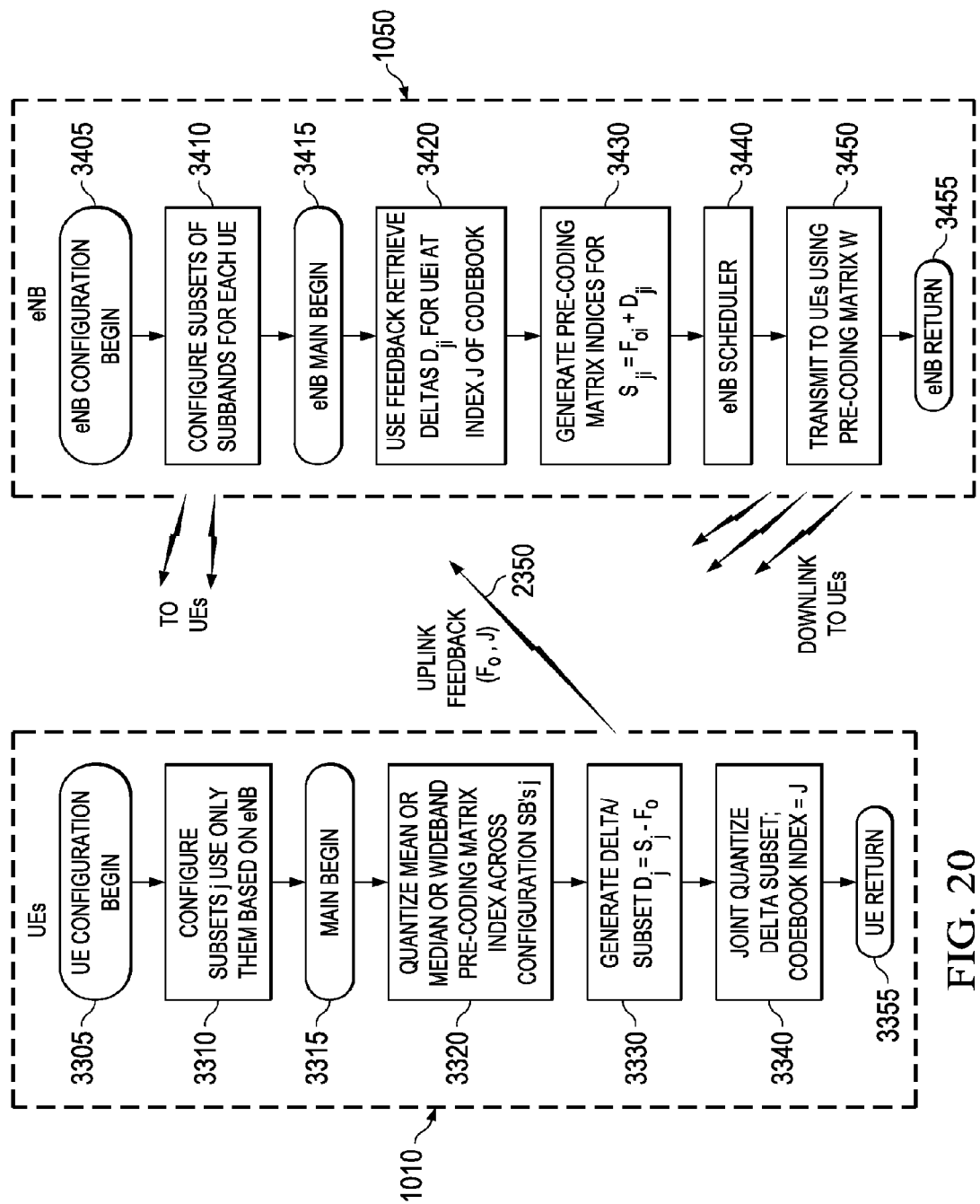
FIG. 20 is a pair of side-by-side flow diagrams of an inventive UE and inventive eNB each having wirelessly coupled processes for variably configurable subsets of subbands, and further involving a joint quantized Mean and Delta PMI feedback process in UE and a codebook-based process to reconstruct joint quantized Mean and Delta PMI feedback for use by the eNB.

FIG. 20 shows a differential PMI feedback wherein base station eNB scheduler 2130 allocates or configures subband(s) customized for each applicable UEi. Base station eNB begins configuration in a step 3405 and configures or allocates subsets of subbands for each UEi in a step 3410. Base station eNB requests a PMI report from each UEi according to a negotiation or interrogation protocol that is initiated by eNB after RB allocation by scheduler 2130 of FIG. 12. The amount of feedback is reduced because each UEi only reports PMI for the pertinent subbands identified by the scheduler 2130 for that particular UEi. Moreover, each UEi in some embodiments saves processing power and time by restricting channel estimations and precoding matrix determinations to those subbands and/or RBs configured for UEi by the eNB. Thus different UEs provide PMI feedback for a different subband for each different UE instead of doing comprehensive PMI vector feedback by every UE for all the subbands in the OFDMA cell frequency spectrum.

In FIG. 20, operations of UE configuration commence at a BEGIN 3305 and proceed to a step 3310 to configure operations to report on a base station-specified subband j and only that subband j. Then a main BEGIN 3315 is reached and operations proceed to quantize a mean or median PMI for subband j (or for some base station-specified subset of all subbands). If there is more than one subband involved, then a step 3330 generates a delta vector of one or more differences of plural subbands relative to the mean or median PMI, and a step 3340 joint quantizes the delta vector and delivers the codebook index J. If there is a single subband, UE feeds back only mean or median $F_o$ on uplink UL. If more than one subband, UEi feeds back a pair $(F_{o,i}, J_i)$ In FIG. 20 in the base station eNB, operations proceed from eNB Main BEGIN 3415 to a step 3420 that uses the feedback from each given UE to retrieve a delta vector from a delta codebook if plural subbands were allocated to the given UE and otherwise omits this step relative to that UE. A delta vector, if applicable for the given UE, is used to generate a PMI vector for the UE at a step 3430. If no delta vector, then step 3430 is omitted relative to that UE. Any as yet unexecuted parts of the eNB scheduler 2130 that appropriately should be performed are executed at a step 3440 and if none, then operations of precoder 2140 establish a composite precoding matrix PM for the downlink and transmissions of information streams begin in a step 3450 on the downlink DL to the UEs whence an eNB RETURN 3455 is reached.

Figure 21:
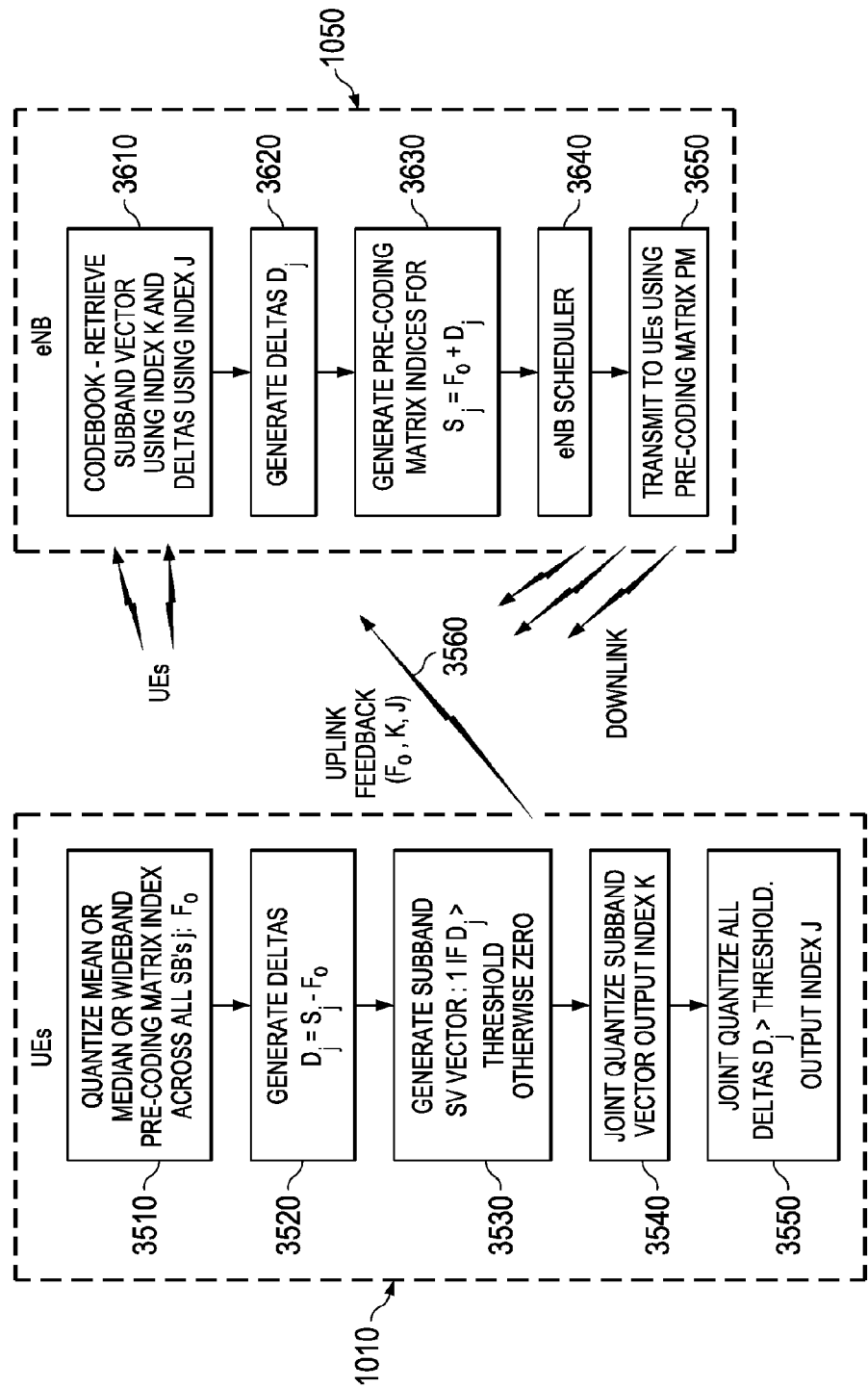
FIG. 21 is a pair of side-by-side flow diagrams of an inventive UE and inventive eNB involving a joint quantized Mean and Thresholded Delta PMI feedback process in UE and a codebook-based process to reconstruct joint quantized Mean and Thresholded Delta PMI feedback for use by the eNB.

In FIGS. 21 and 22, another type of embodiment has a differential PMI feedback process wherein the UE feeds back the differential PMI for only a few number M of the PMIs by an alternative process. For the other N–M PMIs, the node-B (base station) uses the reference PMI (delta=0) as the returned PMI. The subsets of subbands for which the UE feeds back the differential PMI are suitably either 1) configured by the Node-B, or 2) chosen by the UE based on the PMI values themselves. For example, the delta PMI is suitably fed back for only those subsets that have large deviation (delta) from the mean PMI. Note that in this case the UE also suitably feeds back some indicator of which subsets are being used in the feedback.

In FIG. 21 UE operations in a step 3510 quantize a reference value $F_0$ (e.g., mean, or median, or wideband, or otherwise) and proceed in a step 3520 to generate differential subband PMI $D_j = S_j - F_0$ over the entire range of subbands. Then a step 3530 generates a subband vector SV that for each subband j has element SV(j)=1 if differential subband PMI for that subband exceeds a predetermined threshold (e.g., $D_j >= 2$) and otherwise element SV(j)=0. The subband vector SV is a series of ones and zeros as in FIG. 22. Next a step 3540 of FIG. 21 joint quantizes the subband vector SV by accessing a subband vector codebook and outputs a codebook index K for the codebook entry having a subband vector $SV^c$ that most closely approximates the subband vector SV from step 3530. A succeeding step 3550 selects only the differential PMIs that exceed a predetermined threshold, joint quantizes them using a precoding vector codebook and outputs a codebook index J. UE then sends as its actual feedback the triplet $(F_0, K, J)$ on the uplink UL to eNB.

Further in FIG. 21, eNB in a step 3610 receives the various feedback triplets $(F_o, K, J)$ from various UEi. Also in step 3610, the index J is used to retrieve a short differential PMI vector DV from a corresponding precoding vector codebook, and the index K is applied to a subband vector codebook to retrieve the subband vector entry $SV^c$. A succeeding step 3620 generates a full-length differential PMI vector D such as by using the process depicted in FIG. 22. Then a step 3630 uses the full-length differential PMI vector D from step 3620 to generate a full-length PMI vector S. Step 3630 suitably operates in the manner of already-described step 3220 of FIG. 19. A process loop using steps 3610, 3620 and 3630 reconstructs full-length differential PMI vectors $D_{ji}$ and PMI vectors $S_{ji}$ for all the applicable UEi and is implicit in FIG. 21. Scheduling, precoding and transmission by steps 3640 and 3650 are respectively similar to steps 3230 and 3240 of FIG. 19.

In FIG. 22, substeps of FIG. 21 step 3620 commence with a begin 3705 and proceed to a step 3710 that initializes indices j=1 and L=1. A decision step 3720 is part of a process of scanning subband vector SV. A particular example of a 10-element subband vector SV is shown below the flow. Decision step 3720 determines whether a given subband vector element SV(j) is one (1) or not. If not, the full-length differential PMI vector D is set equal to zero (0) at element j so that D(j)=0 at step 3725. Then a step 3730 increments index j. Then a decision step 3740 determines by the criterion j>jmax whether the entire subband vector SV has been scanned. If so, a RETURN 3750 is reached, and otherwise operations loop back to decision step 3720. At decision step 3720, if the given sub band vector element SV(j) is one, then operations proceed to a step 3760 to access short differential PMI vector DV element L and multiply to generate a full-length differential PMI vector element D(j)=SV(j)×DV(L). Some embodiments simply use the logic IF SV(j)=1, THEN D(j)=DV(L) at this point. If the scan across the short differential PMI vector DV is completed, L=Lmax at a decision step 3770 and operations reach RETURN 3750. Otherwise, operations proceed from decision step 3770 to a step 3780 that increments the index L that scans the short differential PMI vector DV. Operations go from step 3780 to step 3730 and the process goes on as already described.

The use of wavelet coefficients provides another embodiment of the PMI compression. One view of PMI compression is that the PMI vector $S=[S_1, S_2, \ldots S_N]$ needs to be represented and sent to eNB. This can be accomplished by using a set of (N×1)M basis vectors $w_1, w_2, \ldots, w_M$ and finding coefficients $\{c_i\}$ such that the error between S and $\Sigma_i w_i c_i$ is optimized. Typically, the basis vectors $w_1, w_2, \ldots, w_M$ may be chosen to be mutually orthogonal, but non-orthogonal basis-vectors are also possible.

Different cost functions to measure optimality may be used, as discussed above. Examples include polynomial vectors where the $j^{th}$ term of $w_i$ is $j^{i-1}$. The quantization range of the coefficients varies depending on their dynamic range. Hence, it is also possible to represent different coefficients $\{c_i\}$ with decreasing bits. For example, the first coefficient $c_1$ is quantized with the maximum number of bits, while the remaining coefficient $c_2, c_3, \ldots$ can use two bits or less. In general, the precision may be reduced as i increases, although this not obligatory. Using these basis vectors, the UE finds coefficients $\{c_i\}$ that represent the PMI vector S. The Node B uses the received coefficients to reconstruct S as $\Sigma_i w_i c_i$.

Figure 23:
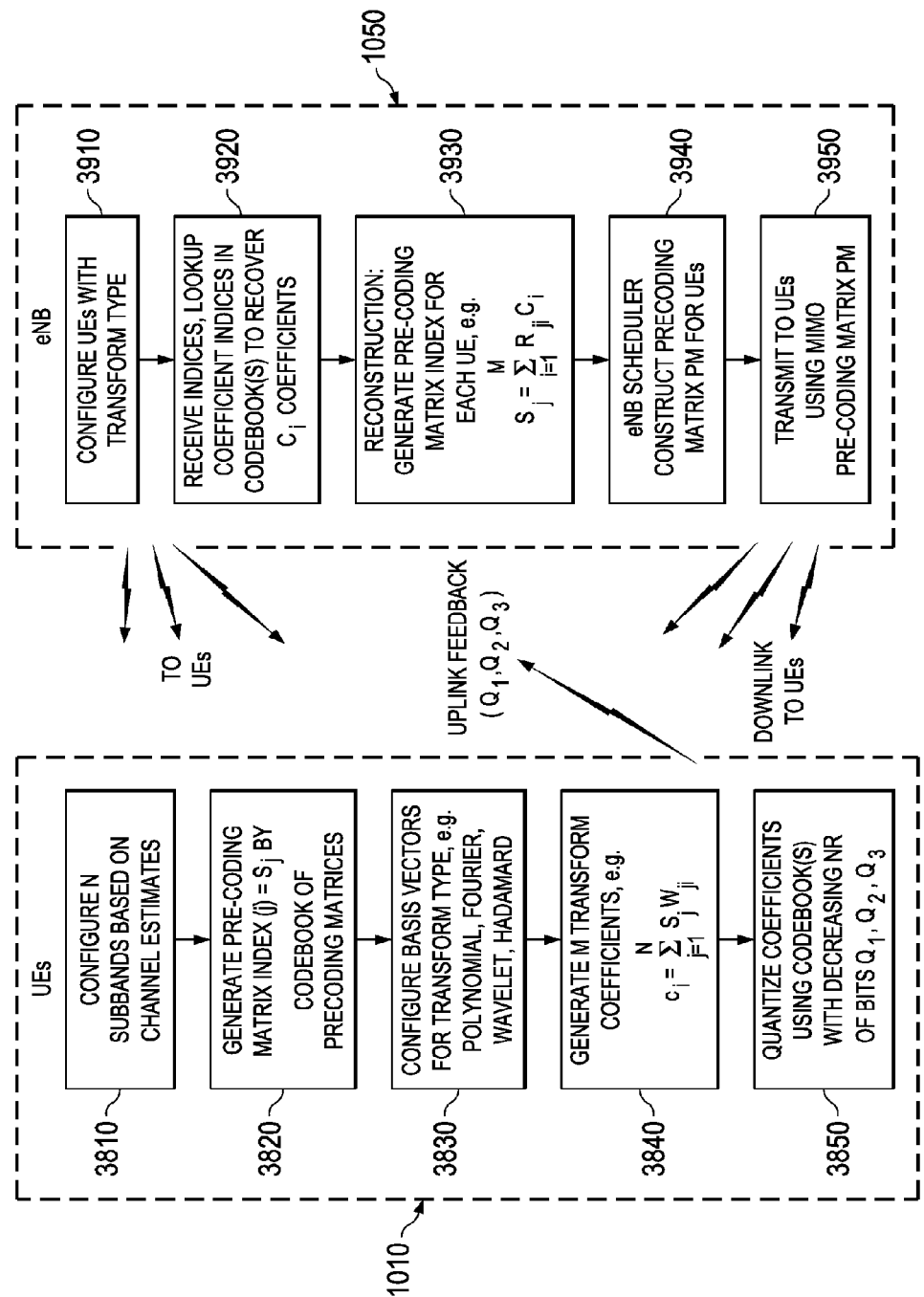
FIG. 23 is a pair of side-by-side flow diagrams of an inventive UE and inventive eNB involving a configurable sub-bands and a configurable Transform-based Decreasing-bits PMI feedback process with in UE and a configurable codebook-based process to reconstruct Transform-based Decreasing-bits PMI feedback for use by the eNB.

FIG. 23 shows a wavelet-based Decreasing-bits PMI feedback process. Referring to FIG. 23, the wavelet generation process commences in a step 3810 by configuring a number N of subbands and doing channel estimates. A step 3820 generates a PMI vector $S=[S_1, S_2, S_3, \ldots, S_N]^T$. Another step 3830 configures UE with basis vectors or wavelets for a given Transform TYPE. The transform TYPE is suitably defined in some embodiments by a configuration step 3910 in the base station eNB, which instructs the UE to use a given transform TYPE either based on information from the UE or without such UE information. In some other embodiments, the UE itself determines the transform TYPE based on its experience with channel estimation based on pilot signals, for instance, from the base station and using decision criteria as described elsewhere herein. A particular transform TYPE is established such as polynomial, Fourier, Hadamard, etc. in step 3830.

Next in FIG. 23, a step 3840 implements the particular transform specified by TYPE. One aspect from which to view the PMI compression problem that of having a goal of representing PMI vector $S=[S_1, S_2, S_3, \ldots, S_N]^T$. A set of M wavelets or basis vectors $w_1, w_2, \ldots, w_M$ are provided. Each (N 1) basis vector has the same number N of elements as the PMI vector S. The Transform process further either directly generates wavelet coefficients or iteratively produces wavelet coefficients $\{c_i\}$ such that the error between S and a reconstructed PMI vector $S' = \Sigma w_i c_i$ is optimized. The basis vectors $w_1, w_2, \ldots, w_M$ are chosen, for example, to be mutually orthogonal in some embodiments but this is not necessary in some other embodiments. Note that different cost functions to measure optimality are feasible, as described elsewhere herein. The set of basis vectors is fixed in some embodiments and dynamically established or varied in some other embodiments. Optionally, a subsequent step 3850 quantizes the coefficients $c_i$ with different numbers of bits $Q_1, Q_2$, etc. Depending on the basis vectors set, experience can show that low-order basis vectors desirably have coefficients expressed with some number of bits, and higher order basis vectors feasibly have coefficients with fewer bit(s). However, note that it is also possible to quantize all wavelet coefficients $c_i$ with the same number of bits. In step 3850 the approach to quantization is separate quantization or joint quantization depending on embodiment.

The Node B uses the received coefficients to reconstruct PMI vector as $\Sigma_i w_i c_i$. In FIG. 23, base station eNB receives and recovers the quantized coefficients $c_i$ in a step 3920. A reconstruction step 3930 generates a PMI vector for each UE. The reconstruction step may remarkably use an inverse transform, or even some other reconstruction process R that is not the inverse transform, as described further herein. In FIG. 23, a loop over steps 3920 and 3930 for each of the UEs is implicit. The reconstruction step 3930 in FIG. 23 explicitly depicts reconstruction of a PMI vector from one UE. The PMI vector has N PMI vector elements $S_j$ each equal to a summation over a fewer number M of basis vectors. Then with the PMI vector reconstructed, steps 3940 and 3950 handle scheduling, overall preceding, and MIMO transmission from the base station as already described elsewhere hereinabove.

A first transform example uses Fourier vectors $w_i$ in columns of a transform matrix W. The $j^{th}$ row element of basis vector $w_i$ is $\cos(2\pi ij/N)$ for transform matrix column i=1, 2, ... M/2 and $\sin(2\pi ij/N)$ for i=1, 2, ... M/2. (In the transform matrix W, the sine basis vectors are actually situated in the rest of the transform matrix columns from column 1+M/2 to column M.)

A second transform feedback process example uses what is called Difference Based wavelets (basis vectors) herein, and the first basis vector is given by $[1\ 1\ \ldots\ 1]^T/N$. The $i^{th}$ basis vector for the wavelets is $[0\ \ldots\ (1-ai)-ai-ai\ \ldots\ -ai]^T$ and where $a_i=1/(N-i+1)$. For instance, in the case wherein N=4:
1st wavelet=[¼ ¼ ¼ ¼];
2nd wavelet=[¾ −¼ −¼ −¼];
3rd wavelet=[0 ⅔ −⅓ −⅓];
4th wavelet=[0 0 ½ −½];

Basis vectors are orthogonal when the inner product is zero for any pair of different ones of them. The first coefficient represents the mean. The second coefficient represents the difference of the first PMI with respect to the mean, etc. The quantization ranges of the coefficients vary depending on their dynamic range. For example, $c_1$ uses 4 bits for a size-16 codebook. But $c_2$, $c_3$, ... can use 2 bits or less. In general, the precision can be reduced as i increases.

A third transform feedback process example uses polynomial vectors, wherein the $j^{th}$ element of $w_i$ is raised to a power:$j^{i-1}$. The polynomial basis vectors are listed below, and they are non-orthogonal:
1st wavelet=[1 1 1 1];
2nd wavelet=[1 2 3 4];
3rd wavelet=[1 2^2 3^2 4^2];
4th wavelet=[1 2^3 3^3 4^3].

Other possible choices include the Hadamard transform, etc. A Hadamard matrix, for N=4 includes basis vectors in the columns for use in compressing a PMI vector.

$$H = \frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

Some wavelets (lower case usage of wavelet used synonymously with basis vector herein) are listed herein for various transforms by way of example and not limitation. A Wavelet transform (upper case usage of Wavelet herein) is a particular transform type. Using the basis vectors for a specified transform type, the UE at a step 3840 in FIG. 23 finds coefficients $\{c_i\}$ that optimally represent the PMI vector S. The Node-B uses the received coefficients at a step 3930 to reconstruct s as $\Sigma_i w_i c_i$.

UE or eNB determines at step 3830 which transform type to use (polynomial, Fourier, difference-based wavelet, Hadamard, etc.) prior to using it either statically by pre-determination or dynamically. The set of wavelets used for PMI vector feedback report in some embodiments is determined by a higher layer process and then signaled from eNB to UE. In other words, the higher layer (e.g., eNB) decides the set of wavelets and conveys such decision to UE in downlink control signaling. Moreover, in some other embodiments each UE determines the set of wavelets (transform type) for itself to use, and signals such decision to eNB in the uplink control channel.

Figure 25:
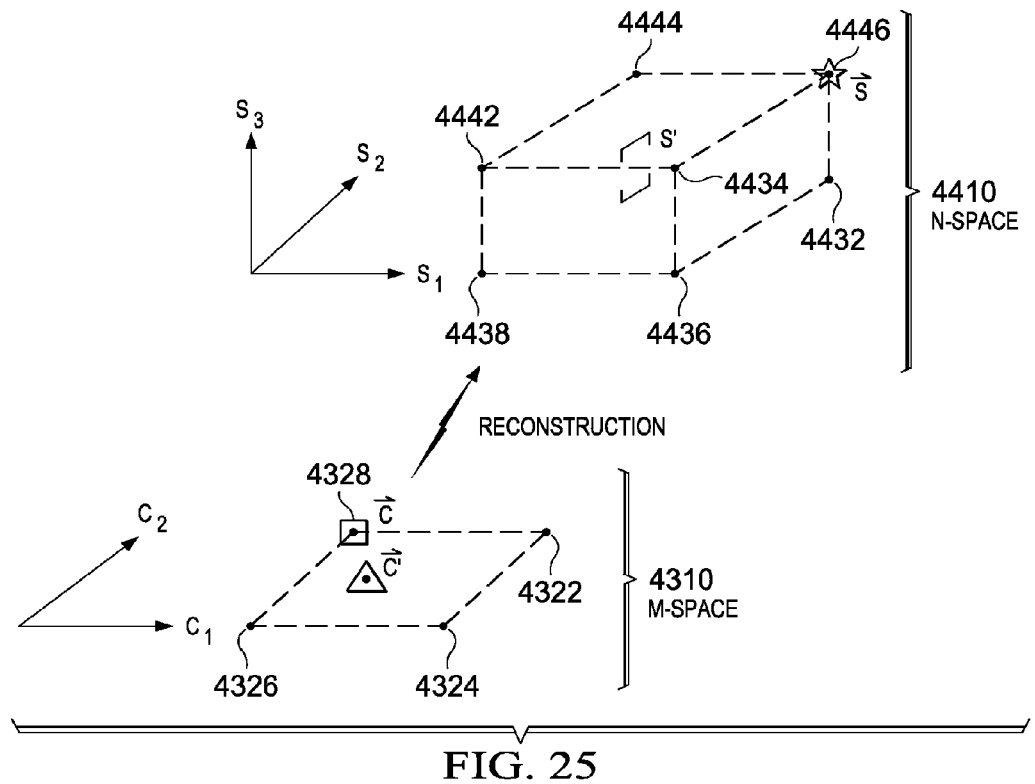
FIG. 25 is a composite of two graphs of vector spaces for illustrating an inventive process involving generation of a PMI related compressed feedback vector c having M discrete-valued vector elements in a first vector space such as at UE, followed by reconstruction such as at eNB of an original PMI vector S having N discrete-valued vector elements in a second vector space.
Figure 25A:
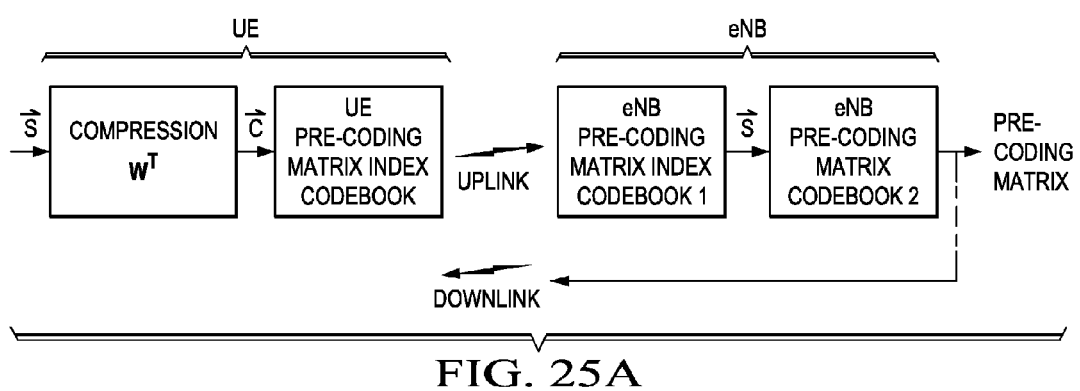
FIG. 25A is a block diagram of inventive structure and process in telecommunications devices involving access to a succession of codebooks in connection with PMI feedback and precoding matrix PM construction.
Figure 25B:
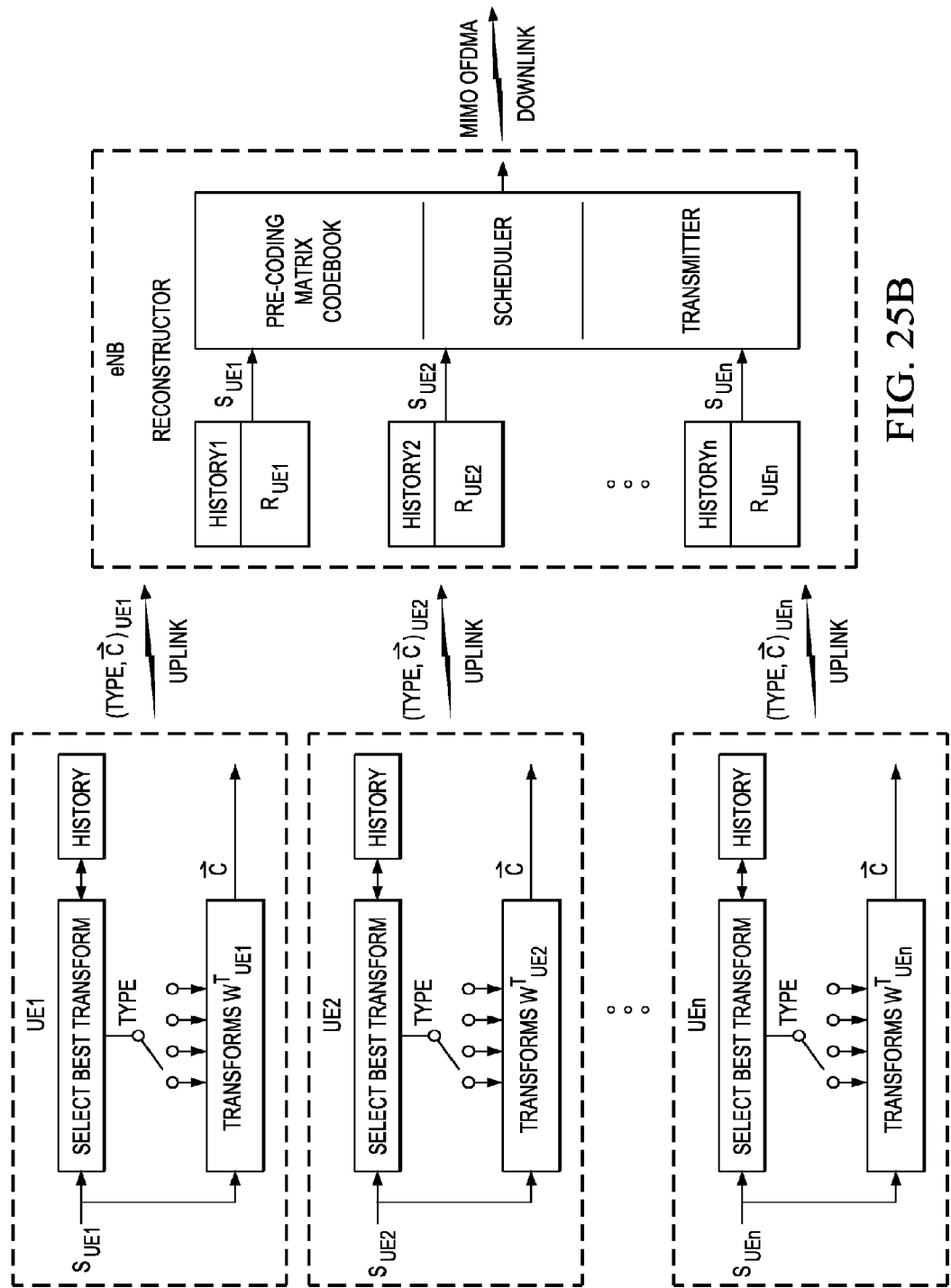
FIG. 25B is a block diagram of inventive structure and process in telecommunication devices involving selection of a best transform type combined with compression and reconstruction using that type of transform process and a history-based process.
Figure 26B:
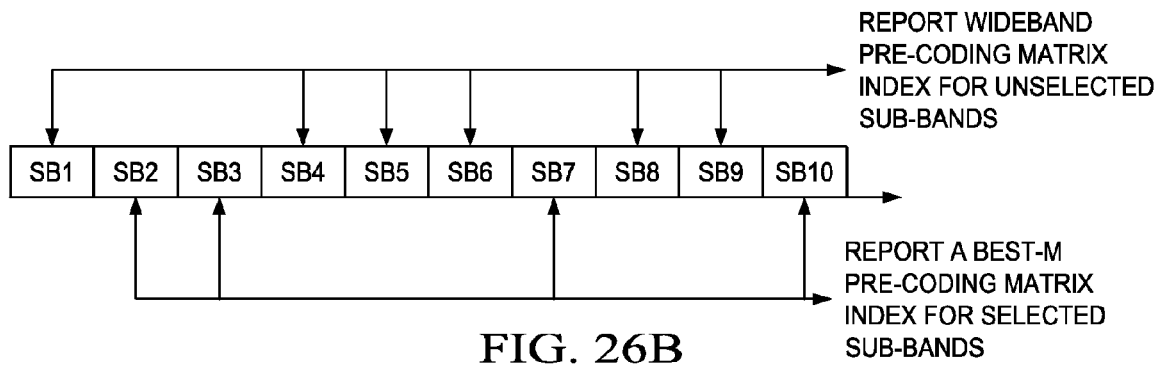
FIG. 26B is a diagram of a frequency spectrum having subbands wherein a process of configurable hybrid PMI feedback is applied such as in FIG. 25A.
Figure 26C:
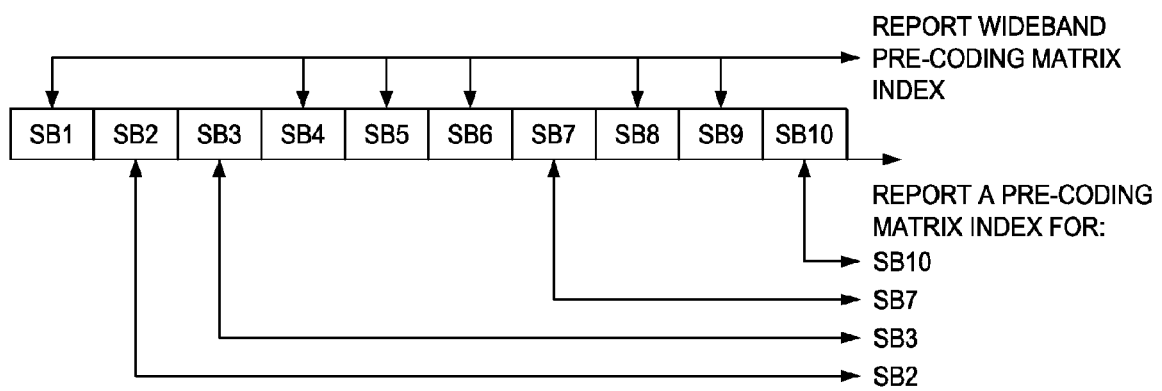
FIG. 26C is a diagram of a frequency spectrum having subbands wherein another process of configurable hybrid PMI feedback is applied such as in FIG. 25A.
Figure 26D:
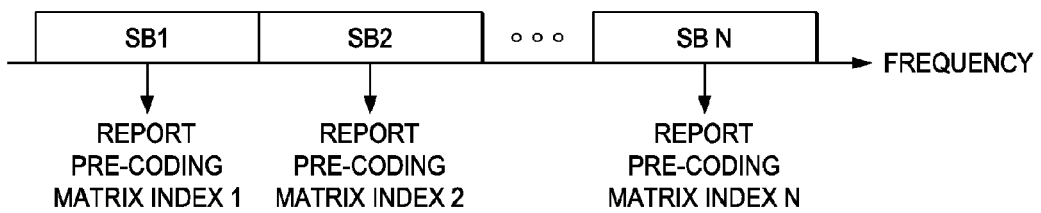
FIG. 26D is a diagram of a frequency spectrum having subbands wherein an additional process of selective reporting configurable PMI feedback is applied such as in FIG. 25A.
Figure 26E:
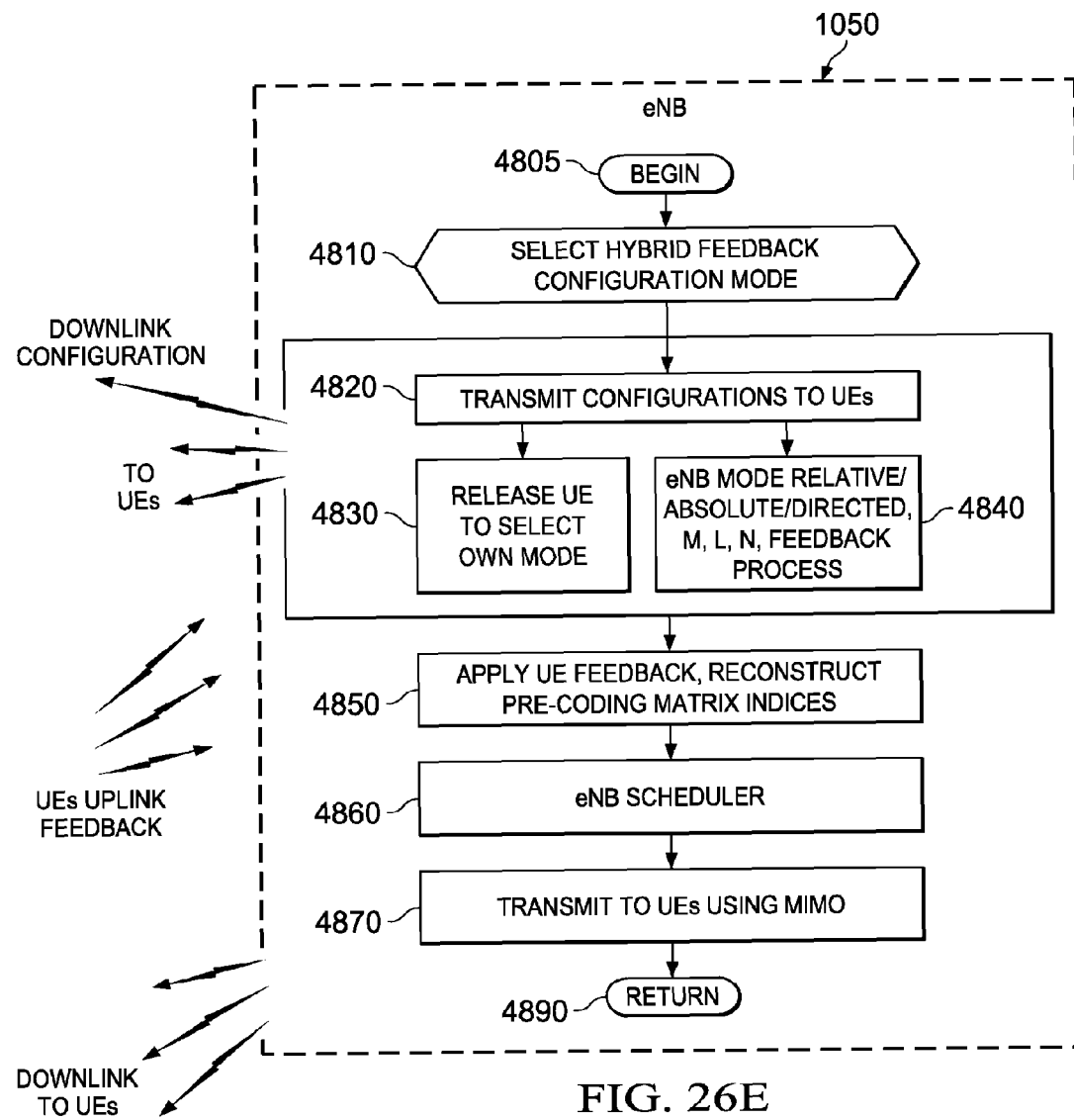
FIG. 26E is a flow diagram of inventive structure and process in eNB having a hybrid feedback configuration control and a PMI feedback reconstruction process operative upon the configurable hybrid PMI feedback with variable sub-band numbers and PMI feedback granularity of FIG. 26A.

These TYPE-selecting embodiments are applied in step 3830 in FIG. 23, in Select Best Transform block in UEi in FIG. 25B, and in determining a Feedback Process Code in FIG. 26A UE step 4628 and/or eNB FIG. 26E step 4840. For example, suppose the UE is in the best position to determine the channel conditions and make a determination of transform type based on channel conditions. UE is in a good position to determine the cost function such as sum of squares of PMI error. A transform that can closely approximate an actually-recurring PMI vector with its given set of basis vectors is a good transform, and if only one or two of the basis vectors are sufficient to achieve a close approximation, the transform is an even better one to use. If the same transform is excellent in this way over numerous PMI vectors experienced over long periods of time at UE, the transform is still better. Accordingly, for UE to select a "best" transform type involves any one, some or all of decision criteria such as 1) sufficiency of available basis vectors of the transform type to achieve close approximation to the PMI vector as reflected in a low cost function value, 2) number of basis vectors needed to achieve that close approximation, the fewer the better, and 3) a generally stable, low-cost history of the cost function over experience history with actually occurring PMI vectors. For instance, with respect to criterion 1) sufficiency, a decision-making process in some embodiments does numerical estimates of how many basis vectors of each of at least two types of compression processing are sufficient to achieve a predetermined degree of approximation to the PMI vector, and the decision-making process uses the numerical estimates in choosing from plural alternative types of compression processing.

The selection of wavelets, basis vectors, or transform type is fixed/predefined by configuration or determined semi-static manner in some embodiments. Dynamic configuration or selection of the wavelets, basis vectors or transform type is contemplated in some other embodiments herein wherein the UE or eNB, or both jointly, determine under varying signal conditions across the bandwidth or depending on the PMI vectors, which is the best transform type to use and then dynamically performs the PMI communication from UE to eNB and reconstruction in eNB according to the transform type chosen by or for each UE. This subject is discussed further in connection with FIG. 25B and FIGS. 26A and 26E.

Description now turns to a consideration of compression and reconstruction and proceeds from special cases to more general analyses. In some embodiments, such as those using a wavelet-based Transform method, the basis vectors Wi are unit vectors as well as orthogonal to each other in the orthogonal transforms, not including polynomial transform. In some special cases, each basis vector is normalized to have unit length, or the procedure handles normalization in some equivalent way using a complementary inverse transform matrix at eNB. First, let S be a N×1 column vector of PMIs determined by UE. Let Wi be collectively regarded as respective columns of N×M transform matrix W, based on whatever type of orthogonal or non-orthogonal transform is used. Let a and c each be M×1 column vectors of coefficients, where a represents the true coefficient for w1 component of S and where c represents the actual coefficient delivered by the procedure. Let "T" mean matrix transpose. Next, for simplicity, assume the special case where the particular PMI values satisfy S=Wa precisely and inherently before any transformation. Then the UE applies the transform procedure computation $c=W^T S=W^T(Wa)=(W^T W)a$. Notice that computed coefficients c equal true coefficients a, i.e. c=a, provided that $W^T W=I$ (M×N×N×M=M×M identity matrix). The UE sends M×1 vector c to eNB. Base station eNB then applies an inverse transform computation S'=Wc, which is intended to reconstruct S so that S' should equal S. So if c=a, and if Wa=S, then S'=S and the orthogonal transform procedure works. The condition that Wa=S, is stated advisedly here since this condition may not be met in the case of down-sampling, for instance. If unit vectors aren't used at the UE, then eNB suitably applies a correction by using a different and complementary inverse transform matrix W' to premultiply the M×1 received coefficients c, where $W'=W(W^T W)^{-1}$. N×M×M×N×N×M=N×M. Then at eNB, $S'=W(W^T W)^{-1} c = W(W^T W)^{-1}(W^T W)a = Wa$, and if Wa=S, then eNB recovers PMI vector S to a good approximation.

The conclusion from the above considerations is that the using an orthogonal transform procedure for the PMI, in embodiments that are to obtain coefficients c that will need relatively little or no pre-distortion, leads to the relations $W^T W=I$, or $W'W^T=I$. If $W^T W=I$, then all basis vectors are not only orthogonal but also unit vectors. If $W'W^T=I$, then the basis vectors $w_i$ can be orthogonal and not have to be unit vectors.

An estimation procedure in UE for the polynomial transform, or other non-orthogonal transform, and reconstruction procedure for it in eNB is that the UE performs $c=W^T S$, sends coefficients c to eNB, whereupon eNB performs $S'=W(W^T W)^{-1} c$. This approach provides an example of a way to approximate the PMI vector S. Thus, in various embodiments, there is wide latitude in choosing procedures to estimate coefficients and to reconstruct an approximation to PMI vector S in UE and eNB.

Moreover, by using pre-distortion or optimization as taught herein, the coefficient estimation and reconstruction procedures remarkably may even depart widely in nature from the estimation procedure examples just above and not necessarily conform to any particular just-mentioned rationale. These coefficient estimation and reconstruction procedures are suitably deterministic and capable of reconstructing from possible sets of the coefficients c any or at least most of the values that are likely to occur in the PMI vector S. Then varying the coefficient vector c by some feedback driven search process drives the PMI error vector S'−S to as near zero as possible, given the discrete (non-continuous) nature of the values of the PMIs (pre-coding matrix indices) and regardless of the coefficient estimations and reconstructions.

UE is provided with the procedure used by eNB for PMI reconstruction, and then optimizes its calculation of wavelet or other coefficients c to minimize the PMI error such as by using error feedback to drive the squared error magnitude $e_k^2$ or some other cost function to zero and thereby drive the PMI error vector S'−S to near-zero and thereby achieve a satisfactory approximation of the PMI vector S' reconstructed in the eNB to the original PMI vector S called for by UE.

One example of a feedback driven search process that drives the PMI error vector S'−S to near zero uses a current value of the squared error magnitude $e_k^2=\|S'-S\|^2$ or other cost function. The process iteratively determines a latest adjustment Δc to the coefficients c and updates the coefficients c←c+Δc until an optimum is substantially reached. Then UE sends to eNB the optimized coefficients c, which are an example of a compressed altered PMI vector. Base station eNB uses the same reconstruction process as UE and consequently reconstructs a PMI vector S' same as reconstructed S' in reconstructor 118 of UE as a close approximation to PMI vector S. For instance, an iteration can generate $$\Delta c = 0.5 W^T (S'-S)$$

The number 0.5 results from evaluating $\{e_k^2/[\mathrm{grad}(e_k^2)\cdot(S'-S)]\}$. The process uses gradient descent to drive S' toward S on next iteration by adjusting an updating increment to the coefficients Δc currently.

A heuristic process can also usefully determine an optimized set of coefficients c for UE to send eNB. Thus, when a few transform coefficients can only approximate PMI vector S, some embodiments do a pre-distortion as taught hereinabove or otherwise to adjust the estimated coefficients c and can somewhat improve the approximation of S' to S if that is possible. Since UE reconstructor 118 parallels the reconstruction in block 2120 of eNB, as noted above, pre-distortion in the transform approach is feasible.

Figure 24:
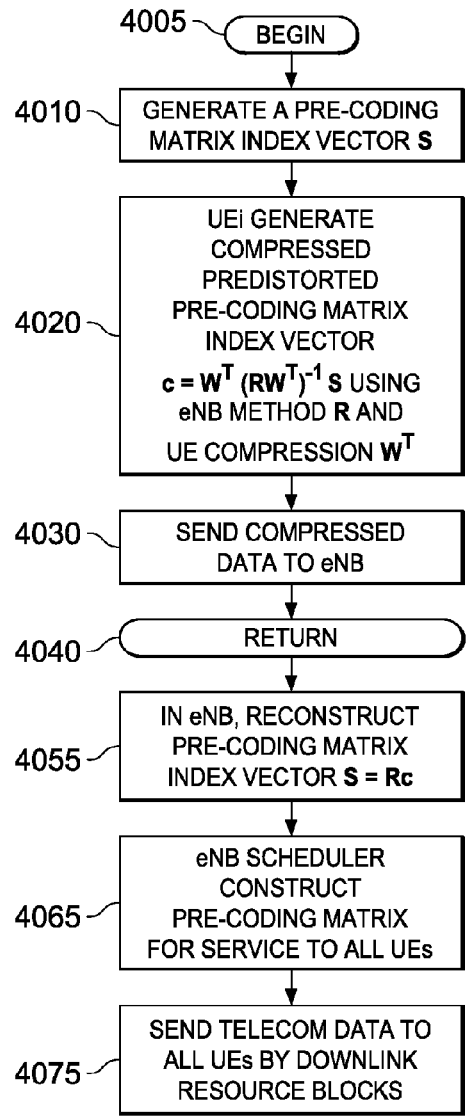
FIG. 24 is a combined flow diagram of an inventive process for matrix-based predistortion in PMI feedback at UE followed by reconstruction in base station eNB.

In FIG. 24, some embodiments approximate the result of iterations to do pre-distortion by using a closed form result equal to the limit as if iterations went on endlessly. Operations commence with a BEGIN 4005 and proceed to generate a PMI vector S at UE step 4010. These embodiments are used when they save computing time and processor energy consumption or otherwise offer advantages that commend them to a particular system. Let a set of basis vectors be symbolized W, and assume that a reconstruction process used by PMI Reconstructor 118 is symbolized by the matrix R. Suppose W and R are chosen in a very general way that is used as in FIG. 11 in an iterative way for pre-distortion. Here, however, the iterations are reduced or eliminated by using a process that generates an automatically pre-distorted coefficient vector c' from the PMI vector S in a step 4020 as follows:

$$c' = W^T (RW^T)^{-1} S.$$

Vector c' is another example of a compressed altered PMI vector. Notice that the coefficient vector C' is pre-distorted relative to the coefficient vector $C=W^T S$ that would ordinarily result from application of the basis vectors of the transform. Subject to the condition that the inverse expression $(RW^T)^{-1}$ exists, this automatic predistortion process is believed to be beneficial and efficient. This automatic predistortion method applies basis vectors without using iterations of the type to produce pre-distortion adjustments Δc in the manner shown a little earlier hereinabove. Note also that UE compute cycles are suitably reduced by off-line pre-computation of the matrix expression $W^T(RW^T)^{-1}$ and then performing only one matrix multiplication times vector S at run-time in UE.

In FIG. 24, UE at a step 4030 sends the pre-distorted coefficient vector c' as is, or with even further compression such as by joint quantization, to base station eNB. The automatically pre-distorted coefficient vector c' is suitably further pre-distorted somewhat at step 4030 by rounding, truncating, or otherwise adjusting one, some or all the element values of vector c' in some embodiments and reducing the number of bits used to communicate vector c' from a given UE to the base station eNB. Some embodiments suitably apply joint quantization to vector c' by looking vector c' up in a codebook and with step 4030 sending the index resulting from the joint quantization. Then a RETURN 4040 is reached in UE.

In base station eNB, a step 4055 reconstructs the PMI vector. When the pre-distorted coefficient vector c' is reconstructed in base station eNB, the result S' of the reconstruction reproduces PMI vector S:

$$S' = Rc' = R(W^T(RW^T)^{-1}S) = (RW^T)(RW^T)^{-1}S = S.$$

Further steps 4065 and 4075 in eNB do FIG. 12 scheduling in scheduler 2130, overall precoding in precoder 2140 and transmission of information streams.

Automatic predistortion of FIG. 24 is suitably applied to other processes wherein the description may use other concepts besides the phrase "basis vectors." Automatic predistortion is applied in such processes by establishing the W and R matrices and executing the process in an analogous manner. Then the pre-distorted vector is computed by the same automatic predistortion process $c'=W^T(R W^T)^{-1}S$ and then reconstructed by the process $S'=Rc'$, provided that there is a vector a such that $S=Wa$ and that the inverse expression $(R W^T)^{-1}$ exists.

Considering Frequency Differential PMI Feedback of FIG. 18 as a transform matrix process, the UE uses PMI vector $S^T=[S_1, S_2, \ldots S_N]$ and feeds back $C'^T=[S_{N/2}, (S_2-S_1), (S_3-S_2), \ldots, (S_N-S_{N-1})]$. Notice that the symbols "N/2" are used with some acceptable abuse of notation since the meaning can apply to any selected PMI element of the PMI vector whether centrally located in the PMI vector or not. Then in one example, the rows of matrix W constitute a (N×N) matrix and the rows of the (N×N) reconstruction matrix R for reconstructor 118 in Frequency Differential PMI Feedback are as indicated below. In each row, the differencing produces N−1 values but inclusion of the value $S_{N/2}$ delivers one more value for constituting a total of N columns in the matrix W.

$W_1=[0 -1\ 0\ 0\ 0 \ldots 0\ 0]$ ((N−1)+1=N columns)
$W_2=[0\ 1 -1\ 0\ 0 \ldots 0\ 0]$
$W_3=[0\ 0\ 1 -1\ 0 \ldots 0\ 0]$
$\ldots$
$W_{N/2}=[1\ 0\ 0\ 1 -1\ 0 \ldots 0]$
$\ldots$
$W_{N-2}=[0\ 0\ 0\ 0\ 0 \ldots -1\ 0]$
$W_{N-1}=[0\ 0\ 0\ 0\ 0 \ldots 1 -1]$
$W_N=[0\ 0\ 0\ 0\ 0 \ldots 0\ 1]$
$R_1=[1 -1 -1 -1\ 0 \ldots 0\ 0]$ ((N−1)+1=N columns)
$R_2=[1\ 0 -1 -1\ 0 \ldots 0\ 0]$
$R_{N/2-1}=[1\ 0\ 0 -1\ 0 \ldots 0\ 0]$
$R_{N/2}=[1\ 0\ 0\ 0\ 0 \ldots 0\ 0]$
$R_{N/2+1}=[1\ 0\ 0\ 0\ 1\ 0 \ldots 0]$
$\ldots$
$R_{N-1}=[1\ 0\ 0 \ldots 0\ 1 \ldots 0]$
$R_N=[1\ 0\ 0 \ldots 0\ 1 \ldots 1\ 1]$ In Frequency Differential PMI Feedback, $RW^T$ equals the sum of an identity vector plus a column vector of all ones in column N/2. The reader can verify, as an exercise, that $R=W(W^TW)^{-1}$ in separate quantization Frequency Differential PMI Feedback. Also, the result of applying a predistortion formula $c'=W^T(R W^T)^{-1}S$ leaves original compressed vector c unaffected because $(R W^T)^{-1}=(W(W^TW)^{-1}W^T)^{-1}=I^{-1}=I$, and so $c'=W^T(R W^T)^{-1}S=c$. For joint quantized Frequency Differential PMI Feedback, however, predistortion by any suitable method can still be applicable because a codebook is involved in reconstruction and because of the discrete nature of PMI (index) values.

In differential PMI Feedback of FIG. 19 considered from a matrix viewpoint, the UE operates with PMI vector $S^T=[S_1, S_2, \ldots S_N]$ and feeds back $C'_T=[F_0(S_1-F_0), (S_2-F_0), (S_3-F_0), \ldots, (S_N-F_0)]$, where $F_0$ is the reference PMI of the elements of S. Then in one example, the rows of matrix W constitute a (N×N+1) matrix and the rows of the (N×N+1) reconstruction matrix R for reference PMI and differential PMI Feedback are as indicated below. If the values are to be separately quantized, then $RW^T=I$ and feedback $c'=W^TS=c$ is sent to eNB because the predistortion process can leave the feedback unaffected. If the values are jointly quantized, then predistortion by any suitable method can still be applicable because a codebook is involved in reconstruction.

$W_1=[1\ (N-1) -1 -1 \ldots -1 -1]/N$
$W_2=[1 -1\ (N-1) -1 \ldots -1 -1]/N$
$W_{N-1}=[1 -1 -1\ (N-1) -1]/N$
$W_N=[1 -1 -1 -1\ (N-1)]/N$
$R_1=[1\ 1\ 0 \ldots 0\ 0]$
$R_2=[1\ 0\ 1 \ldots 0\ 0]$
$\ldots$
$R_{N-1}=[1\ 0\ 0 \ldots 1\ 0]$
$R_N=[1\ 0 \ldots 0\ 1]$ In some further embodiments, not only are the wavelets not necessarily even orthogonal nor have unit basis vectors, but also the inverse expression $(R W^T)^{-1}$ does not exist either. For example, suppose two or more basis vectors are not linearly independent, and the PMI vector to be reported is [4 3 3 3]. Let the wavelets be $W1=[1\ 0\ 0\ 0]$, $W2=[2\ 0\ 0\ 0]$, and $W3=[0\ 3\ 3\ 3]$, which are neither all orthogonal nor are all of them unit vectors. The UE may report $a=[2\ 1\ 1]$, It is quite possible that the PMI vector S' represented or reconstructed by applying the wavelets is only an approximation to the original PMI vector S. Accordingly, the basis vectors or wavelets and transform method that uses them should be such as to deliver an acceptable degree of approximation to PMI values that experience shows will arise in the system, and do so using few enough bits of feedback to keep the feedback overhead acceptably low. Having basis vectors that are linearly independent is likely to desirably decrease the number of bits in the feedback vector, increase the range of PMI values in the PMI vector that the basis vectors can approximate well, and may decrease the codebook(s) size.

For instance, in Pre-distorted Down-sampled PMI Feedback described above in connection with FIGS. 15 and 16, the UE feeds back some but not all of the PMI values and then reconstructs by interpolation. A simple example is represented by an expression involving a PMI vector $S^T=[S_1, S_2, \ldots S_N]$ and $c^T=[S_1, S_3, \ldots S_{N/2}]$. Then in one example, the rows of matrix W as a (N×N/2) sampling matrix and the rows of the (N×N/2) reconstruction matrix R are as indicated below. However, there does not exist a vector a such that $S=Wa$ and the inverse expression $(R W^T)^{-1}$ does not exist either.

$W_1=[1\ 0\ 0 \ldots 0\ 0]$
$W_2=[0\ 0\ 0 \ldots 0\ 0]$
$W_3=[0\ 0\ 1 \ldots 0\ 0]$
$\ldots$
$W_{N-1}=[0\ 0 \ldots 1\ 0]$
$W_N=[0\ 0\ 0 \ldots 0\ 0]$
$R_1=[1\ 0\ 0 \ldots 0\ 0]$
$R_2=[1\ 0\ 1 \ldots 0\ 0]/2$
$R_3=[0\ 0\ 1 \ldots 0\ 0]$
$\ldots$
$R_{N-1}=[0\ 0\ 0 \ldots 0\ 1]$
$R_N=[0\ 0\ 0 \ldots -1\ 3]/2$ For example, in the case of down-sampling, application of iterations $\Delta c=-0.5 W^T(S'-S)$ as described earlier hereinabove might simply continually deliver the original down sampled PMIs without change because the elements of vector S' would represent reconstructed down sampled PMIs that match the original down sampled PMIs. Accordingly, some embodiments use a predistortion method that iteratively alters the PMI vector that is delivered to the compression process with an alteration $\Delta S$ subject to the inequality $\Delta S/=(S'-S)$ but for which $$c'=W^T(S+\Delta S).$$

In such embodiments, the cost function is made at least somewhat optimized by the structures and processes taught herein. In one example of this type of embodiment, continue to let the error vector $e_k=(S'-S)$, where $S'=R W_T S$ and so $e_k=(RW^T-I)S$. then do at least one iteration to at least somewhat equalize the error element values in the error vector $e_k$.

Figure 24A:
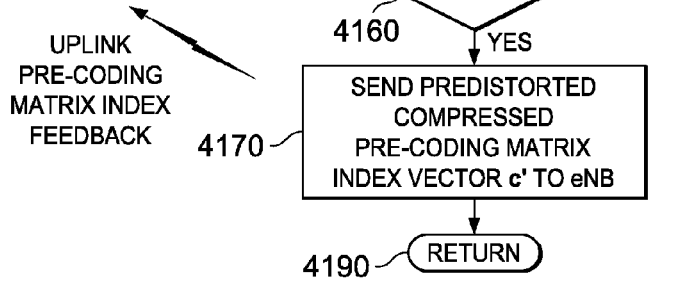
FIG. 24A is a flow diagram of an inventive iterative process of predistortion in PMI feedback at UE.

In FIG. 24A, one example of an embodiment in this category performs a search using a mixed cost function involving the error vector $e_k$ and a mean error magnitude value, and wherein the predistortion vector $\Delta S$ is given by the following expression:

$$\Delta S = 1.0|e_k|\text{SIGN}[\text{grad}(e_k^2, S')]$$

Note that the factor $|e_k|$ represents a scalar equal to the average of the absolute values of the error values in the error vector $e_k$. The scalars are multiplied by the sign of each element of gradient vector $\text{grad}(e_k^2, S')$ of the squared-error cost function $e_k^2$ and are evaluated at the latest iterated value $S'$ as indicated in the expression for the predistortion vector. If the gradient goes to zero in the process, the iterations are ended. A feedback factor of 1.0 is applied and is given an appropriate sign to promote convergence to an optimum predistortion vector in FIG. 24A. Convergence occurs when change in the values of the elements of vector $\Delta S$ become less than a small predetermined threshold parameter.

Accordingly, the iterations of UE in FIG. 24A are as follows:
1) Operations commence at BEGIN 4105 and Generate a PMI vector S at a step 4110.
2) Downsample to produce compressed PMI vector $c = W^T(S)$ at a step 4120.
3) Reconstruct using same method as base station eNB: $S' = Rc$.
4) Generate predistortion increment $\Delta S$ at a step 4140. In one example above, $$\Delta S = -1.0|e_k|\text{SIGN}(\text{grad}(\Sigma e_k^2, S'))].$$

5) Down-sample at step 4150 to produce Predistorted compressed PMI vector $c' = W^T(S' + \Delta S)$. Vector $c'$ is another example of a compressed altered PMI vector.
6) Iterate by looping back to step 3, until the iterations converge, see decision step 4160.
7) Send the resulting Predistorted compressed PMI vector $c'$ to eNB at step 4170, whence a RETURN 4190 is reached.

Some iterative predistortion embodiments use an approach wherein $$\Sigma e_k^2 = (S' + \Delta S - S')^T (S' + \Delta S - S'),$$

where $S'$ represents the current or latest point in the iterations that start with PMI vector S.

$$\Sigma e_k^2 = [(RW^T - I)S']^T [(RW^T - I)S'].$$

The gradient $\text{grad}(\Sigma e_k^2, S') = \text{grad}\{S'^T[(RW^T-I)^T(RW^T-I)]S'\}$.

In general, for a quadratic scalar function, the gradient $\text{grad}\{S^T M S\} = (M^T + M)S$. When M is symmetric, as in the present example $M = [(RW^T-I)^T(RW^T-I)]$ here, the gradient$=2MS$. Thus, in embodiments in which matrices R and $W^T$ are not functions of S, the gradient of this quadratic scalar function $\Sigma e_k^2$ is $\text{grad}(\Sigma e_k^2, S') = 2(RW^T-I)^T(RW^T-I)S'$ at any given point $S'$ in the iterations.

A gradient descent embodiment alternatively replaces step 4) or step 4140 in FIG. 24A with $$\Delta S = -2\Sigma e_k^2 \text{grad}(\Sigma e_k^2, S')/\|\text{grad}(\Sigma e_k^2, S')\|^2.$$

In the iterations, for step 4), a gradient descent embodiment using matrix $M = [(RW^T-I)^T(RW^T-I)]$ here, generates incremental predistortion $\Delta S$ in the opposite direction of the gradient and scaled. Incremental predistortion $\Delta S$ is shown as a gradient related vector $MS'$ scaled by multiplying it by the bracketed ratio of scalars as follows.

$$\Delta S = -[(S'^T MS')/(S'^T M^2 S')]MS'$$

UE processing time is suitably conserved by pre-computing the matrices M and $M^2$ (=MM) for use in some gradient descent embodiments for generating the incremental predistortion.

Figure 24B:
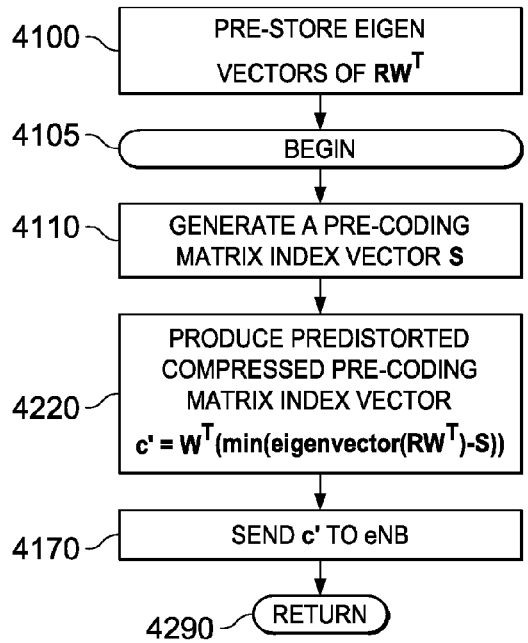
FIG. 24B is a flow diagram of an inventive eigenvector based process of predistortion in PMI feedback at UE.

In FIG. 24B, a category of predistortion embodiments recognize that convergence can occur when $$S' = RW^T(S + \Delta S) = RW^T S'.$$

This means that convergence can occur at an eigenvector $S'$ of the N×N matrix $RW^T$. Thus, predistortion is accomplished in some embodiments by using an appropriate procedure to find an eigenvector of matrix $RW^T$ scaled to approximate the original PMI vector S as indicated using an appropriate distance measure such as sum of squares or sum of absolute differences, i.e. using a procedure that replaces steps 2) through 6) above and includes a step 4220 with sub-steps:
i) $S' = \min(\text{eigenvector}(RW^T) - S)$. This means $S'$ is the scaled eigenvector of product matrix $RW^T$ that minimizes the distance of reconstructed vector $S'$ from PMI vector S.
ii) Use matrix $W^T$ (e.g., down sample) to produce Predistorted compressed PMI vector $C' = W^T S'$.

Vector $c'$ is another example of a compressed altered PMI vector. If the reconstruction process in reconstructor 118 and the determination of the compressed vector $c'$ in the UE are both describable by matrices, then the methods of FIGS. 18, 18A, and 18B are especially useful. Some embodiments may have sequences of logic and table lookups to select optimum rank or do other operations, and such logic sequences suitably include matrix-based procedures or are equivalent to them.

To save time in some embodiments, an eigenvector $S'$ of matrix $RW^T$ (corresponding to a unity 1.0 eigenvalue if it exists) is precomputed by any suitable method such as the QR algorithm and stored in the UE in a step 4100. Notice that a vector $k_1 S'$ formed by multiplying any constant as a parameter times the eigenvector $S'$ is also an eigenvector. Indeed, in some examples of downsampling (or other applicable PMI feedback process), when the rows of the product matrix $RW^T$ each sum to unity, a vector $S'' = k_2 + k_1 S'$ formed by adding or multiplying any constant times an eigenvector $S'$ is also an eigenvector. The precomputed eigenvector $S'$ suitably has a predetermined value of the parameter $k_2$ (e.g., zero) specified in some appropriate way such as the mean or some particular PMI vector element value to establish a reference value for the eigenvector. Similarly, precomputed eigenvector $S'$ has a predetermined parameter value used as $k_1$ (e.g., unity) and specified to be some measure of variation in the PMI vector such as mean deviation or standard deviation or difference of maximum value minus minimum value. Then in use, the corresponding parameters $k_1$ and $k_2$ of PMI vector S are determined and transmitted in addition to vector $c'$, or the parameters are included therein by scaling to generate $c' = k_1 c' + k_2 W^T 1$ (where bold-one 1 represents a vector having every element equal to unity).

Notice that Predistorted PMI vector $S'$, found as an eigenvector of matrix $RW^T$, is useful for approximating UE PMI vector S especially when, as in some forms of downsampling or other PMI feedback processes, the inverse does not exist for matrix $RW^T$. If the inverse exists, then predistortion $S' = (RW^T)^{-1}S$ is available, and the compressed vector $c' = W^T(RW^T)^{-1}S$ is suitably transmitted as described earlier hereinabove.

In FIG. 24B, a step 4100 pre-stores eigenvector(s) of matrix $RW^T$ for different compression TYPEs and proceeds to Main BEGIN 4105. UEi begins operation and generates a PMI vector S. Step 4220 performs a compression process that includes producing a Predistorted compressed PMI vector $c' = W^T \min(\text{eigenvector}(RW^T) - S)$. Scaling is suitably used as described hereinabove. Next a step 4170 sends Predistorted compressed PMI vector c' from UE to base station eNB, and a RETURN 4290 is reached.

Some embodiments have circuitry operable to receive signals via antennas and generate a precoding matrix index (PMI) vector in response to the received signals from the antennas, and further operate by representing a combined process of local compression and remote reconstruction, and respond to the PMI vector and the representation of the combined process to produce an altered PMI vector and to transmit a compressed representation of the altered PMI vector from at least one of the antennas. A way to represent the combined process simulates the combined process of local compression and remote reconstruction to generate a simulated PMI vector locally at the circuitry. Then the circuitry responds to the PMI vector and the simulated PMI vector to produce the altered PMI vector, such as by processing utilizing a difference between the PMI vector and the simulated PMI vector to produce the altered PMI vector by an iterative process that reduces the difference. Some circuits and processes represent the combined process of local compression and remote reconstruction by a matrix. Some embodiments produce the altered PMI vector as substantially an eigenvector of the matrix responsive to the PMI vector. Some embodiments compress the PMI vector as substantially a function of both local compression and the inverse of the matrix representing the combined process. With decision logic and rounding or other discrete numerical operations, the compression can substantially operate as expressed by the matrix formulas, but might not operate precisely like them. Also, some PMI feedback process and structure embodiments may use software or hardware logic that a matrix representation substantially represents—not precisely but to an acceptable approximation.

Figure 24C:
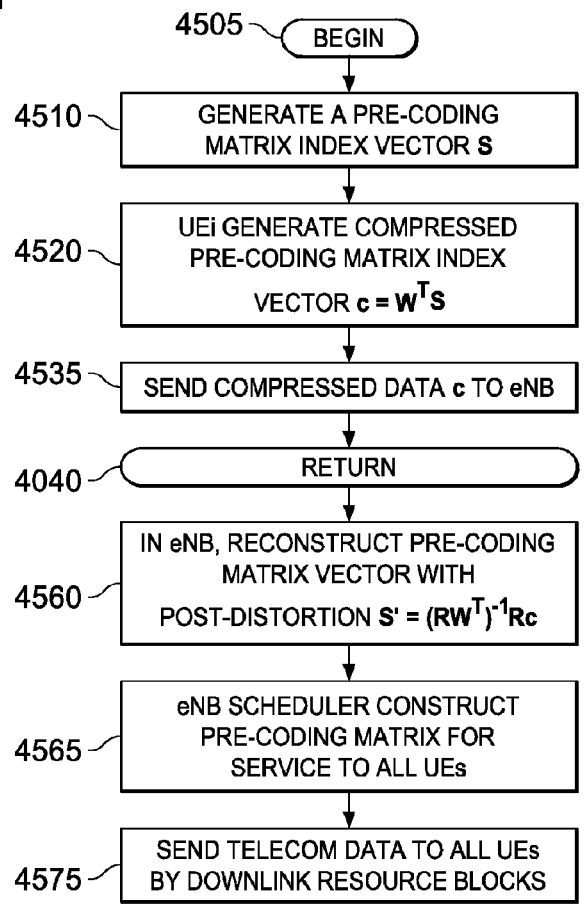
FIG. 24C is a combined flow diagram of an inventive process for matrix-based PMI feedback at UE followed by inventive process of PMI vector reconstruction with post-distortion at base station eNB.

In FIG. 24C, some embodiments utilize an automatic post-distortion supplemental process upon reception such as in the eNB. For example, suppose the selection of reconstruction matrix R does not recover the PMI vector S from the compressed feedback vector c, where $c=W^T S$. Then, provided the inverse expression $(RW^T)^{-1}$ exists, an automatic post-distortion process of multiplication by $(RW^T)^{-1}$ is applied to supplement the reconstruction process of multiplication by reconstruction matrix R. The post-distorted supplemented reconstruction process is represented by $$R' = (RW^T)^{-1} R.$$

The post-distortion supplemented reconstruction process R' is effective to recover the PMI vector S because $R'=(RW^T)^{-1}Rc=(RW^T)^{-1}RW^T S=S$.

In FIG. 24C, operations commence with a BEGIN 4505 and proceed to generate a PMI vector S in a step 4510. In a step 4520, a transform TYPE is determined, selected, and established whereupon UEi generates a compressed PMI vector $c=W^T S$ and sends compressed information communicating the compressed PMI vector c in a step 4535 whereupon a RETURN 4040 is reached in the UE. In the base station eNB, a step 4560 reconstructs the PMI vector with post-distortion by performing the operations expressed by $(RW^T)^{-1}Rc$. Then base station scheduling, overall precoding and transmission of information streams occur according to steps 4565 and 4575.

In FIG. 25, various embodiments utilize PMI vectors S with counting number or integer element values that index a PMI codebook. In general, the set of all possible ordered N-tuplets of PMI vector values for a PMI vector is very large. Some embodiments operate in reconstructor 118 to utilize PMI feedback to produce an approximation vector S', or ordered set having non-integer values, to approximate one of the N-tuplets. In other words, the approximation vector might not exactly equal an actual one of the N-tuplets that has all counting number or integer elements. In N-space, there may be as many as $2^N$ (two-to-the-N) N-tuplets nearby the approximation vector. The reconstruction process then determines which one of the actual N-tuplets to deliver as the output of the reconstructor 118 of FIG. 11 or 2120 of FIG. 12 in either or both of the UE and eNB.

For purposes of the following discussion in connection with FIG. 25, the term "accuracy" refers to the quality of nearness of the reconstructed approximation S' to a "best" one of the actual N-tuplets. Thus, accuracy pertains to the degree of approximation of reconstructed PMI vector S' (before determination of the best N-tuplet) to the original PMI vector S. The term "compression" refers to the degree to which the PMI feedback from UE to eNB utilizes relatively few actual bits. For embodiments that utilize separate quantization, the number of bits needed to represent compressed vector c (or c') is relevant to the compression and can introduce a further element of approximation into the PMI feedback process.

In FIG. 25, an M-space 4310 has discrete possible values (many dots) for the compressed vector. A process embodiment produces a non-integer approximation vector c' (triangle), the neighborhood of which has some dots 4322, 4324, 4326, 4328. The compression process in UE includes a determination of an integer compressed vector c 4328 (square), which is fed to reconstructor 118. Reconstructor 118 uses integer compressed vector c 4328 to generate a PMI approximation vector S' in a higher dimensional PMI vector N-space 4410. Various PMI vectors with integer vector values are shown in N-space 4410 as dots 4432, 4434, 4436, 4438, 4442, 4444 and 4446. (Another dot 4448 is not illustrated.) One of the integer vector values 4446 is highlighted with a star symbol because it is the integer PMI vector S that was the task of reconstructor 118 is successfully reconstruct. Part of the process executed by reconstructor 118 determines a best actual PMI vector to select from among the integer vector values in N-space 4410.

In some embodiments, either or both of the compressed vector C' (triangle) in FIG. 25 and the reconstructed PMI approximation vector S' have each vector element value rounded up, rounded down (truncated), or rounded to nearest integer or counting number to a prescribed level of precision. Precision refers to the fineness or coarseness of the rounding. Some other embodiments search the actual N-tuplets, to a greater or lesser degree of exhaustiveness less than or equal to searching all $2^N$ N-tuplets in the neighborhood of the approximation vector, and pick a best actual N-tuplet according to a criterion such as N-tuplet equality with or nearness to original PMI vector S. Still other embodiments use a rule-based evaluation procedure to find the best N-tuplet with little or no search of the actual N-tuplets. One such rule-based evaluation procedure provides an optimization function such as SNR as a function of PMI vector and picks any N-tuplet which is substantially in a plane orthogonal to the gradient of the optimization function. Some other embodiments do predistortion, or further predistortion, of the compressed vector c (or c') to deliver output for the EU reconstructor 118 and for feedback to eNB, so that the output represents compression in the M-space for the compressed altered PMI vector.

FIG. 25A illustrates a succession of codebooks and accesses to them in the configuration process of some embodiments. UE performs compression using a transform matrix $W^T$ to produce compressed feedback vector c from PMI vector S where $C=W^T S$. Depending on embodiment a UE PMI vector codebook is accessed either to indirectly compress PMI vector S by accessing one type of UE PMI codebook with feedback vector c, or to directly compress PMI vector S by accessing another type of UE PMI codebook with PMI vector S itself. A codebook index from the UE PMI codebook is communicated to the base station eNB via the uplink. An eNB PMI vector Codebook 1 is accessed with a codebook index communicated to it from the UE PMI codebook. Then eNB PMI vector Codebook 1 supplies an output corresponding to or approximating the original PMI vector S to a second codebook eNB PM Codebook 2. The eNB PM Codebook 2 supplies a precoding matrix for the sub-band(s) allocated by eNB to the UE.

FIG. 25B illustrates a plurality of UEs each determining its respective PMI vector $S_{UE1}$ and determining the best compression method such as a best transform TYPE for communicating the PMI vector with low distortion and high compression. Suppose that UE is experiencing the same PMIs over all the subbands. A compression method is sufficient if it merely sends the average PMI with a TYPE datum that simply indicates that the transform is one that distributes the average PMI into every element of the reconstructed PMI vector at the eNB. If the UE is experiencing a more complicated variation of PMI over the subbands and over time, then suppose the differential PMI feedback method with a UE differential PMI vector codebook is called for. In that case, a transmission is sent by UE to eNB including the currently applicable differential PMI vector codebook index as well as a TYPE code to represent reference PMI and differential PMI vector with UE differential PMI vector codebook. In an additional instance, suppose the UE is experiencing a substantially increasing PMI with low PMI at one end of the range of subbands and high PMI at the other end, and a Polynomial Transform would be best. In that case, a transmission is sent by UE to eNB including the currently applicable Polynomial Transform compression output as well as a TYPE code to represent that the transform is a Polynomial Transform.

The Select Best Transform block in each UE in FIG. 25B instantiates an efficient pattern recognition process to which the PMI vector S is input, and then depending on the pattern of variation of the elements of the PMI vector over the subbands, the pattern recognition process issues a particular TYPE code. Without limitation, one select-best-transform process parallel-computes compressed vector c (or c') for several transforms and chooses the transform type that delivers the most highly compressed such vector. If two or more transform types deliver nearly equal compression and accuracy, the most recently used/communicated type of transform is adopted by the UE for the latest instance of use. See also the discussion of step 3830 of FIG. 23 and FIG. 26A step 4628 in FIG. 26E step 4840. The TYPE codes are suitably assigned to the available transforms or compression methods so that codes with one or very few bits are assigned to the more commonly selected methods, and any longer TYPE codes are assigned to useful but less frequently-selected methods. To save TYPE bits, some embodiments send a difference signal from UE in the TYPE field, and eNB adds the difference to the most recently used actual TYPE in eNB to establish the actual TYPE for latest use.

In FIG. 25B, a form of the UE pattern recognition structure and process has a history memory. Both the pattern of variation of the elements of the PMI vector over the subbands as well as the history of variation of the pattern over time are taken into account, whereupon the pattern recognition process issues a particular TYPE code. Additional logic circuitry or process steps are included in the pattern recognition process used by Select Best Transform block in each UE in FIG. 25B, for instance, such as to record or enter a TYPE code in sequence in the history memory when a latest PMI vector S accesses the Select Best Transform block. Some embodiments in this category also however save transmission bits by preventing inclusion of the latest TYPE code in the transmission of the compression information when the TYPE code is the same as the most recent TYPE code in the history memory in UE, or the pattern recognition is calling for issuance of a different TYPE code for the first time when, say, the previous two TYPE instances called for are the same as each other in the history memory.

In some embodiments, the eNB in FIG. 25B maintains an eNB history memory of TYPE codes recently received from each UE. When the TYPE code is omitted by a given UEi, the eNB uses a reconstruction process on the compressed information from that UEi for the same TYPE of transform as was specified by that UEi on the last transmission when UEi sent a TYPE code as reflected in the eNB history memory entry for UEi. The eNB processing circuitry stores in memory a most-recently communicated feedback process type associated with a given UE, and then responds to information from a UE lacking the feedback process type to reconstruct the PMI vector based on a feedback process identified by the most-recently communicated feedback process type stored in memory.

In this way, embodiments not only provide PMI-related compression in the frequency domain, but also provide PMI-related compression in an historical-time domain. Indeed, some embodiments are arranged so that UE omits both the compressed PMI information and the TYPE code when they are identical to information previously sent to the base station. Instead, UEi transmits a very short code to eNB representing Already-Sent, indicative of affirmative response without need of resending previously sent information. eNB consults its history memory of compressed PMI information and TYPE code to obtain information to use when eNB receives the Already-Sent message code from a given UEi.

In FIG. 25B, the UE is thus responsive to the PMI vector according to a decision-making process that chooses from plural alternative types of compression processing of the PMI vector to execute a thus-chosen TYPE of compression processing of the PMI vector to represent the PMI vector in a compressed form, and to send a transmission communicating the compressed form. The UE can communicate the thus-chosen TYPE in the transmission, but UE also determines whether the thus-chosen TYPE is the same as a most-recently-communicated such TYPE, and in that case prevents communication of the thus-chosen TYPE in the transmission. In this way, a further degree of compression is achieved.

Each UE has a number of transforms (e.g., $W^T_{UE1}$) available to it, and individually selects one of the transforms and/or UE PMI codebook, if any, in response to the already determined best transform TYPE determined by the individual UE independently of the other UEs. The UEs use the uplink to communicate their respective information of best transform TYPE in compression vector designated (TYPE, c) UE1 to the base station eNB. The base station eNB has a Reconstructor bank which is responsive to the TYPE and the UE ID (identification) to determine which Reconstruction process and/or which type of eNB PMI codebook 1 of FIG. 25A to apply to the compressed information arriving from each UE. The appropriate reconstruction process for each UE is thereupon applied, and in FIG. 25B a reconstructed set of respective PMI vectors $S_{UE1}$, $S_{UE2}$, $S_{UEn}$ is generated for the requesting UEs. The eNB scheduler allocates RBs to the various UEs. The eNB scheduler accesses the eNB PM codebook 2 with PMI vectors $S_{UE1}$, $S_{UE2}$, $S_{UEn}$ and thereby obtains precoding matrices PM to apply to the RBs relating to which sub-band each allocated RB pertains. In this way the base station sets up the OFDMA or MIMO OFDMA transmission downlink DL.

Description of FIGS. 26A and 26E turns to hybrid PMI feedback embodiments of structure and method herein. Precoding PMI granularity is determined, varied, or adapted to have a low feedback overhead by using fewer PMI reports or fewer PMI values on average in PMI reports. High precoding PMI granularity has higher feedback overhead; however it can improve the system performance significantly by exploiting the frequency selectivity. As a consequence, some embodiments apply hybrid PMI feedback with different precoding PMI granularity in different portions of the bandwidth, to achieve a trade-off between the performance and feedback overhead.

Figure 27:
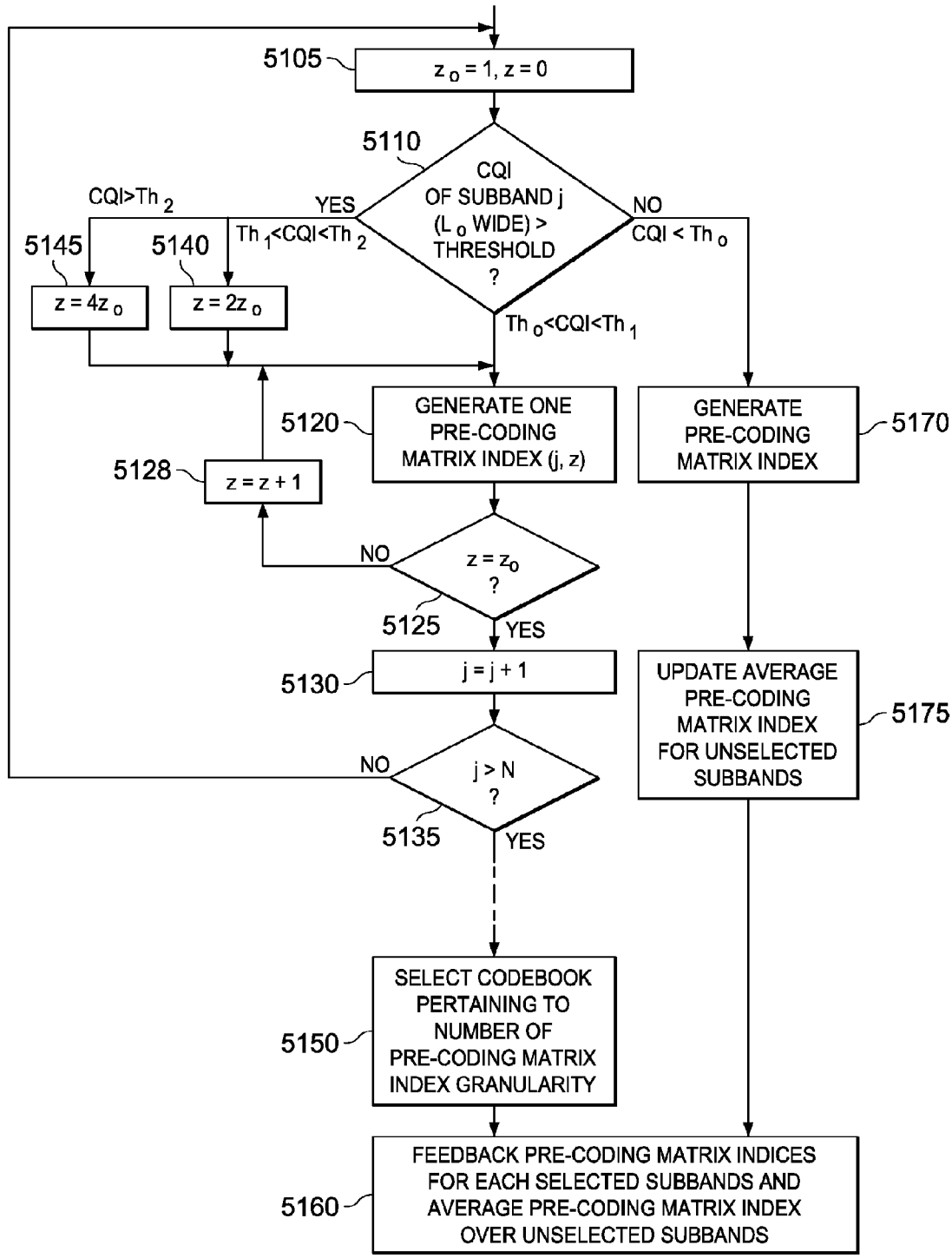
FIG. 27 is a flow diagram of an inventive alternative structure and process in UE for variable sub-band granularity of PMI feedback for use in part of FIG. 26A.
Figure 27A:
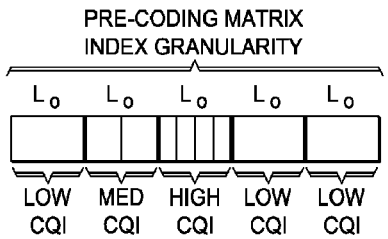
FIG. 27A is a frequency spectrum of sub-bands with variable sub-band granularity of PMI feedback generated by the inventive flow of FIG. 27.

This granularity, as it pertains to subdividing sub-bands for purposes of computing PMI, is suitably represented variously by expressions such as 1) product NL wherein N is number of sub-bands and L is number of resource blocks per subband to represent granularity, 2) a summation form $$\sum_{i=1}^{N} Li$$

wherein the number of resource blocks $L_i$ in each subband i represents granularity and varies from subband to subband, 3) a double summation form $$\sum_{i=1}^{N}\sum_{j=1}^{n} Lij$$

wherein the number of resource blocks $L_{ij}$ varies in segments j across the subbands i as in FIG. 27A to represent further variation in granularity, or 4) any other suitable expression involving granularity.

In general, sub-bands with good channel conditions are more likely to be scheduled and contribute more to the overall throughput, hence a higher PMI feedback accuracy is desirable for them. Sub-bands with poor channel conditions are less likely to be used, hence a lower PMI accuracy is allocated to decrease the feedback overhead. Accordingly, in some embodiments the number of bits used to express PMI varies with the subband index i and can vary as well with segment index j inside a subband. See FIGS. 26A and 26E.

Another category of embodiments are called Best-M PMI feedback embodiments herein. The structure and/or process selects M out of the total of N sub-bands and feeds back their corresponding PMIs. An exemplary criterion to select the M high-granularity sub-bands is suitably the maximization of throughput, or signal-to-noise-ratio (SINR), another CQI metric, or some other useful criterion. (Number M of selected sub-bands here is not to be confused with the number M of basis vectors in the discussion of wavelet-based or transform feedback elsewhere hereinabove.) The UE should also suitably feed back some indicator of which subsets are being selected (i.e., an indicator of the position of the M selected sub-bands).

Additionally, some embodiments select and feed back each PMI for any of the best M sub-bands with higher precoding granularity, such as a higher number of PMI values per subband and/or a greater number of bits to represent each PMI value more precisely, than the precoding granularity provided for each PMI of the remaining N-M sub-bands. For the remaining N-M sub-bands, a single reference PMI (e.g., average/wideband PMI) is reported in some embodiments. Alternatively, in some other embodiments a lower precoding granularity is applied which uses fewer than N-M PMI feedback values.

In one embodiment, for each of the M selected subbands, a single PMI for the corresponding subband is reported (e.g. FIG. 26C). This PMI is the absolute value of the PMI for each of the selected sub-bands, or the differential subband PMI with respect to the reference PMI.

In another embodiment, for the M selected subbands, a single "best-M" PMI is suitably reported (e.g., FIG. 26B). Here, it is a median or average or wideband PMI. Averaging is performed based on any suitable function (e.g. arithmetic mean, geometric mean, exponential averaging). For example, the single best-M PMI for the selected sub-band is chosen to maximize the performance assuming transmission over the M selected sub-bands.

In some further embodiments a single average/wideband PMI for the entire bandwidth is suitably fed back in addition to the PMIs of the M selected sub-bands. Note that for the selected M PMIs to the base station NodeB, some mixed or combined structure/process embodiments include one or more other compression processes described elsewhere herein that are suitably used to further reduce the feedback overhead. Some examples of the mixed or combined structure/process embodiments are 1) separate quantization of PMI for the M selected subbands combined with joint quantization of mean-and-Delta information on the N-M non-selected subbands, 2) use of bigger codebook with more precoding matrix entries (and thus more PMI values) to describe the M selected subbands and use of a smaller codebook, or a predetermined subset of the bigger codebook, (and thus fewer PMI values) on the N-M non-selected subbands, or 3) other appropriate mixed or combined embodiments.

In FIG. 26A, some Hybrid embodiments are also applied to change or adapt to the system bandwidth, such as by varying the number M of best sub-bands. When the number of sub-bands increases, the number of PMIs for feedback is subsequently increased. In such a case, some embodiments concurrently establish a lower precoding PMI granularity that mitigates the increase in feedback bits-count.

Note that these hybrid structures and processes are suitably used in embodiments that feed back separately quantized PMI values as well as in FIG. 27 codebook based embodiments Analogously, some Hybrid embodiments adaptively vary the precoding PMI granularity so that a higher precoding granularity is used to handle a highly frequency-selective channel with large time dispersion. Conversely, a low precoding granularity is used to handle a low frequency-selective channel.

In a method called Selected Sub-band PMI feedback herein, the PMIs corresponding to a subset of selected sub-bands are suitably fed back to eNB. Sub-band selection is configured either at eNB or UE or by both, statically, semi-statically or dynamically. For the selected sub-bands, one or multiple PMIs as in FIG. 27A are fed back. Further compression schemes on the PMIs of the selected sub-bands are suitably used as well, e.g., wideband PMI or average PMI for the selected sub-bands.

For example, base station eNB suitably negotiates with UE for more detailed PMI information. In an embodiment of FIG. 27B, eNB includes and performs a process having first, scheduler allocation followed by, second, interrogation of a particular UEi for more detailed PMI information if a high-quality channel is allocated by eNB for that particular UEi and otherwise if lower-quality is allocated, then no interrogation, and third, pre-coder matrix construction in the eNB followed by transmission to the various UEs.

The selection of the sub-bands follows one or more of the following criteria, for example.

A) A statically configured embodiment selects a fixed number of M sub-bands, where the number M at step 4624 of FIG. 26A is configured by UE in step 4614 or by eNB in step 4618. Some examples of criteria or principles for the automatic sub-band selection are but not limited to: the sub-bands with 1) the highest throughput, 2) highest SINR, 3) small variation in the PMIs of the selected M sub-bands, 4) and any other appropriate criteria of sub-band selection.

B) A dynamically configured embodiment selects a varying number of M sub-bands where the sub-band number M is adaptively configured.

B.1) Dynamically configured embodiments called Reference-Best embodiments herein, select the sub-bands with a performance metric (e.g., SINR, throughput, PMI) that is within a specified range from a certain performance reference or compliant with a criterion specified relative to a certain performance reference (e.g., SINR, throughput, PMI value of another one or subset of sub-bands) are selected, for instance. See steps 4630, 4635, and 4638 in FIG. 26A.

B.2) Alternatively, some embodiments called Relative-Best embodiments herein select a fixed or varying number of sub-bands in a step 4640 with performance that is the best among all the available sub-bands. Sub-band selection is made on the basis of maximum SINR, maximum total (summed) throughput across spatial streams, or some other suitable criterion. A variety of selection methods are applicable in this way. In dynamically configured embodiment category B.2, the M subbands may include one or more sub-bands that would otherwise have performance less than a performance reference used in category B.1, or the N-M non-selected subbands might include one or more subbands with performance that exceeds a performance reference used in category B.1.

C) Mixed: Base station sends back interrogation/negotiation message to a given UEi to obtain more fine-grained PMI information. UEi reconfigures responsively at step 4618 and complies.

Sub-band selection in various hybrid embodiments is cell (base station) specific, UE-specific, or dynamically or semi-statically configured by higher layer signaling. Base station eNB suitably sends commands to, or negotiates with, one or more of the UEs for more detailed PMI information.

Turning to the subject of PMI feedback in hybrid PMI feedback embodiments, the feedback of the PMI of the selected sub-band follows any one or a combination of following criteria and/or features: 1) Each respective value or absolute value itself of the PMI of each of the selected sub-bands. 2) Average/wideband PMI of the selected sub-bands wherein the averaging is performed based on any suitable function such as arithmetic mean, geometric mean, or exponential averaging. A single average PMI is obtained for the M selected sub-band, for example, to maximize the performance assuming transmission over the selected sub-bands. 3) In addition to the PMI for the selected sub-band, a wideband PMI is also fed back for the remaining unselected sub-bands or for all available sub-bands. 4) Differential feedback is used in feeding back the PMI of the selected sub-bands. In other words, the PMI of the selected sub-bands is encoded differentially with respect to a certain reference PMI value and then reported. The reference value is determined with the PMIs of the selected sub-bands or with all sub-bands. The reference PMI adopted is suitably the wideband PMI of all sub-bands, or a wideband PMI of the selected sub-bands, or PMI of the neighboring sub-band(s).

For the unselected sub-bands, a single wideband PMI is suitably fed back from the UE to the eNB. Still other embodiments apply other PMI compression schemes on the PMI of the unselected sub-bands. Alternatively, the wideband PMI across all sub-bands is used as a reference value fed back from UE to eNB, and eNB derives the wideband PMI for the unselected sub-bands. A process for deriving the wideband PMI $S_{uns}$ for the unselected sub-bands from the wideband PMI $S_{wb}$ across all sub-bands and from the PMI values $S_j$ for the selected sub-bands, is summarized by:

$$S_{uns} = \left( NS_{wb} - \sum_{j=Selected\#1}^{M} Sj \right) / (N - M)$$

In this process the wideband PMI for the unselected sub-bands is derived by first, recovering the arithmetic sum of all the PMIs across all subbands by multiplying the number of subbands N times the average PMI $S_{wb}$ across all the sub-bands and then second, subtracting the arithmetic sum of the PMIs $S_j$ the selected subbands, and third, dividing by the number (N−M) of unselected subbands. Note that the term "all sub-bands" refers to all the sub-bands within the system bandwidth or alternatively to the sub-bands that are semi-statically configured by the eNode B/network which are a subset of all the available sub-bands.

Another category of PMI feedback parameterizes the distribution of PMI values over all sub-bands in some embodiments. Put another way, a PMI vector is compressed by feeding back a concise and sufficient description of one or more ensembles of subbands. In some hybrid embodiments, this category of PMI feedback parameterizes the distribution of PMI values over the selected sub-bands. As its PMI feedback to eNB, the UE feeds back the distribution shape-type, and 1, 2, or a few parameters of that distribution shape-type.

Figure 28:
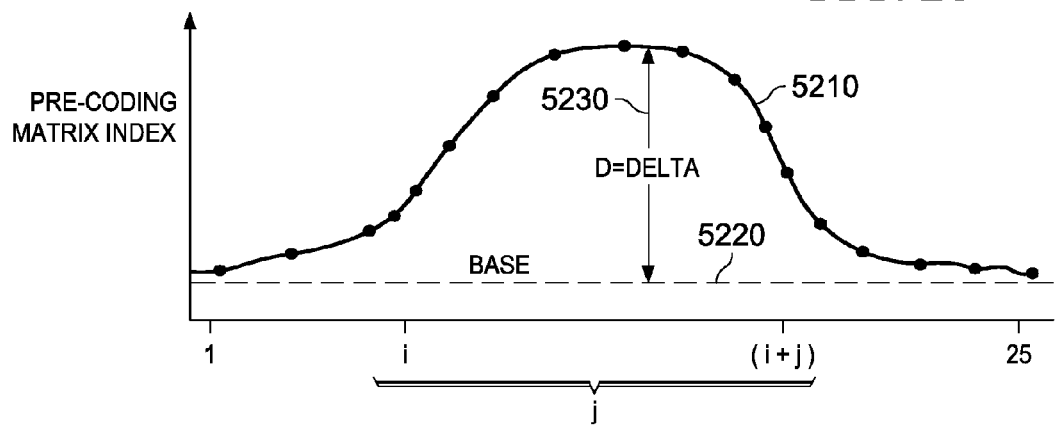
FIG. 28 is a graph of PMI versus frequency (in terms of RB index), showing a pulse method of parameterization of a PMI vector.

In FIG. 28, for instance, one such parameterized distribution method, herein called Pulse Shaped PMI Feedback, regards the group of adjacent sub-bands as constituting a pulse shape 5210 or being analogous to a pulse for purposes of representation. This Impulse method involves a type of wavelet form used to construct the set. This pulse is represented or determined by the starting position i of the pulse, its duration j, a base PMI, and the difference delta 5230 of its peak PMI with respect to a base PMI 5220. Feeding back these parameters represents and describes the PMI structure at Node B.

One example of the Best-M PMI feedback is the scenario where a group of adjacent sub-bands have good channel conditions and therefore are more likely to be scheduled. In such a case, a single PMI is chosen for these adjacent sub-bands and another PMI is selected for the remaining N−M sub-bands. Then UE feeds back these two PMIs, or uses one PMI as the base and feeds back the difference of these two PMIs to reduce the number of bits.

Returning to FIG. 26A, UE operation commences at a BEGIN 4605 and proceeds to select a hybrid PMI feedback configuration mode at a decision step 4610 which monitors configuration transmissions of FIG. 26E from eNB. In one example of UE logic for decision step 4610 in FIG. 26A, a mode called UE Configuration Mode here is selected and operations go to a step 4614 to activate UE Configuration Mode unless base station eNB in FIG. 26E mandates otherwise. If base station eNB in FIG. 26E mandates otherwise as monitored in step 4610, then operations instead select a mode called eNB Configuration Mode here and branch to a step 4618 that activates the eNB Configuration Mode.

These modes, UE Configuration Mode and eNB Configuration Mode, respectively establish parameters and controls over hybrid PMI feedback that are responsive to UE itself or base station eNB depending on the applicable mode. The parameters and controls are established in some embodiments according to step 4622 for Relative Mode or Absolute Mode, step 4624 for a number M of selected subbands, step 4626 specifying total number N of subbands and a width granularity number L for a selected subbands, and a step 4628 specifying a Feedback Process Code such as a transform TYPE or other high-level type of code. Regarding step 4628, see also discussion of step 3830 of FIG. 23 and Select Best Transform in FIG. 25B. Flow arrows couple each of steps 4614 and 4618 to each of steps 4622, 4624, 4626, 4628 so that the applicable UE Configuration Mode or eNB Configuration Mode establishes parameters and mode controls over hybrid PMI feedback.

If step 4622 establishes Absolute mode, operations go to a loop having steps 4630, 4635, 4638. (For an alternative embodiment of this loop, see FIG. 27.) In FIG. 26A, loop 4630, 4635, 4638 selects all Reference-Best (criterion B.1) subbands j of width L having, e.g., CQI(j) such as SINR(j) in subband j that exceeds a predetermined threshold and such selection operationalizes the Absolute mode. The loop uses the parameters N and L that were established in step 4626 to search all N subbands using width L. Step 4630 detects whether the threshold is exceeded by the SINR in a given sub-band j. If Yes in step 4630, then operations proceed to step 4635 to record a one (1) at a position j (current value of index j) in a subband vector SV2(j) and then go to step 4638 to increment the index j. If No in step 4630, then operations instead record a zero (0) at position j in SV2(j) and proceed to step 4638 to increment the index j. If incremented index j exceeds the number N of subbands, the loop is Done and operations proceed from step 4630 to a step 4645.

If step 4622 establishes Relative mode, operations go to a step 4640 that selects a number M of Relative-Best (criterion B.2) subbands j of width L having, e.g., highest CQI such as SINR, and such selection operationalizes the Relative mode. Step 4640 uses the parameters M and L that were established in steps 4624 and 4626, and searches all N subbands according to the number N established in step 4626. Operations proceed from step 4640 to step 4645.

Figure 27B:
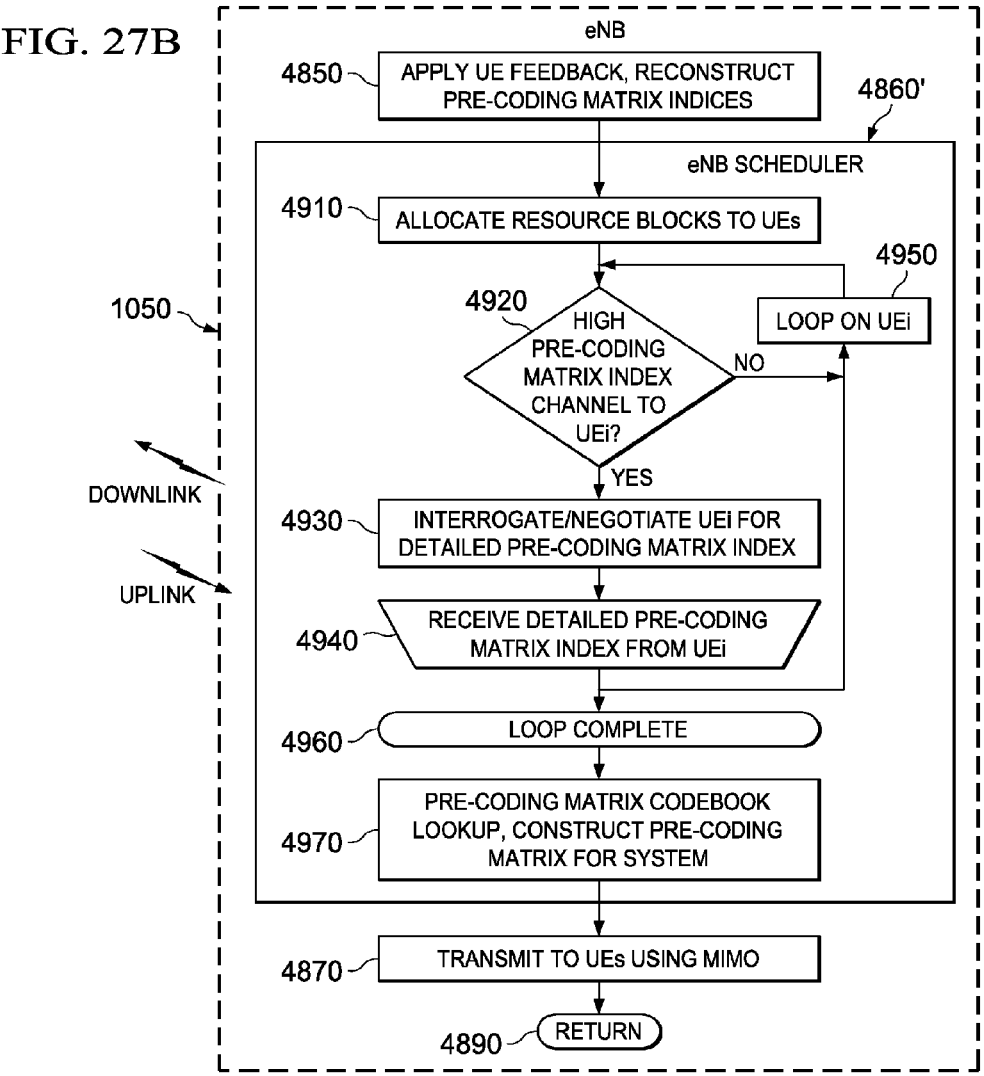
FIG. 27B is a flow diagram of an inventive structure and process in base station eNB for interrogating or negotiating with one or more individual devices UEi to obtain detailed PMI feedback for some sub-bands.

If step 4622 establishes a Directed mode under eNB Configuration Mode, operations go to step 4645 and directly load a subband vector SV2 with a particular series of ones and zeros responsive to, and/or as directed and/or specified by base station eNB step 4810 (see also step 4840) of FIG. 26E or eNB step 4930 of FIG. 27B. If step 4622 establishes a Directed mode under UE Configuration Mode, operations go to step 4645 and directly load a subband vector SV2 with a particular series of ones and zeros as directed and/or specified by UE itself. In this way, particular subband(s) from FIG. 26D can be selected for UE to report respective PMI values for the subband(s).

At step 4645, a subband vector SV2 is now constituted and has N elements forming a series of ones and zeros that represent whether each subband is selected or not in FIG. 26D. This subband vector SV2 of step 4645 in FIG. 26A is the same length as, but represents a different meaning from that of, subband vector SV of FIG. 21 step 3530 and FIG. 22. Next, a step 4650 counts the number of ones in subband vector SV2 to establish the resulting number M of selected subbands resulting when the Absolute Mode has been executed.

A further step 4655 generates PMI values for the number M of selected subbands due to either Relative or Absolute mode. A step 4660 generates one or more PMI values to either individually or collectively describe the un-selected subbands that are N-M in number. The PMI value(s) generated in step 4660 for the un-selected subbands have a precision or accuracy that is less than the precision or accuracy of the PMI values for the number M of selected subbands generated in step 4655. This feature efficiently reduces the bits needed to communicate the PMI values for all N subbands as a whole.

A succeeding step 4665 assembles the PMI values into a PMI vector S, to which is associated a Feedback Process Code from step 4628, mode specifiers from step 4622, an identification UE_ID of the UE, CQI, rank and any other relevant configuration information or representing-information not already communicated by UE in some other way or already stored at base station eNB. Then depending on the Feedback Process Code, a decision step 4670 flows operations to any one (or more) of several PMI feedback processes described elsewhere herein, such as Down Sample 4675, Predistortion 4680, Frequency Differential 4685, In FIG. 26E, operations in base station eNB commence with a begin 4805 and proceed to a decision step 4810 that determines a PMI feedback modality depending on static eNB configuration, network cell configuration, or dynamic network considerations, CQI history, history of feedback from UEs, etc. as desired. Depending on the determination of, or configuration in step 4610, a succeeding step 4820 transmits configuration information to the UEs on downlink DL. For example, as reflected by step 4830, base station eNB can determine at step 4810 to release one, some, or all of the UEs to select or self-determine their own mode such as UE Configuration Mode at step 4610. An eNB step 4840 specifies the modes and parameters applicable to each of the UEi, such as Relative/Absolute/Directed, M, L, N, and Feedback Process Code FBProc. Regarding FBProc at step 4840 and/or 4628, see also discussion of step 3830 of FIG. 23 and Select Best Transform in FIG. 25B. If eNB has predetermined the modes and parameters, it loads their values in step 4840 directly and eNB remotely controls the UE configuration or modes of constituting PMI feedback. If eNB has released any UEi to select its own mode of constituting PMI feedback, then eNB receives values on the uplink for step 4840 along with the PMI feedback. Then in eNB, a step 4850 applies and executes the UE PMI feedback and reconstructs PMI vectors for the UEs in any applicable and appropriate manner employing structure and process described elsewhere herein. In steps 4860 and 4870, the scheduling of RBs, precoder construction of overall precoding matrix PM, and transmission of information streams to the UEs is performed whereupon a RETURN 4890 is reached.

FIG. 27 depicts a process embodiment that is substituted for the loop 4630, 4635, 4638 of FIG. 26A. A subband index j previously has been initialized to unity (j=1), and a subband width parameter L has previously been established. Suppose the width L=4. In FIG. 27, operations of a step 5105 initialize subband width granularity parameter $z_0=1$, and set subband segment index z=1. The granularity parameter value unity ($z_0=1$) means that the subband width is not subdivided into segments. Then a decision step 5110 detects whether the CQI for subband index j exceeds a predetermined base Threshold value TH0 but does not exceed either of two higher In FIG. 27, if decision step 5110 detects that the CQI for subband index j exceeds a first threshold value TH1 but not the higher second threshold value TH2, then operations branch to a step 5140 and increase granularity parameter value z=2z₀, meaning that subband j is subdivided into two segments. See FIG. 27A showing five subbands (N=5) with differing segmentation z₀ that can be produced by the operations of the embodiment of FIG. 27. Operations in FIG. 27 go from step 5140 to step 5120 and generate a PMI for subband j, first segment z=1. Decision step 5125 determines that the segments are not all PMI-evaluated, then increments segment index z at a step 5128 that loops back to step 5120. Step 5120 generates a PMI value for subband j, second segment z=2. Decision step 5125 determines that the segments are all PMI-evaluated (Yes) then operations proceed to the next subband using steps 5130 and 5135. Earlier, at decision step 5110, if the CQI for subband index j were to exceed the higher threshold value TH2, the flow sends operation to a step 5145 to segment the subband j to have more than two segments, whereupon steps 5120, 5125, 5128 generate PMI(j,z) for all the segments of subband j.

In FIG. 27, upon completion of PMI evaluation for all of the subbands j and segments z, operations proceed from step 5135 and perform appropriate FIG. 26A intermediate steps such as steps 4645, 4650 and then proceed to a FIG. 27 step 5150 that selects a PMI vector codebook pertaining to the amount of PMI granularity across the vector space (j, z). Then a step 5160 actually feeds back PMI information in compressed form to eNB for the selected subbands (CQI>TH0) selected by step 5110. For any subband(s) having CQI less than the base threshold value (CQI<TH0) at decision step 5110, such subband(s) are recorded as unselected and steps 5170 and 5175 perform low granularity or low precision/accuracy PMI evaluation for them, whereupon this information is fed to step 5160. Step 5160 suitably sends back an average PMI for the unselected subbands.

As noted hereinabove, see FIG. 27A showing five subbands (N=5) with differing segmentation z that can be produced by the operations of the embodiment of FIG. 27.

In FIG. 27B, another embodiment is described for PMI feedback interrogation/negotiation with reference to base station eNB of FIG. 26E. In FIG. 27B, after Reconstruction step 4850, operations in a modified eNB scheduler 4860' execute a step 4910 that allocates RBs to UEs. Then a loop including steps 4920, 4930, 4940, 4950 gets more detailed PMI feedback information if and as needed from one or more of the UEs. Step 4920 determines if step 4910 has allocated a high throughput channel to a given UEi. If so, operations proceed to a step 4930 to interrogate or negotiate with that UEi to obtain more detailed PMI information by remote origination of control signals from eNB. Step 4930 interrogates UEi over downlink DL by invoking Directed mode and specifying each subband j for which more PMI information is needed. UEi responds by establishing eNB Configuration Mode at step 4618 and Directed mode at step 4622 of FIG. 26A. UEi in some embodiments also uses the process of step FIG. 27 to subdivide the PMI feedback into segments as in FIG. 27A in each subband for which more PMI information was requested by eNB. UEi sends back responsive detailed PMI feedback to eNB. In FIG. 27B, a step 4940 in eNB receives the responsive detailed PMI feedback from UEi. A loop step 4950 loops over all the UEs or represents handling them in parallel depending on embodiment, whereupon operations are complete at a step 4960. Operations then go to a precoder step 4970 that constructs an overall precoding matrix PM using the detailed PMI feedback from interrogated UEs as well as the PMI feedback from step 4850 from the other UEs. Operations of a step 4870 then transmit MIMO information streams to the UEs whereupon RETURN 4890 is reached.

Figure 29:
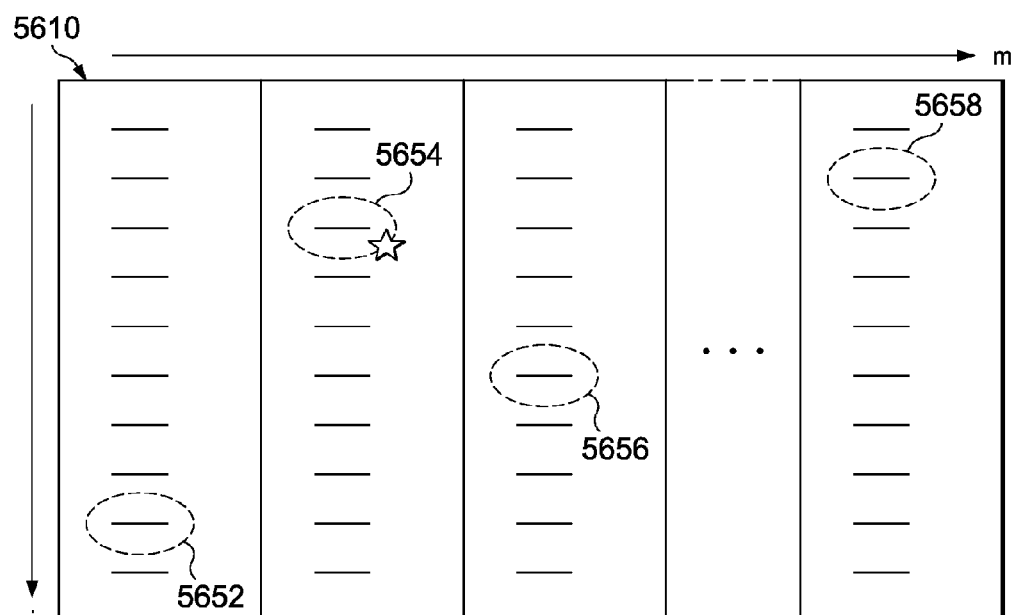
FIG. 29 is a diagram of a data structure having columns of performance measure distances of respective codewords in a codebook relative to a given PMI vector, the columns corresponding to different base values for use in an inventive process of reconstructing PMI feedback.

Description now turns to embodiments of structure and process for combinatorial compression and/or joint quantization for PMI Feedback. These embodiments are used or adapted for use according to the description elsewhere herein such as regarding FIG. 15 steps 2350, 2420, 2430; FIG. 17 step 2640; FIG. 18A steps 2880, 3010; FIG. 19 steps 3130, 3210; FIG. 20 steps 3340, 3420; FIG. 21 steps 3540, 3550, 3610; FIG. 25A; FIG. 27 step 5150; FIG. 29; and elsewhere herein as applicable. PMI values are integer numbers. A base PMI value is fed back. The other PMI values are then compressed first by generating and using their respective differences with respect to the base PMI value. See also descriptions of various difference-based compression methods elsewhere hereinabove. A codebook of quantized PMI vectors resulting from the difference-based compression is then developed, and the combinatorial compression process finds the nearest element in the codebook based on the feedback vector such as by rounding off the feedback vector to the nearest element in the codebook.

One example of such a combinatorial method is given next:
1. Let S={$S_1, \ldots S_N$} be PMIs to be fed back. First, a reference PMI is computed from the vectors S. Let this value be (i) the quantized mean of {$S_i$}, (ii) the quantized median of {$S_i$}, (iii) a single PMI that maximizes the system performance according to certain metric (e.g. sum throughput), i.e., wideband PMI, or (iv) the quantized mean of the minimum and maximum values, i.e., $$S_0 = \left\lceil \frac{\max(S) + \min(S)}{2} \right\rceil,$$

or any other suitable formula representing a reference PMI.

2. Next, the differences D={$D_1, \ldots, D_N$} are calculated, as given by $$D_i = S_i - S_0$$

3. Now a codebook C={$C_1, C_2, \ldots, C_M$} of all valid feedback difference vectors is chosen. In one example, the codebook consists of a well-chosen set of vectors which approximate actual difference vectors D with high probability. In another example, the codebook consists of sequences which contain at least K (<=N) zero elements. In another example, sequences are chosen with optimized inter-element Euclidean distances such as by using the Lloyd algorithm for instance.

4. Given the codebook, one chooses the codebook element that is closest to the actual difference vector D. One metric of closeness is the Euclidean distance, and other metrics of closeness are feasible. Thus, the chosen feedback vector for a difference vector D would be $$c_i = \arg\min_{1 \le j \le P} \|D - C_j\|^2$$

5. The index i in the codebook and the base value of the reference $PMI^{S_0}$ are fed back. The node-B reconstructs the PMI by adding the quantized difference vector Ci to the base layer reference PMI S0. The number of bits used is only 4+$\lceil \log_2 P \rceil$, i.e., 4+Ceil(log 2P) which can represent a substantial improvement over separate quantization. (Separate quantization instead may lead to a larger number of bits given by 4+Ceil [log 2(DjN)] treating the PMI as uncorrelated and thus binary coding every possible PMI vector, or worse yet, 4+N⌈log₂Dj⌉ by binary coding each PMI in every possible PMI vector.)

In some embodiments herein, joint quantization delivers a compression output in response to a presented one of many possible PMI vectors x that are more numerous than the number of possible compression output values or vectors y from which selection of a particular one compression output y is made. Joint quantization thus partitions the set of possible presented PMI vectors x (i.e., like PMI vector S elsewhere herein) and maps the partitions to the less numerous number r (called levels) of possible compression output values or vectors y. From a codebook perspective, the compression output values or vectors y are regarded as codebook entries identified by a superscript-c in some of the description elsewhere herein (e.g., $S_i^c$).

Given a metric of distortion D due to the compression, an optimizing procedure is executed to minimize the distortion D. The metric is suitably a summation over many training points each summand involving Euclidean distance d (sum of squared differences between centroid vector elements and corresponding elements of each given PMI vector defining one training point) or any other suitable distortion metric. The procedure specifies the partitions P of the set of possible presented PMI vectors x, and determines the best set of compression output values themselves (also called centroids ŷ).

The procedure in some embodiments includes a portion of the procedure that works in an alternating, iterative way from determining centroids ŷ to determining partitions P to determining new centroids ŷ to determining new partitions P etc. In this way the procedure homes in on an optimal quantizer. The procedure can optimize the quantizer, and the quantizer is loaded into UE and eNB for execution of the quantizer without need of further optimization at runtime. In the process, a set of PMI vectors computed by a UE in actual operation of the system is thus used as a training sequence or set. It is acceptable for the actual probability density distribution of the PMI vectors to be unknown and quantizer optimization training data is provided and includes a set of PMI vectors from actual use or to be expected.

STEP (0) Initialization: Given r=number of levels, a distortion threshold e>=0, and an initial r-level codebook C of centroids $y_i$ with binary number indices called PMI vector compression codebook indices (to use as a set of r joint quantization possible outputs), and a training sequence of at least a number r of PMI vectors $x_j$. Set iteration index m=0. Determination of an adequate number r of levels to use and determination of an initial set of centroids are performed in this Step (0). Find the vector average of all the PMI vectors $x_j$ in the training set and store it as a preliminary centroid $y_0$. Arbitrarily, randomly, or deterministically specify a nonzero vector $v_0$. Then define a hyperplane including the preliminary centroid $y_0$ wherein the hyperplane is perpendicular to the vector v according to the inner product equation $v_0 \cdot (y-y_0)=0$ where the vector y represents general position in the vector space. The hyperplane divides the space into two partition subsets $P_1$ and $P_2$. The initialization procedure assigns the various PMI vectors $x_j$ from the training set to partition subset $P_1$ if $v_0 \cdot (x_j-y_0)<0$ or to partition subset $P_2$ if $v_0 \cdot (x_j-y_0)>=0$. The initialization procedure loops to split up each partition subset by analogously finding the centroid of just the PMI vectors assigned to that partition subset, establish a vector $v_i$ and inner product inequality assignment criteria $v_i \cdot (x_j-y_i)>=0$ (or not) involving the latest centroid $y_i$ and vector $v_i$, and assign the PMI vectors to ever smaller partition subsets constituted by the assignment criteria. The process does not split up a partition subset if the result assigns fewer than a predetermined fraction $k_t$ of PMI vectors from the training set. As a result, the initialization process establishes a set of r centroids $y_i$. A given value of predetermined fraction $k_t$ in general provides more compression but more quantizer distortion does a smaller value of fraction $k_t$ that is greater than zero.

STEP (1) Given a set of r centroids $y_i$, find for iteration m the minimum distortion partition set $P^m$ that divides up all the PMI vectors $x_j$ of the training sequence. Step (1) establishes a number r of partition subsets $P_i$ of partition set P to divide up all the PMI vectors $x_j$ of the training sequence among the partition subsets $P_i$. Any one partition subset $P_i$ is a collection including one or more of the PMI vectors $x_j$ of the training sequence. Any particular PMI vector $x_j$ is assigned to a respective partition subset $P_i$ if $d(x_j,y_i)<=d(x_j, y_i)$ meaning that PMI vector xj is closer to one centroid $y_i$ than any of the other centroids $y_i$. Random assignment is made if PMI vector $x_j$ is equally close to more than one centroid $y_i$, so that random assignment of PMI vector $x_j$ is made to one of the equally close centroids. With Step (1) partitions set up, calculate the average distortion D on iteration m $$Dm = D(C, P_m) = 1/n \sum_{j=0}^{n-1} \min d(x_j, y),$$

where y is any entry in the codebook C, and the summation uses the minimum distance d of each PMI vector in the training sequence to the closest centroid entry in the codebook.

STEP (2): If the iterations have settled as indicated by $(D_{m-1}-D_m)/D$, <e, a configured small number, then go to Step (3). Otherwise, update the set of r centroids $y_i$ for the codebook given the minimum distortion partition set $P^m$ found in step (1). To do this, each updated centroid $y_i$ is the average, i.e., the vector sum divided by the number, of all the training vectors $x_j$ that were assigned to the corresponding partition subset $P_i$. Increment iteration index m to m+1 and loop back to step (1).

STEP (3) Adopt the latest set of centroids $y_i$ and adopt the latest partition P, thereby describing the optimized joint quantizer. Round each of the centroids $y_i$ to nearest desired amount $k_b$ of precision or accuracy (e.g., nearest positive integer $k_b=1$, or nearest positive even integer $k_b=2$, nearest binary fraction $k_b=\frac{1}{2}$, etc.). Store the rounded centroids ~$y_i$. Other things equal, a larger amount $k_b$ means more compression but more distortion. Deliver/transmit the rounded centroids ~$y_i$ to UE and eNB, or from one of them to the other, and implement the same distance measure $d(x_j, $~$y_i)$ at both UE and eNB to define the quantizer.

Some embodiments provide the joint quantizer pre-established and pre-optimized and made ready for run-time operation when the telecom application is configured. Some other embodiments store a sequence of PMI vectors generated by the UE, for instance, in actual operation and then occasionally re-optimize, retrain, or update the joint quantizer by using the stored sequence of PMI vectors to augment or improve the training sequence $x_j$ using an optimization procedure such as the iterative procedure described above, and based on the actual system experience of the UE. Upon such occasions, the UE signals eNB and transmits updated rounded centroids ~$y_i$ to eNB prior to further UE run time transmissions using the updated joint quantizer. Base station eNB updates the PMI vector codebook with updated rounded centroids ~$y_i$ to apply to such further receptions from that UE.

With the joint quantizer completed, constructed, and/or optimized or re-optimized at any given time, operations proceed to use the joint quantizer to facilitate efficient communications between UE and eNB. See FIG. 15 steps 2350 and 2430, FIG. 17 step 2640, FIG. 18A steps 2880 and 3010, FIG. 19 steps 3130 and 3210, and FIG. 20 steps 3340 and 3420, and FIG. 21 steps 3540, 3550, and 3610. Additionally, see FIG. 23 steps 3850 and 3920, and FIG. 27 steps 5150 and 5160. Thus, a joint quantizer at UE is included in or accommodates some of the various different embodiments described herein. Joint quantization is applied to any one or more of a PMI vector S or related compressed and/or Predistorted vector such as S', c or c' the generation of each of which are discussed elsewhere herein. At run time, any of these vectors are suitably input to the joint quantizer as a latest input vector $x_j$ to be joint quantized.

The joint quantizer in UE uses the distance measure $d(x_j, \sim y_i) <= d(x_j, \sim y_i)$ to find which one centroid or rounded codebook entry $\sim y_i$ is closer to latest input vector $x_j$ than any of the other centroids $\sim y_i$. Random centroid selection is made if PMI vector $x_j$ is equally close to more than one centroid $\sim y_i$, so that random assignment of PMI vector $x_j$ is made to one of the equally close centroids. The selected centroid/codebook entry $\sim y_i$, is mapped to its index i. That index i is issued from the joint quantizer as its output for transmission to eNB. In some embodiments wherein the index i is a counting number, transmitting the index i is a highly compressed and efficient method of communicating information in the PMI vector $x_j$.

Conversely, in base station eNB, that index i issued from the UE is received and used to access or look up the centroid/codebook entry $\sim y_i$, that is correspondingly mapped to index i. In embodiments wherein codebook entry $\sim y_i$ represents or approximates a PMI vector S, then the PMI vector S is effectively provided to eNB from the particular UE and correspondingly provided from all other UEs from which the eNB uses PMI vector information in FIG. 12. Also, elements of that PMI vector S are or may be individually used to access a distinct pre-coder matrix codebook in base station eNB, so that any one, some or all of the pre-coder matrices corresponding to every sub-band are selected according to the allocation of RBs made by the scheduler 2130 and then the selected pre-coder matrices are combined to establish the overall precoding matrix PM output of FIG. 12 pre-coder 2140 that controls the MIMO OFDMA transmissions to all the UEs.

In some other embodiments wherein codebook entry $\sim y_i$, is represents, or approximates a compressed, differenced, and/or Predistorted vector such as S', c or c' as discussed elsewhere herein, then PMI Reconstructor 2120 of FIG. 12 includes further reconstructor processing such as applying a matrix multiplication by the reconstruction matrix R The output of Reconstructor 2120 then is the product or result of multiplication of codebook entry $\sim y_i$ by the reconstruction matrix R. The output of Reconstructor 2120 represents or approximates a PMI vector S, so that the PMI vector S is effectively provided to eNB from the particular UE and correspondingly provided from all other UEs from which the eNB uses PMI vector information for scheduler 2130 of FIG. 12 and leads to overall precoding matrix output of FIG. 4 pre-coder W 157 that controls the MIMO OFDMA transmissions to all the UEs.

The description now turns to further forms of Codebook Generation or codebook construction. A first method category is based on channel statistics and a second method category uses systematically constructive ways to build codebooks.

In a process embodiment to construct a Statistical Codebook, the process first collects channel statistics and computes delta PMIs and an appropriate base layer PMI $S_0$. (The delta PMIs are PMI vectors that have base value $S_0$ subtracted from every PMI vector element.) With collected channel statistics of delta PMIs, the process counts patterns that occur and obtains P patterns that have the maximum counts. These patterns form a codebook. For example, let the set of vectors $\{d_1,d_2,d_1,d_3, d_4,d_1,d_2,d_2,d_1,d_4\}$ be a set of hypothetical collected statistics of delta PMIs. The vector $d_1$ occurs 4 times, $d_2$ occurs 3 times, $d_3$ occurs once, and $d_4$ occurs twice. If codebook size is 2 (P=2), then C=$\{d_1, d_2\}$. If codebook size is 3 (P=3), then C=$\{d_1, d_2, D_4\}$. Examples of feasible further restrictions are 1) that each of $d_i$ is a zero-sum vector such as when base value $S_0$ represents a mean value of the actual PMI vector; and/or 2) that the integer values in each element of $d_i$ are restricted to the set $\{0,\pm M,\pm(M-1), \ldots, \pm 1\}$ where the parameter M is some counting number that is at least unity (1).

Systematically constructive codebook design methods herein usefully build deterministic codebooks. One construction method employs run length coding to represent repetitious symbols by their number of repetitions. One of the run length codebook generation methods is parameterized by a parameter vector $(i_1,i_2,l_1,l_2)$. The parameters $i_1$ and $i_2$ suitably are counting numbers that represent the starting locations of a run of positive pulses (+1, ... +1) and a run of negative pulses (−1, ... , −1) respectively. The parameters $l_1$ and $l_2$ are counting numbers that represent the lengths of the run of positive pulses and the run of negative pulses, respectively. A set of these collections forms a codebook. Any of several constraints on $l_1$ and $l_2$ is suitably adopted. For example, the constraint $l_1=l_2$ makes the sum of elements of codewords (i.e., the mean) be zero. Note that under this constraint each run length $l_1=l_2$ is any integer between 0 and $$\left\lfloor \frac{N}{2} \right\rfloor.$$

Under this constraint, and restricting the pulses to be +1 and −1, the number of codewords is as follows.

If N=2k+1 (odd number N of subbands), the number P of codewords is $$\frac{k(4k-5)(k+1)}{3} + 1.$$

Using such a PMI compression embodiment for odd number N, and assuming a base value $S_0$ occupies four bits, delivers a number of bits per subband given by the expression 1/N{4+Ceil{$\log_2[1+(2N^3+3N^2-2N-3)/12]$}}.

For example, given five subbands, only 1.8 bits per subband are needed to communicate a codebook index corresponding to a selected one of 27 PMI vector codewords from the codebook.

If N=2k (even number N of subbands), the number P of codewords is $$\frac{k(4k-1)(k-1)}{3} + 1.$$

Using such a PMI compression embodiment for even number N, and assuming a base value $S_0$ occupies four bits, delivers a number of bits per subband given by the expression 1/N{4+Ceil{$\log_2[1+(2N^3+3N_2-2N)/12]$}}.

For example, given six subbands, only 1.67 bits per subband are needed to communicate a codebook index corresponding to a selected one of 45 PMI vector codewords from the codebook.

The codebook is also extended with entries in that include pulses that have more than ±1 values in the elements of codewords. Then the extended codebook is constituted as a collection, i.e., the set union U, of not only runs of ±1 and runs of −1, but also such runs multiplied by counting numbers i having values of 2 or more, as represented by the equation.

$$C' = \bigcup_{i=1}^{M} iC_{RunLength}$$

Using two run length parameters $l_1$ and $l_2$ deals with only two runs in the codebook. In general, any suitable number of runs parameterized by more run length parameters $l_2, l_2, \ldots$ are contemplated, and any type of run length codebook is contemplated herein.

Every possible union of these codebooks forms a set of codebooks, any of which are appropriately considered by the skilled worker for adoption in a system embodiment.

The number of codewords in a codebook is reduced by selecting a subset of an entire run length codebook as a codebook. For example, the level is suitably restricted to have a specific number m and a run length to have a specific number l.

Another PMI vector communication method embodiment employs a run length codebook with oscillation. In the frequency domain, a channel can be oscillatory or periodic because of FFT operations on channel taps, hence the PMI suitably also is made oscillatory in some fashion or according to some oscillatory pattern.

One of the run length oscillatory codebook generation methods uses +1 and −1 elements with oscillation. The oscillatory run length codebook is parameterized by a parameter vector $(l_1, l_2, l_3, l_4)$ wherein $l_1$ and $l_2$ are the lengths of consecutive +1's and −1's, respectively. The parameters $l_3$ and $l_4$ represent the length of consecutive 0's between +1's and −1's, and between −1's and +1's, respectively. A set of these collections forms a codebook. Any of several constraints on parameters $l_1, l_2, l_3, l_4$ is or are feasible. A first example is a constraint wherein parameters are made equal, $l_1 = l_2$. An additional constraint on two more parameters, wherein $l_3 = l_4$, is suitably provided so that the waveform of codewords is purely periodic.

A cyclic shift of the codewords is provided when it is desired to make many other codewords. For example, given a codeword {1 0 −1 0 1 0}, a cyclic shift of the codeword rightward to generate {0 1 0 −1 0 1} is also a codeword.

The codebook is extendable to have more than ±1 amplitude values in the elements of codewords. Then the oscillatory run length codebook has various patterns with counting number amplitude and is represented by the equation $$C' = \bigcup_{i=1}^{M} iC_{Oscillatory}$$

A subset of an entire run length codebook is suitably selected as a codebook when it is desired to provide fewer codewords in the codebook. For example, the level is restricted to have a specific number m and a specific run length number l.

In communicating PMI vectors in some of the embodiments, the mean or average of PMIs in a PMI vector is suitably used as base value $S_0$. Some other embodiments using a codebook establish a different type of base value $$S_0 = \max_{1 \le i \le N} S_i - 1$$

(maximum PMI element value in the PMI vector, less unity) for partially representing the PMI vector. Euclidean distance or other distance measures are used to select a codeword for communication along with the particular type of base value. A codeword selection chooses the best codeword that minimizes the performance measure distance.

Some embodiments employ codebooks containing elements of 1's and 0's (ones and zeros) in codewords. In one such codebook, all entries have exactly one run of ones wherein the run is of any counting number length greater than zero. For clusters or combinations for number of subbands N=3, an example codebook of such 1/0 elements has six entries (100, 010, 001, 110, 011, 111). For a general number of subbands N, the codebook of such 1/0 elements has N(N+1)/2 entries. Using such a PMI compression embodiment N, and assuming a base value $S_0$ occupies four bits, delivers a number of bits per subband given by the expression $$1/N\{4 + \text{Ceil}\{\log_2[(N^2+N)/2]\}\}.$$

For example, given six subbands, only 1.5 bits per subband are needed to communicate a codebook index corresponding to a selected one of 21 PMI vector codewords from the codebook.

The codebook containing only 1's and 0's is generalized to have 2's and 0's, 3's and 0's, ..., M's and 0's. If C is a codebook, $$C' = \bigcup_{i=1}^{M} iC$$

is an extended codebook.

FIG. 28 is described elsewhere herein and shows parameterization for a pulse method of representation of a PMI vector.

In FIG. 29, the PMI feedback method is also extended here as follows.

1. Take several base values $$S_0(m) = \max_{1 \le i \le N} S_i - m, \; 1 \le m \le M.$$

2. Take the differences $D(m) = \lfloor D_1(m) \ldots D_N(m) \rfloor$ between PMIs and several base values $$D_i(m) = S_i - S_0(m).$$

3. Find the codewords which have the minimum performance measure distances per each level m.

$$C_l(m) = \arg\min_{1 \le j \le P} \|D(m) - C_j(m)\|^2$$

4. Among M levels, find the codeword that minimizes the minimum performance measure distance.

$$C_l = \arg\min_{1 \le m \le M} \|D(m) - C_l(m)\|^2$$

5. Feedback the codewords and the level m that minimizes the performance measure distance.

In FIG. 29, a small circle in each column of a table 5610 indicates the best codeword in the column. The PMI feedback method selects the starred codeword 5654 that represents the best of the best codewords 5652, 5654, 5656, 5658 in the column corresponding to the best level m of step 5.

Embodiments for larger number N of PMIs corresponding to a larger number of subbands N, provide new sets of extended PMI feedback codebooks using the methods for extension described herein. Also, codebooks for smaller number of PMIs are used according to the teachings herein to design codebooks for larger number of PMIs. For example, given codebooks for N PMIs and when it is desired to establish 2N number of PMIs for a more extensive application, then codebooks for N PMIs are concatenated to make codebooks for 2N PMIs. More specifically, if $C_1, C_2 \in C$ are two codewords for N PMIs, then the concatenated form $C=[C_1\ C_2]$ is a codeword for a codebook for representing PMI vectors having 2N PMI values.

In this document, different processes efficiently feedback the PMI across multiple sub-bands. They include any one or more of the following, among others: 1) Frequency-differential PMI feedback feeds back the difference with respect to the reference PMI. 2) Predistorted downsampled PMI feedback recalculates the performance degradation and optimizes the feedback PMI. 3) Mean and Delta PMI based method, where the reference PMI (e.g., mean PMI or wideband PMI) across all sub-bands is fed back and the delta PMI is fed back for each sub-bands. For example, the process feeds back the mean PMI and the deviation from the mean for each sub-band. 4) Wavelet-based PMI feedback. For example, a wavelet is based on orthogonalizing the basis vectors for the mean-and-delta PMI method. Haar transform and Hadamard transform approaches are useful for instance. 5) Hybrid PMI feedback. A subset of subbands with good channels use high granularity precoding and feedback, where a single PMI or lower-granularity precoding and feedback are used for sub-bands with worse channel. Best-M and pulse-shaped approaches are described. 6) Codebook based PMI feedback. A codebook consists of a set of vectors. UE searches over codebook for the optimum vector that has the smallest distortion from its current PMI, and feeds back the index of the codeword to NodeB. In other words, it feeds back the codeword that is closest to the PMI vector. Several codebook generation mechanisms are proposed. 7) A pre-distortion method is used by the UE to ensure that PMI errors obey desired properties.

In this way, PMI compression methods as taught herein significantly reduce the number of feedback bits for PMI representation. Desirable results include reduced, lower uplink overhead and simplified control signaling. These methods confer even fuller benefits from the high data rate of frequency-selective MIMO pre-coding. Pre-coding granularity is dynamically configurable, which enables better trade-off of feedback overhead and throughput. The use of the processes is detectable at the UE from the specific feedback generation module. UE organizes its feedback to the base station according to the compression format specified for it. Also the use of the processes is detectable at the base station since the base station is configured to interpret the feedback sent by the UE and to reconstruct that PMI according to the specified configuration.

While the above embodiments are given in the context of an OFDM/OFDMA system, it is also contemplated to apply the techniques taught in this invention to some other data modulation or multiple access schemes that utilize some type of frequency-domain multiplexing. Some examples include but are not limited to the classical frequency-domain multiple access (FDMA), single-carrier FDMA (SC-FDMA), and multi-carrier code division multiple access (MC-CDMA).

Various embodiments are used with one or more microprocessors, each microprocessor having a pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other microcontrol blocks using any one or more of the foregoing. Instructions for various processes disclosed herein are suitably stored in whole or in part in flash memory, or volatile or nonvolatile memory on or off chip relative to microprocessor core(s) or other processor block(s). Instructions are suitably conveyed to the device or system in manufacture or in use, by some tangible medium of storage such as optical disc, magnetic disk, flash drive, etc., or by download from another system such as a server and/or website.

Those skilled in the art to which the invention relates will appreciate that other and further additions, deletions, substitutions and modifications may be made to the described embodiments without departing from the scope of the invention. Processing circuitry comprehends digital, analog and mixed signal (digital/analog) integrated circuits, ASIC circuits, PALs, PLAs, decoders, memories, non-software based processors, microcontrollers and other circuitry, and digital computers including microprocessors and microcomputers of any architecture, or combinations thereof. Internal and external couplings and connections can be ohmic, capacitive, inductive, photonic, and direct or indirect via intervening circuits or otherwise as desirable. Implementation is contemplated in discrete components or fully integrated circuits in any materials family and combinations thereof. Block diagrams herein are also representative of flow diagrams for operations of any embodiments whether of hardware, software, or firmware, and processes of manufacture thereof, and vice-versa. While the methods disclosed herein have been described and shown with reference to particular steps performed in a particular order, it will be understood that these steps may be combined, omitted, subdivided, or reordered to form an equivalent method without departing from the teachings of the present disclosure. Accordingly, unless specifically indicated herein, the order or the grouping of the steps is not a limitation of the present invention. Illustrative embodiments are not to be construed in a limiting sense. It is therefore contemplated that the appended claims and their equivalents cover any such embodiments, modifications, and embodiments as fall within the true scope of the invention.

What is claimed is:

1. An electronic device comprising a first circuit operable to generate a precoding matrix index (PMI) vector associated with a plurality of configured subbands, and further operable to form a compressed PMI vector from said PMI vector wherein the compressed PMI vector includes one reference PMI and at least one differential subband PMI defined relative to the reference PMI, wherein the differential subband PMI represents an indication of a first predecode matrix relative to a second precode matrix corresponding to the reference PMI; and a second circuit operable to initiate transmission of a signal communicating the compressed PMI vector.

2. The electronic device claimed in claim 1 wherein the compressed PMI vector is formed by accessing at least one PMI vector codebook and utilizing at least one of the codebook entries.

3. The electronic device claimed in claim 2 wherein the communicated signal is derived from an entry index of the PMI vector codebook.

4. The electronic device claimed in claim 1 wherein the reference PMI represents all the configured subbands.

5. The electronic device claimed in claim 1 wherein the reference PMI represents one of the configured subbands.

6. The electronic device claimed in claim 1 further comprising plural antennas, and a transmitter to transmit a signal from at least one of said plural antennas communicating the compressed PMI vector in response to the second circuit, and a user interface coupled to said first circuit, wherein said first circuit is coupled to process received signals from said plural antennas, whereby to form a communication device.

7. An electronic device comprising
a first circuit operable to generate a precoding matrix index (PMI) vector associated with a plurality of configured subbands, and further operable to form a compressed PMI vector from said PMI vector wherein the compressed PMI vector includes one reference PMI and a second PMI representing a set of selected subbands; and
a second circuit operable to initiate transmission of a signal communicating the compressed PMI vector; and
further comprising a third circuit operable to generate at least one channel quality indicator (CQI) in conjunction with said PMI vector; and
wherein the third circuit is operable to generate a first CQI associated with said reference PMI and a second CQI associated with said second PMI.

8. The electronic device claimed in claim 7 wherein the reference PMI represents all the configured subbands.

9. The electronic device claimed in claim 7 wherein the first circuit is further operable to determine the set of selected subbands and said signal generated by the second circuit includes information on the set of selected subbands.

10. The electronic device claimed in claim 7 wherein the first circuit is further operable to determine the set of selected subbands and said signal generated by the second circuit includes information on the set of selected subbands.

11. A method of operating a communication device comprising
generating a precoding matrix index (PMI) vector associated with a plurality of configured subbands;
generating a compressed PMI vector from said PMI vector wherein the compressed PMI vector includes one reference PMI and at least one differential subband PMI defined relative to the reference PMI, wherein the differential subband PMI represents an indication of a first predecode matrix relative to a second precode matrix corresponding to the reference PMI; and
initiating transmission of a signal communicating the compressed PMI vector.

12. The method claimed in claim 11 wherein the compressed PMI vector is formed by accessing at least one PMI vector codebook and utilizing at least one of the codebook entries.

13. The method claimed in claim 12 wherein the communicated signal is derived from an entry index of the PMI vector codebook.

14. The method claimed in claim 11 wherein the reference PMI represents all the configured subbands.

15. The method claimed in claim 11 wherein the reference PMI represents one of the configured subbands.

16. A method of operating a communication device comprising
generating a precoding matrix index (PMI) vector associated with a plurality of configured subbands;
generating a compressed PMI vector from said PMI vector wherein the compressed PMI vector includes one reference PMI and in addition a second PMI representing a set of selected subbands; and
initiating transmission of a signal communicating the compressed PMI vector; and
further comprising generating at least one channel quality indicator (CQI) in conjunction with said PMI vector; and
wherein a first CQI associated with said reference PMI and a second CQI associated with said second PMI are generated.

17. The method claimed in claim 16 wherein the reference PMI represents all the configured subbands.

18. The method claimed in claim 16 wherein the set of selected subbands is determined and said signal includes information on the selected subbands.

19. The method claimed in claim 16 wherein the set of selected subbands is determined and said signal includes information on the set of selected subbands.

20. A wireless node comprising:
a receiver to receive at least one signal, each communicating a compressed precoding matrix index (PMI) vector associated with a user equipment wherein the compressed PMI vector includes one reference PMI and at least one differential subband PMI defined relative to the reference PMI;
a processing circuitry coupled to the receiver for reconstructing at least one PMI vector from said at least one signal wherein each reconstructed PMI vector is associated with a plurality of configured subbands;
a scheduler coupled with the processing circuitry to schedule at least one user equipment based on said at least one such reconstructed PMI vector; and
a transmitter circuitry responsive to said processing circuitry and scheduler to send data streams to at least one scheduled user equipment.

21. The wireless node claimed in claim 20 wherein the PMI vector is reconstructed by accessing at least one PMI vector codebook and utilizing at least one of the codebook entries.

22. The wireless node claimed in claim 20 wherein the reference PMI represents all the configured subbands.

23. The wireless node claimed in claim 20 wherein the reference PMI represents one of the configured subbands.

24. A wireless node comprising:
a receiver to receive at least one signal, each communicating a compressed precoding matrix index (PMI) vector associated with a user equipment wherein the compressed PMI vector includes one reference PMI representing all the configured subbands, and a second PMI representing a set of selected subbands;
a processing circuitry coupled to the receiver for reconstructing at least one PMI vector from said at least one signal wherein each reconstructed PMI vector is associated with a plurality of configured subbands;

a scheduler coupled with the processing circuitry to schedule at least one user equipment based on said at least one such reconstructed PMI vector; and a transmitter circuitry responsive to said processing circuitry and scheduler to send data streams to at least one scheduled user equipment.

25. The wireless node claimed in claim 24 wherein the processing circuitry is further operable to extract the information on the set of selected subbands.

26. The wireless node claimed in claim 24 wherein at the receiver the at least one signal, also communicating at least one companion channel quality indicator (CQI) and the processing circuitry operable for decoding at least one companion CQI, and the scheduler based also on said at least one decoded companion CQI.

27. The wireless node claimed in claim 26 wherein the companion CQI includes a first CQI associated with said reference PMI and a second CQI associated with said second PMI.

28. The wireless node claimed in claim 27 wherein the processing circuitry is further operable to extract the information on the set of selected subbands.

29. A wireless node comprising:
a receiver to receive at least one signal, each communicating a compressed precoding matrix index (PMI) vector associated with a user equipment;
a processing circuitry coupled to the receiver for reconstructing at least one PMI vector from said at least one signal wherein each reconstructed PMI vector is associated with a plurality of configured subbands wherein said processing circuit is operable to choose from plural alternative types of compression;
a scheduler coupled with the processing circuitry to schedule at least one user equipment based on said at least one such reconstructed PMI vector; and
a transmitter circuitry responsive to said processing circuitry and scheduler to send data streams to at least one scheduled user equipment and said transmitter circuit is operable to send a signal communicating the choice of compression.

30. A method of operating a wireless node comprising:
receiving at least one signal, each communicating a compressed precoding matrix index (PMI) vector associated with a user equipment wherein the compressed PMI vector includes one reference PMI and at least one differential subband PMI defined relative to the reference PMI;
reconstructing at least one PMI vector from said at least one signal wherein each reconstructed PMI vector is associated with a plurality of configured subbands; and
scheduling at least one user equipment based on said at least one such reconstructed PMI vector and sending data streams to at least one scheduled user equipment.

31. The method claimed in claim 30 wherein the compressed PMI vector is reconstructed by accessing at least one PMI vector codebook and utilizing at least one of the codebook entries.

32. The method claimed in claim 30 wherein the reference PMI represents all the configured subbands.

33. The method claimed in claim 30 wherein the reference PMI represents one of the configured subbands.

34. A method of operating a wireless node comprising:
receiving at least one signal, each communicating a compressed precoding matrix index (PMI) vector associated with a user equipment wherein the compressed PMI vector includes one reference PMI representing all the configured subbands, and a second PMI representing a set of selected subbands;
reconstructing at least one PMI vector from said at least one signal wherein each reconstructed PMI vector is associated with a plurality of configured subbands; and
scheduling at least one user equipment based on said at least one such reconstructed PMI vector and sending data streams to at least one scheduled user equipment.

35. The method claimed in claim 34 wherein said reconstructing further includes extracting the information on the set of selected subbands.

36. The method claimed in claim 34 wherein the receiving includes the at least one signal also communicating at least one companion channel quality indicator (CQI), the decoding including decoding the at least one companion CQI, and the scheduling also based on the at least one decoded companion CQI.

37. The method claimed in claim 36 wherein the companion CQI includes a first CQI associated with said reference PMI and a second CQI associated with said second PMI.

38. The method claimed in claim 37 wherein said reconstructing and decoding further include extracting the information on the set of selected subbands.

39. A method of operating a wireless node comprising:
receiving at least one signal, each communicating a compressed precoding matrix index (PMI) vector associated with a user equipment wherein said compression is chosen from plural alternative types of compression and communicated to the user equipment;
reconstructing at least one PMI vector from said at least one signal wherein each reconstructed PMI vector is associated with a plurality of configured subbands; and
scheduling at least one user equipment based on said at least one such reconstructed PMI vector and sending data streams to at least one scheduled user equipment.

* * * * *